US012035853B2

(12) United States Patent
McCaffery

(10) Patent No.: US 12,035,853 B2
(45) Date of Patent: Jul. 16, 2024

(54) BATHING APPARATUSES AND METHODS OF MAKING AND USING THE SAME

(71) Applicant: Marjory McCaffery, Butte, MT (US)

(72) Inventor: Marjory McCaffery, Butte, MT (US)

( * ) Notice: Subject to any disclaimer, the term of this patent is extended or adjusted under 35 U.S.C. 154(b) by 0 days.

(21) Appl. No.: 17/469,614

(22) Filed: Sep. 8, 2021

(65) Prior Publication Data

US 2021/0401236 A1 Dec. 30, 2021

Related U.S. Application Data

(63) Continuation of application No. 16/826,252, filed on Mar. 22, 2020, now Pat. No. 11,134,809, which is a (Continued)

(51) Int. Cl.

| | |
|---|---|
| *A47K 3/28* | (2006.01) |
| *A47C 31/11* | (2006.01) |
| *A47K 3/062* | (2006.01) |
| *A47K 3/12* | (2006.01) |
| *A47K 11/04* | (2006.01) |
| *A61G 5/10* | (2006.01) |

(Continued)

(52) U.S. Cl.

CPC .............. *A47K 3/282* (2013.01); *A47C 31/11* (2013.01); *A47C 31/113* (2013.01); *A47K 3/062* (2013.01); *A47K 3/122* (2013.01); *A47K 11/04* (2013.01); *A61G 5/10* (2013.01); *A61G 5/1002* (2013.01); *A61G 5/1045* (2016.11); *A61G 5/121* (2016.11); *A61H 33/00* (2013.01); *A61H 33/005* (2013.01)

(58) Field of Classification Search

CPC ........ A47K 3/282; A47K 3/062; A47K 3/122; A47K 11/04; A61G 5/121; A61G 5/1045; A61G 5/10; A61G 5/1002; A61H 33/00; A61H 33/005; A47C 31/00

USPC .............................................................. 4/621

See application file for complete search history.

(56) References Cited

U.S. PATENT DOCUMENTS

| | | | |
|---|---|---|---|
| 193,369 | A | 7/1877 | Hall |
| 633,398 | A | 9/1899 | Straube |

(Continued)

FOREIGN PATENT DOCUMENTS

| | | |
|---|---|---|
| CN | 204274262 | 4/2015 |
| DE | 000019522315 | 12/1999 |
| GB | 622622 | 4/1947 |

OTHER PUBLICATIONS

Alibaba, "Professional Outdoor Two Wheel Garden Cart—Buy Lawn And Garden Carts, Two Wheel Garden Carts, Wheelbarrow Cart Product on alibaba.com" (1 page, date unknown) https://www.alibaba.com/product-detail/Professional-outdoor-two-wheel-garden-cart_60354591810.html?spm=a2700.7724838/new.2017115.1.6cCssk.

(Continued)

*Primary Examiner* — Huyen D Le

(74) *Attorney, Agent, or Firm* — Kenealy Vaidya LLP

(57) ABSTRACT

The apparatuses and methods of making and using the same are directed to bathing apparatus to support an object while bathing the object with a fluid. The bathing apparatus may comprise a support assembly constituting a support structure of the apparatus; a support surface to support the object, the support surface supported by the support portion; and a fluid catch disposed on at least three sides of the support surface, the fluid catch serving as a basin for the fluid in such manner to contain the fluid separate from the support surface.

20 Claims, 57 Drawing Sheets

Related U.S. Application Data continuation of application No. 15/643,464, filed on Jul. 6, 2017, now Pat. No. 10,595,684.

(60) Provisional application No. 62/359,678, filed on Jul. 7, 2016.

(51) Int. Cl.
*A61G 5/12* (2006.01)
*A61H 33/00* (2006.01)

(56) References Cited

U.S. PATENT DOCUMENTS

| | | | | |
|---|---|---|---|---|
| 1,087,003 | A | 2/1914 | Engel | |
| 1,983,418 | A | 12/1934 | Thurmer | |
| 2,112,669 | A | 3/1938 | Halas | |
| 2,281,832 | A | 5/1942 | Cravotta | |
| 2,315,153 | A | 3/1943 | Ellinger | |
| 2,541,263 | A | 2/1951 | Mayo | |
| 2,712,346 | A * | 7/1955 | Sprinkle | B60N 2/1857 297/319 |
| 2,836,229 | A | 5/1958 | Spetner | |
| 3,132,349 | A | 5/1964 | Strouse | |
| 3,245,716 | A | 4/1966 | Danner | |
| 3,562,821 | A | 2/1971 | Queen | |
| 3,571,818 | A | 3/1971 | Jacuzzi | |
| 3,616,467 | A | 11/1971 | Drain | |
| 3,641,596 | A | 2/1972 | Bill | |
| 3,764,180 | A | 10/1973 | Mulholland | |
| 3,788,695 | A | 1/1974 | Salem | |
| 3,827,087 | A | 8/1974 | Cuthbertson | |
| 3,924,278 | A | 12/1975 | Ekman | |
| 3,969,776 | A | 7/1976 | Gildea | |
| 4,031,573 | A | 6/1977 | Romanoff | |
| 4,099,272 | A | 7/1978 | Sowder | |
| 4,118,810 | A | 10/1978 | Brickhouse | |
| 4,160,292 | A | 7/1979 | Kuether | |
| 4,165,123 | A | 8/1979 | Hutson | |
| 4,167,793 | A | 9/1979 | Vago | |
| 4,168,459 | A * | 9/1979 | Roesel, Jr. | H02K 21/046 322/29 |
| 4,197,838 | A | 4/1980 | Shill | |
| 4,229,039 | A | 10/1980 | Day | |
| 4,237,561 | A | 12/1980 | Britton | |
| 4,281,843 | A | 8/1981 | Johnson | |
| 4,287,618 | A | 9/1981 | Silver | |
| D261,796 | S | 11/1981 | Queen | |
| 4,455,696 | A | 6/1984 | Assanah | |
| 4,485,502 | A | 12/1984 | Marcanio | |
| 4,521,926 | A | 6/1985 | Kuether | |
| 4,523,341 | A | 6/1985 | Queen | |
| 4,809,368 | A | 3/1989 | Johansson | |
| 4,862,526 | A | 9/1989 | Berger | |
| 4,874,182 | A | 10/1989 | Clark | |
| 4,955,666 | A | 9/1990 | Baker | |
| 4,974,268 | A | 12/1990 | Cors | |
| 5,213,064 | A | 5/1993 | Mondine | |
| 5,215,352 | A * | 6/1993 | Yeh | A61G 5/1062 297/328 |
| D337,409 | S | 7/1993 | Maple | |
| 5,276,926 | A | 1/1994 | Lopez | |
| 5,343,575 | A | 9/1994 | Cartwright | |
| 5,375,869 | A | 12/1994 | Hsiao | |
| 5,386,599 | A | 2/1995 | Cartwright | |
| 5,393,119 | A | 2/1995 | Mukai | |
| 5,437,496 | A | 8/1995 | Rickard | |
| 5,459,887 | A | 10/1995 | Roman | |
| 5,539,939 | A | 7/1996 | Geese | |
| 5,598,590 | A | 2/1997 | Crawford | |
| D379,016 | S | 4/1997 | Wilson | |
| 5,615,903 | A | 4/1997 | Spear | |
| 5,779,306 | A | 7/1998 | Ohlsson | |
| 5,791,781 | A | 8/1998 | Park | |
| D404,805 | S | 1/1999 | Hurt | |
| 5,882,021 | A | 3/1999 | Reiland | |
| 5,946,745 | A | 9/1999 | Magee | |
| 5,978,983 | A | 11/1999 | Queen | |
| 6,076,203 | A | 6/2000 | Karhumnaki | |
| D429,929 | S | 8/2000 | Benson | |
| 6,114,002 | A | 9/2000 | Rinaldo | |
| 6,276,001 | B1 | 8/2001 | Chen | |
| 6,327,721 | B1 | 12/2001 | Devereaux | |
| 6,415,460 | B1 | 7/2002 | Rossman | |
| 6,516,477 | B1 | 2/2003 | Storm | |
| 6,543,068 | B1 | 4/2003 | Penninger | |
| D492,458 | S | 6/2004 | Jarast | |
| 6,804,842 | B1 | 10/2004 | Johnson | |
| 7,078,630 | B2 | 7/2006 | Martin-Woodin | |
| 7,247,132 | B2 | 7/2007 | Hugenholtz | |
| 7,309,072 | B2 | 12/2007 | Storm | |
| 7,310,834 | B2 | 12/2007 | Karhumnaki | |
| 7,444,690 | B2 | 11/2008 | Holland | |
| D587,897 | S | 3/2009 | Radke | |
| 7,549,702 | B2 | 6/2009 | Meyers | |
| 7,690,055 | B2 | 4/2010 | Hammer | |
| 7,802,323 | B2 | 9/2010 | Al-Mutairi | |
| 7,900,293 | B2 | 3/2011 | Sato | |
| D636,997 | S | 5/2011 | Devoe | |
| 8,069,821 | B1 | 12/2011 | Green | |
| 8,141,184 | B2 | 3/2012 | Mondrush | |
| 8,297,628 | B2 | 10/2012 | Zak | |
| 8,454,085 | B1 | 6/2013 | Hsu | |
| 8,517,414 | B2 | 8/2013 | Goldstein | |
| 8,678,418 | B1 | 3/2014 | Quarles | |
| 8,695,129 | B2 | 4/2014 | Williams | |
| 10,206,541 | B2 | 2/2019 | McCaffery | |
| 10,336,227 | B1 | 7/2019 | Weiss | |
| 10,548,434 | B2 | 2/2020 | McCaffery | |
| 10,595,684 | B2 | 3/2020 | McCaffery | |
| 11,089,910 | B2 | 8/2021 | McCaffery | |
| 11,134,809 | B2 | 10/2021 | McCaffery | |
| 2001/0010099 | A1 | 8/2001 | Shero | |
| 2003/0205921 | A1 | 11/2003 | McConnell | |
| 2004/0075315 | A1 | 4/2004 | Patrick | |
| 2006/0049674 | A1 | 3/2006 | Fair | |
| 2007/0044222 | A1 | 3/2007 | Hedberg | |
| 2007/0069560 | A1 | 3/2007 | Ranney | |
| 2007/0107120 | A1 | 5/2007 | Ingraham | |
| 2010/0140994 | A1 | 6/2010 | Moore | |
| 2012/0204340 | A1 | 8/2012 | Gibson | |
| 2014/0096317 | A1 | 4/2014 | Wang | |
| 2014/0145478 | A1 | 5/2014 | Boston | |
| 2017/0055723 | A1 | 3/2017 | Johnston | |
| 2017/0065096 | A1 | 3/2017 | Tanaka | |
| 2017/0245655 | A1 | 8/2017 | Satmary | |
| 2017/0354554 | A1 | 12/2017 | Wearley | |
| 2018/0104125 | A1 | 4/2018 | Vahala | |
| 2019/0045981 | A1 | 2/2019 | Arnold | |
| 2019/0307295 | A1 | 10/2019 | McCaffery | |
| 2020/0095757 | A1 | 3/2020 | Schwab | |
| 2020/0146513 | A1 | 5/2020 | Lee | |
| 2020/0214508 | A1 | 7/2020 | McCaffery | |
| 2021/0401236 | A1 | 12/2021 | McCaffery | |

OTHER PUBLICATIONS

"Plastic Colorful Garden Cart With Two Wheels—Buy Colorful Garden Cart, Storage Cart, Plastic Garden Cart With Two Wheels Product on alibaba.com" (4 pages, date unknown) https://www.alibaba.com/product-detail/plastic-colorful-garden-cart-with-two_1869958260.html?spm=a2700.7724838/new.2017115.1.tQ4KZK.

"Folding Shopping Trolley Cart With Chair—Buy Portable Folding Shopping Trolley Cart With Seat,Small Shopping Carts With Wheels,Shopping Trolley Smart Cart Product on alibaba.com" (1 page(s), date unknown) https://www.alibaba.com/product-detail/FOLDING-SHOPPING-TROLLEY-CART-WITH-CHAIR_1218860284.html?spm=a2700.7724838.35.1.fg131f.

"Two Wheel Garden Carts on Alibaba" (1 page(s), date unknown) https://www.alibaba.com/trade/search?fsb=y&IndexArea=product_en&CatId=&SearchText=two+wheel+garden+ cart.

"Port Fairy Men's Shed—Billy carts" (1 page(s), date unknown) http://www.portfairymensshed.org.au/project-billy-carts/.

(56) References Cited

OTHER PUBLICATIONS

"Wheelie Bin Composter/ 12 Steps (with Pictures)" (17 page(s), date unknown) http://www.instructables.com/id/Wheelie-Bin-Composter/.
"Composting Toilets made from Wheelie Bins | The Simplicity Collective", Samuel Alexander, (12 page(s), posted Jul. 22, 2014) http://simplicitycollective.com/composting-toilets-made-from-wheelie-bins.
"Compost toilet specifics/ the bins—Milkwood/ permaculture courses, skills + stories", Milkwood permaculture blog, Kirsten Bradley, (19 page(s), Apr. 18, 2011) http://www.milkwood.net/2011/04/18/compost-toilet-specifics-the-bins/.
"Hygge Media on Twitter/ Wheelie bin chairs at @ifatmunich http///t.co/p0UNqNekDp" (1 page(s), May 6, 2014) https://twitter.com/hyggemediauk/status/463619883050471424.
"Gabarage Upcycling Design", CoolHunting.com, Anna Carnick, (4 page(s), date unknown) http://www.coolhunting.com/design/by-anna-carnick.
Wheelchair Accessible Portable Shower Stall Standard Model—Walmart.com, (1 page, date unknown ) https://www.walmart.com/ip/Wheelchair-Accessible-Portable-Shower-Stall-Standard-Model/848837645.
"Cascade bath unit to allow a truly luxurious showering experience for elderly—Designbuzz", (1 page, date unknown) http://www.designbuzz.com/cascade-bath-unit-allow-luxurious-showering-experience-elderly/.
"Otter Bathing System | eSpecial Needs", (1 page, date unknown) http://www.especialneeds.com/bath-toileting-diapers-bathing-bath-shower-chairs-otter-bathing-system.html.
"Scalamobile | Me and 'Mandy' my MND", Helen Kendall (Clark), (9 page(s), Aug. 1, 2015) https://helen82011.wordpress.com/tag/scalamobile/.
"Therapeutic Tubs Mohave 53 x 29" Whirlpool Jetted Wheelchair Accessible Bathtub & Reviews | Wayfair" (5 page(s), date unknown ) http://www.wayfair.com/Therapeutic-Tubs-Mohave-53-x-29-Whirlpool-Jetted-Wheelchair-Accessible-Walk-In-Bathtub-WF2953WCAWH-MTB1081.html.
"ATB—All Terrain Bucket System", People Powered Machines (2 pages, date unknown) http://www.peoplepoweredmachines.com/at-bucket/#caddy.
"March of Dimes Canada/ Bathroom Projects", (15 page(s), date unknown ) http://www.marchofdimes.ca/EN/programs/Designability/projects/Pages/BathroomProjects.aspx (variety of pictures).
"MedPro® AquaCare Shower Commode with Swivel armrests—Multi-purpose infection control friendly chair", (1 page, date unknown ) http://www.amgmedical.com/site/our_products_results.asp?trouv1=770-300.
"Amazon.com/ Surefit cover wheelchair" (6 pages, date unknown ) http://www.amazon.com/s/ref=nb_sb_noss?url=search-alias%3Daps&field-keywords=Surefit+cover+wheelchair&rh=i%3Aaps%2Ck%3ASurefit+cover+wheelchair.
"Amazon.com/ Primo EuroSpa Bath and Changing Center, Honey/ Cream/ Baby" ( 9 page(s), date unknown ) http://www.amazon.com/dp/B008CEWLRQ?psc=1.
"Amazon.com / Fisher-Price Calming Waters Vibration Bathing Tub / Baby Bathing Seats And Tubs / Baby" (1 page, date unknown) https://www.amazon.com/Fisher-Price-Calming-Waters-Vibration-Bathing/dp/B005IWM7V0/ref=sr_1_1_s_it?s=baby-products&ie=UTF8&qid=1498255548&sr=1-1&keywords=Fisher-Price-Calming-Waters-Vibration-Bathing.
"EZ-ACCESS", (See EZ-shampoo hair washing tray, inflatable shampoo tray, Scooter & Power chair cover.) (2 pages, date unknown ) http://www.medifair.com/Catalog/Brand/31/Ez-Access.
"2014 New sauna bath sauna box sky blue adult care for the elderly make up magnetic folding bathtub" (2 page(s), date unknown) http://www.aliexpress.com/item/2014-New-sauna-bath-sauna-box-sky-blue-adult-care-for-the-elderly-make-up-magnetic/32253423564.html.
"hydrobath-dog-grooming-tub coml Kennel | Pinterest | Bathing", (4 page(s), date unknown) https://www.pinterest.com/pin/134826582563888662.
"A great idea for a soaking tub in small spaces and it looks like it has good reviews.—Amazon.com/ Folding bathtub, Portable bathtub, Plastic bath . . . | Pinterest . . . ", (1 page(s), date unknown) https://www.pinterest.com/pin/444519425694610543/.
"Stainless steel folding bath tub bath barrel thicker insulation adult non inflatable plastic acrylic-in Bathing Accessories from Beauty & Health on Aliexpress.com | Alibaba Group" (1 page(s), date unknown) http://www.aliexpress.com/item/Stainless-steel-folding-bath-tub-bath-barrel-thicker-insulation-adult-non-inflatable-plastic-acrylic/32253636161.html.

* cited by examiner (cross-section along line 7-7 of Fig. 6)

Fig. 13
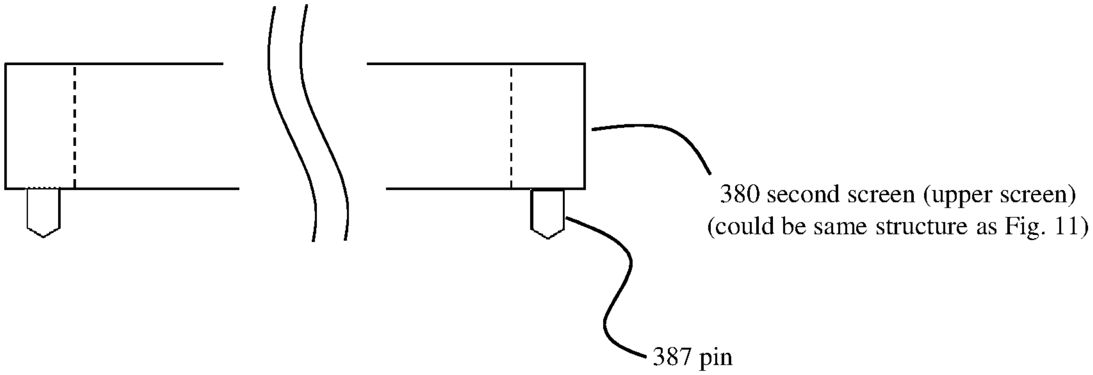
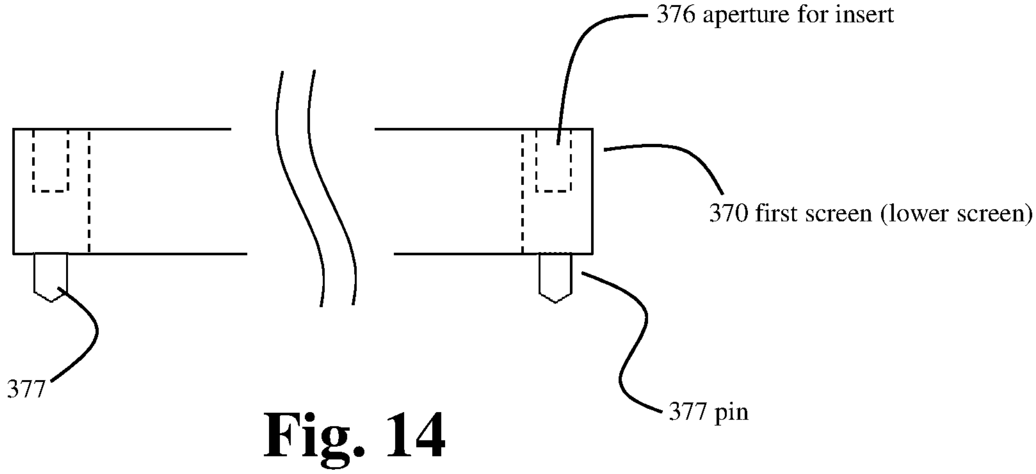
Fig. 14

2600 Apparatus

Apparatus 2800

Bolts (3145, 3146) pass through the retaining channel (3142) in the lower side portion - to limit travel of the lower side portion vis-à-vis the lower side support.

That is:

- bolt (3146) abuts against securement anchor (3148) to limit movement (of the lower side portion) forward; and
- bolt (3145) abuts against securement anchor (3147) to limit movement (of the lower side portion) backward.

(top view from Line 57 (Fig. 56))

BATHING APPARATUSES AND METHODS OF MAKING AND USING THE SAME

RELATED PATENT APPLICATION AND PRIORITY

This application claims priority to and is a continuation patent application of U.S. patent application Ser. No. 16/826,252 filed Mar. 22, 2020. Such U.S. patent application Ser. No. 16/826,252 claims priority to and is a continuation patent application of U.S. patent application Ser. No. 15/643,464 filed Jul. 6, 2017. Such U.S. patent application Ser. No. 15/643,464 claims priority to U.S. Provisional Patent Application 62/359,678 filed Jul. 7, 2016, the content of which is incorporated herein by reference in its entirety. The content of such U.S. patent application Ser. No. 15/643,464 and U.S. patent application Ser. No. 16/826,252 are incorporated herein by reference in their entireties.

BACKGROUND OF THE INVENTION

The invention relates to apparatuses to bath an object.

BRIEF SUMMARY OF THE INVENTION

The apparatuses and methods of making and using the same are directed to bathing apparatuses to support an object while bathing the object with a fluid. The bathing apparatus may comprise a support assembly constituting a support structure of the apparatus; a support surface to support the object, the support surface supported by the support portion; and a fluid catch disposed on at least three sides of the support surface, the fluid catch serving as a basin for the fluid in such manner to contain the fluid separate from the support surface.

BRIEF DESCRIPTION OF THE DRAWINGS

The present invention can be more fully understood by reading the following detailed description together with the accompanying drawings, in which like reference indicators are used to designate like elements, and in which:

FIG. 13 is a section front view of the second screen 380 shown in FIG. 11, in accordance with one embodiment of the invention.

FIG. 14 is a section front view of the first screen 370 of FIG. 11, in accordance with one embodiment of the invention.

DETAILED DESCRIPTION OF THE INVENTION

Figure 1:
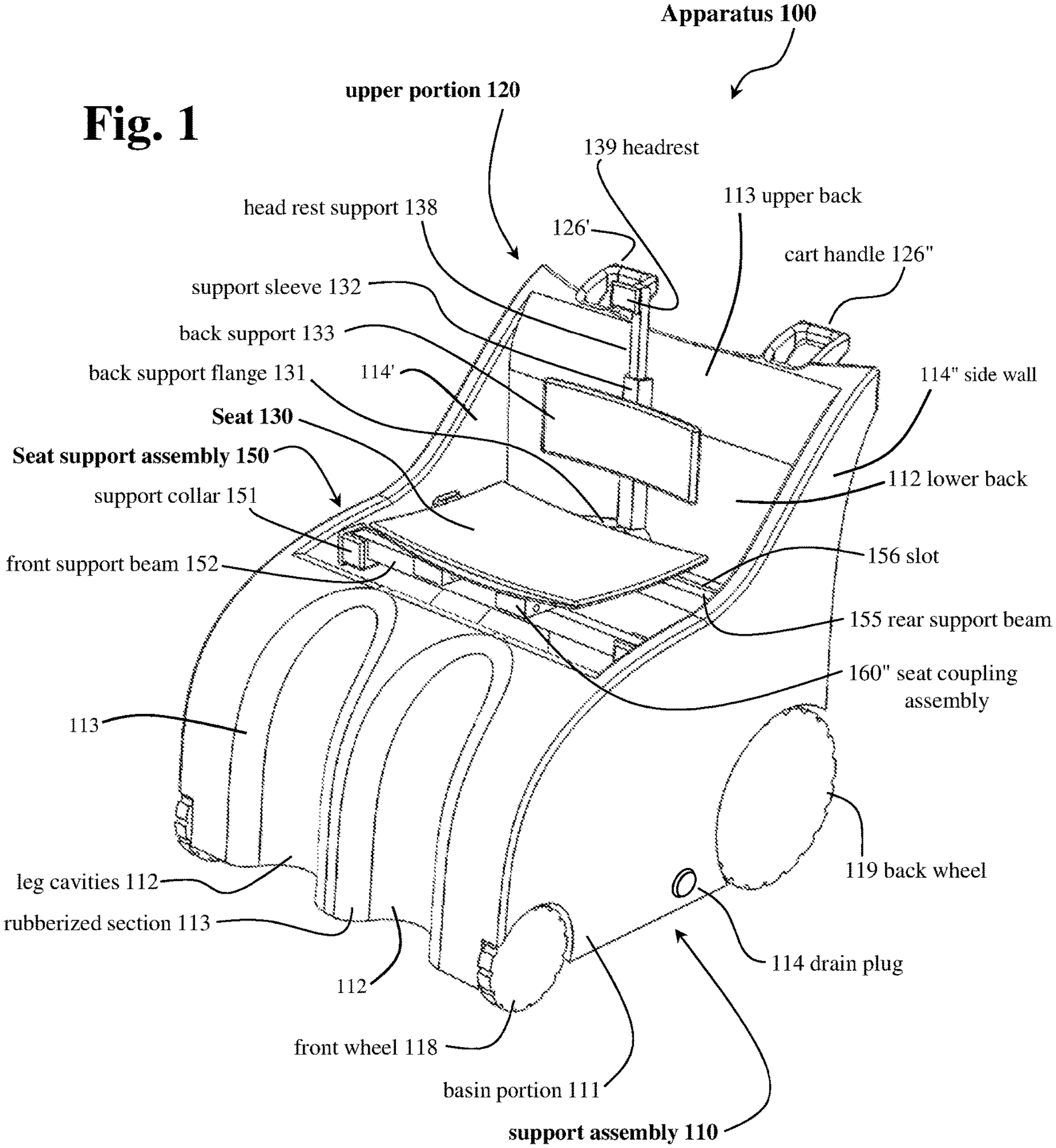
FIG. 1 is a perspective view showing an apparatus 100 in accordance with an embodiment of the invention.

Hereinafter, aspects of the apparatuses in accordance with various embodiments of the invention will be described. As used herein, any term in the singular may be interpreted to be in the plural, and alternatively, any term in the plural may be interpreted to be in the singular.

Various features of embodiments described herein are present in plural, such as two or more similar features, identical features or mirrored features. For example, Feature-A on the left side is a mirror image of the same feature on the right side. As used herein, such features may be described collectively as Feature-A 101—and described individually as Feature-A 101' (to reference a first of such plural features); Feature-A 101" (to reference a second of such plural features); Feature-A 101'" (to reference a third of such plural features); and so forth.

The invention provides apparatuses—and methods of making and using apparatuses—to support an object while bathing the object with a fluid, such as water. In particular, embodiments of the invention provide a support surface to support the object wherein the support surface is supported by a support assembly. A fluid catch is disposed about the support surface in a novel arrangement. The fluid catch serves as a basin to collect fluid that is being used to bath the object. In particular, the fluid catch serves to collect and retain fluid in a manner such that the fluid is not in contact with the object. Where the object is indeed a person being washed, the invention provides an arrangement in which the person is not exposed to standing water next to the person’s skin. Various features of embodiments are described below.

The apparatuses and methods of the invention may be utilized to effectively and conveniently wash a variety of objects. Illustratively, the invention provides an apparatus to provide a way for in-home caretakers to take care of people who are not bedridden, for example, but who are weak and frail. A bathroom is a place with slippery surfaces—and with unforgiving places to land—in the situation of a fall by the person. It should be appreciated, that there comes a time when some people cannot independently and effectively use a shower and/or use a toilet, for example. In order to keep the skin and the various areas of the body clean and moisturized, the invention provides apparatuses in accordance with embodiments of the invention, which need not be high-tech and/or expensive. The apparatuses of the invention are safe and simple, easy to keep clean, and inexpensive. In addition, the apparatuses of the invention are portable and provide for the possibility of giving care if there is a need to travel and/or there is a desire to go on an outing where accessible bathroom facilities are needed. The apparatuses of the invention may well be kept by a host of an older or invalid person, i.e. in case that person may need to bathe, for example.

In accordance with one embodiment of the invention, an apparatus provides a cart of sorts with a seat. The seat may support a person for bathing and/or functioning as a toilet. The invention allows for more than just a sponge bath—since water, or other fluid, can be poured and collected in accordance with various embodiments. In accordance with some embodiments, the apparatus of the invention provides a headrest that can be utilized to hold a person's head in an ergonomically correct position so that the person's head can be easily washed. As described above, the invention provides a support surface in conjunction with a fluid catch. The invention may also include various accessories as described in further detail below. For example, such accessories might include a table to be supported in front of the support surface or a support for a leg in a cast, for example. Such accessories expand the applications of the invention. The invention may be utilized to bathe an older person or invalid, as noted above. In addition, the invention may be utilized to clean a child, a pet, or a fragile item that cannot be moved to a water source.

The apparatuses of the invention may be utilized in various additional situations. For example, an embodiment of the invention might be utilized by a beautician on the go. With an easily transportable chair, as described below, the beautician can wash and style hair, do a manicure, and utilize the invention to perform other services. The invention may also be utilized by homecare nurses, hospitals, and rest homes. The apparatuses of the invention provide a much safer alternative—as opposed to using a public shower and/or toilet, for example.

Various embodiments of the invention may also provide advantages in addition to those described above. For example, embodiments of the invention may provide for a person of suitable weight might be transported short distances, i.e. using an apparatus of the invention in the manner of a wheelchair. In addition, embodiments of the invention may include a privacy curtain so as to provide a portable "potty" for a day care that has a group of children on an outing. The invention may be utilized in a shower, i.e. in the situation where a basic shower seat is not sufficiently safe. The invention may further include a suitable cover with a cushion. The apparatuses of the invention may further include a stylish and comfortable chair that may be utilized as desired. Various further aspects will hereinafter be described.

FIG. 1 is a perspective view showing an apparatus 100 in accordance with a first embodiment of the invention. As shown, the apparatus 100 includes a support assembly 110. The support assembly 110 serves to support a seat 130. Accordingly, in this embodiment of the invention, a "support surface" is constituted by the seat 130. To provide support for the seat 130, the support assembly 110 may include a front support beam 152 and a rear support beam 155. Each of the support beams (152, 155), in accordance with one embodiment of the invention, serve to support a pair of seat coupling assemblies 160 (including a left seat coupling assembly 160' and a right seat coupling assembly 160"). In turn, the seat coupling assemblies 160 are connected to seat 130. Further details are described below.

As shown in FIG. 1, the support assembly 110 may be in the form of a cart. The support assembly 110 may include a basin portion 111 and an upper portion 120. The support assembly 110 may be constructed of plastic, such as through a suitable molding process. In such a molding process, the support assembly 110 may be molded as a unit or constructed in separate pieces and fastened together. However, it is appreciated that various approaches may be utilized to construct the support assembly 110.

As shown, the support assembly 110 may include a plurality of wheels to provide mobility to the apparatus 100. In the illustrated embodiment of FIG. 1, such wheels include a front wheel 118 and a back wheel 119. As shown, the front wheel 118 may be disposed toward the front extreme of the apparatus 100 and the back wheel 119 may be disposed at the rear extreme of the apparatus 100. In this manner, the position of the wheels may provide stability to the apparatus 100. However, it is of course appreciated that the particular position, construction, and type of wheels may vary as desired.

The support assembly 110 may be contoured to enhance ease of use and comfort. Accordingly, the support assembly 110 may include leg cavities 112. The leg cavities 112 may be constituted by concave surfaces of the support assembly 110, which serve to at least partially receive and cradle a person's legs, i.e. when the person is sitting on the seat 130. The support assembly 110 may include rubberized sections 113 around a perimeter of each leg cavity 112. Such rubberized sections 113 may provide additional comfort for the person disposed on the seat 130. It is appreciated that any of variety of materials might be utilized to cover the leg cavities and/or the sections 113. For example, instead of the sections 113 being coated by a rubber material, the sections 113 might include some other soft, pliable, and water resistant covering to provide comfort to the person.

The upper portion 120 may be an integral extension of the basin portion 111. That is, the upper portion 120 in the basin portion 111 may be integrally molded, for example, as described above. The upper portion 120 may include a lower back 112 and an upper back 113. Further, the upper portion 112 may include sidewalls 114 (including left sidewall 114' and right side wall 114"). The sidewalls 114 may be provided to at least partially receive a person sitting upon the seat 130, as well as to provide a support surface to lean upon and/or grab. More particularly, a patient being bathed, for example, may grab hold of either of the sidewalls 114 to brace herself or himself—in conjunction with sitting down or getting up. Additionally, a nurse, for example, might utilize the sidewalls 114 to assist with the patient.

Hereinafter, use of the various embodiments may be described in the context of such patient working with a nurse. However, as otherwise described herein, is of course appreciated that the invention is not limited to such use and is not limited in such context.

Figure 9:
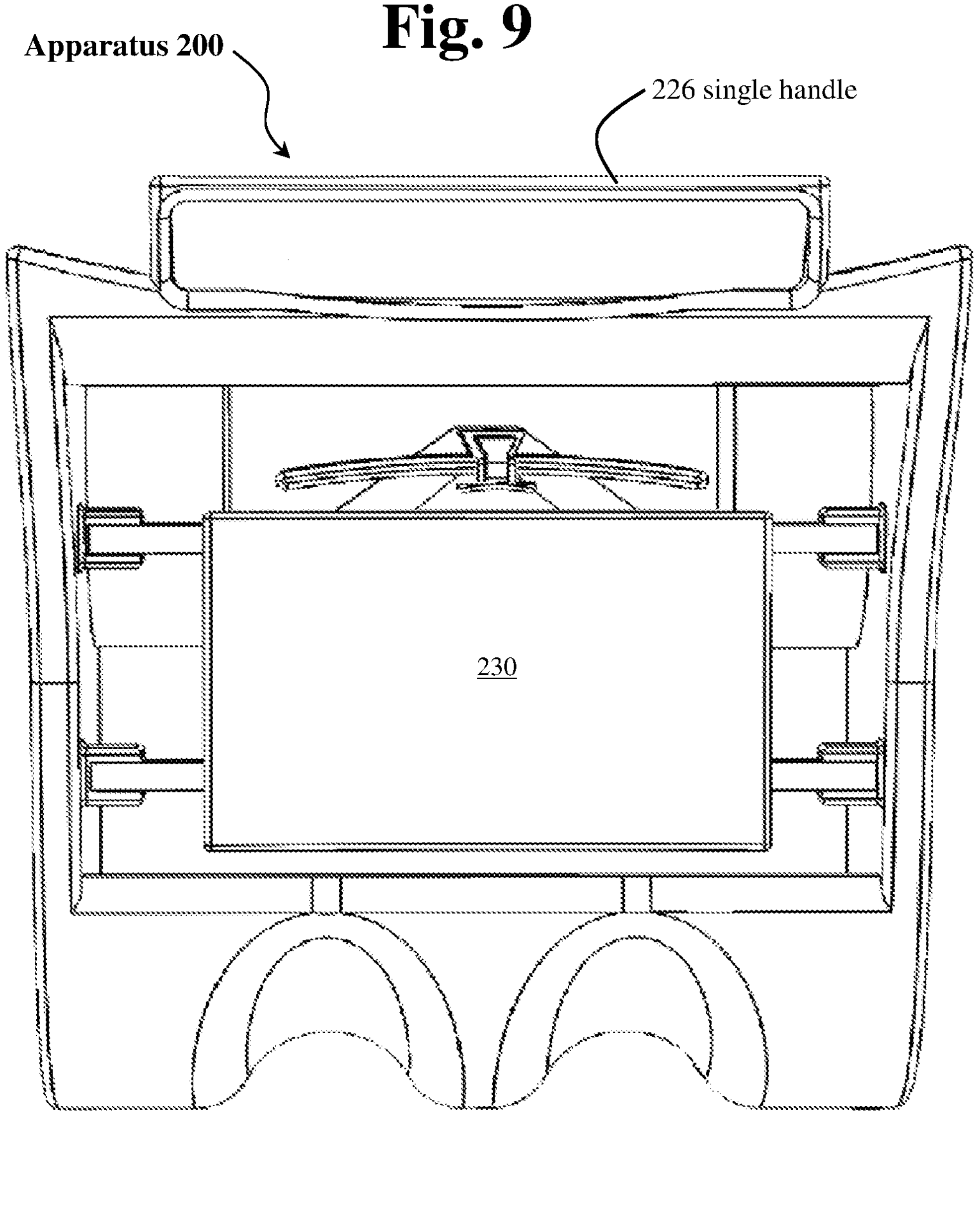
FIG. 9 shows an apparatus 200 with a single handle 226, in accordance with one embodiment of the invention.

The upper portion 120 also includes cart handles 126, i.e. left cart handle 126' and a right cart handle 126". The handles 126 allow a caretaker to hold onto the handle so as to steady the apparatus 100, such as when a patient sits down or gets up from the seat 130. In addition, the handles 126 provide an effective handle to wheel a patient around (who is sitting in the apparatus 100) in the manner of a wheelchair. It is appreciated that the handle 126 may be positioned on the apparatus 100 at different locations and/or the handles 126 may take on different geometrical configurations and shapes. Illustratively, FIG. 9 shows an apparatus 200 with a single handle 226, in accordance with one embodiment of the invention. The handles 126 might be integrally molded with the upper portion 120. Alternatively, the handles 126 might be separately molded, for example, and attached to the upper portion 120. The handles 126 may be constructed of plastic or some other suitable material.

As shown in FIG. 1, the seat 130 may be of an upwardly facing concave shape from left to right and/or from front to back. A back support flange 131 may be attached to the seat 130 using suitable attachment mechanisms, such as screws. Alternatively, the back support flange 131 may be attached to the seat coupling assemblies 160 in some suitable manner. Extending upwardly from the back support flange 131 is a support sleeve 132. The support sleeve 132 may be integrally formed with or mechanically attached to the back support flange 131. The support sleeve 132 may be in the shape of a cylindrical tube or a square tube, for example. The apparatus 100 further includes a back support 133. In the embodiment of FIG. 1, the back support 133 is attached to the support sleeve 132 using suitable attachment mechanisms such as screws, for example.

As shown in FIG. 1, a headrest support 138 may be telescopically disposed in the back support 133. Accordingly, a user (such as a patient or caregiver) may position the headrest support 138 at a desired height by moving the headrest support 138 up or down within the support sleeve 132. The headrest support 138 may be retained at a desired position, within the support sleeve 132, utilizing either a frictional arrangement and/or a setscrew, for example. Illustratively, a wingnut setscrew might be utilized that is threadably disposed and passes through the support sleeve 132 so as to engage and hold in place the head rest support 138. A headrest 139 is disposed proximate the top of the headrest support 138. The headrest 139 may take on a variety of geometrical shapes such as square, rectangular, oval, or round, for example. The headrest may be constructed of plastic and/or padded material so as to provide a comfortable headrest to a patient, for example.

In use of the apparatus 100 of FIG. 1, a patient or some object may be disposed on the seat 130. A caregiver or other person may wash the patient or object with a sponge, washcloth, or some other similar item. Further, a caregiver may wash and/or rinse a patient using a pitcher or similar device. As water or other fluid is dispersed over the patient or object, the water/fluid passes freely into a cavity formed by the basin portion 111. Accordingly, a patient is not exposed to standing water. Rather, the water simply collects in the basin portion 111. Upon completion of the washing of a person or object, the basin portion 111 may be drained of fluid either by tipping the basin portion 111 over or by utilizing a drain plug, such as the drain plug 114 shown in FIG. 1. Relatedly, it is appreciated that the drain plug 114 may be opened and connected to a hose or other tube. Such an arrangement may be useful when the apparatus 100 is disposed near, but not in, a shower stall. Additionally, it is appreciated that the drain plug 114 might be opened such that water or other fluid drains into another basin directly or drains into another basin via a hose or other tube.

Figure 2:
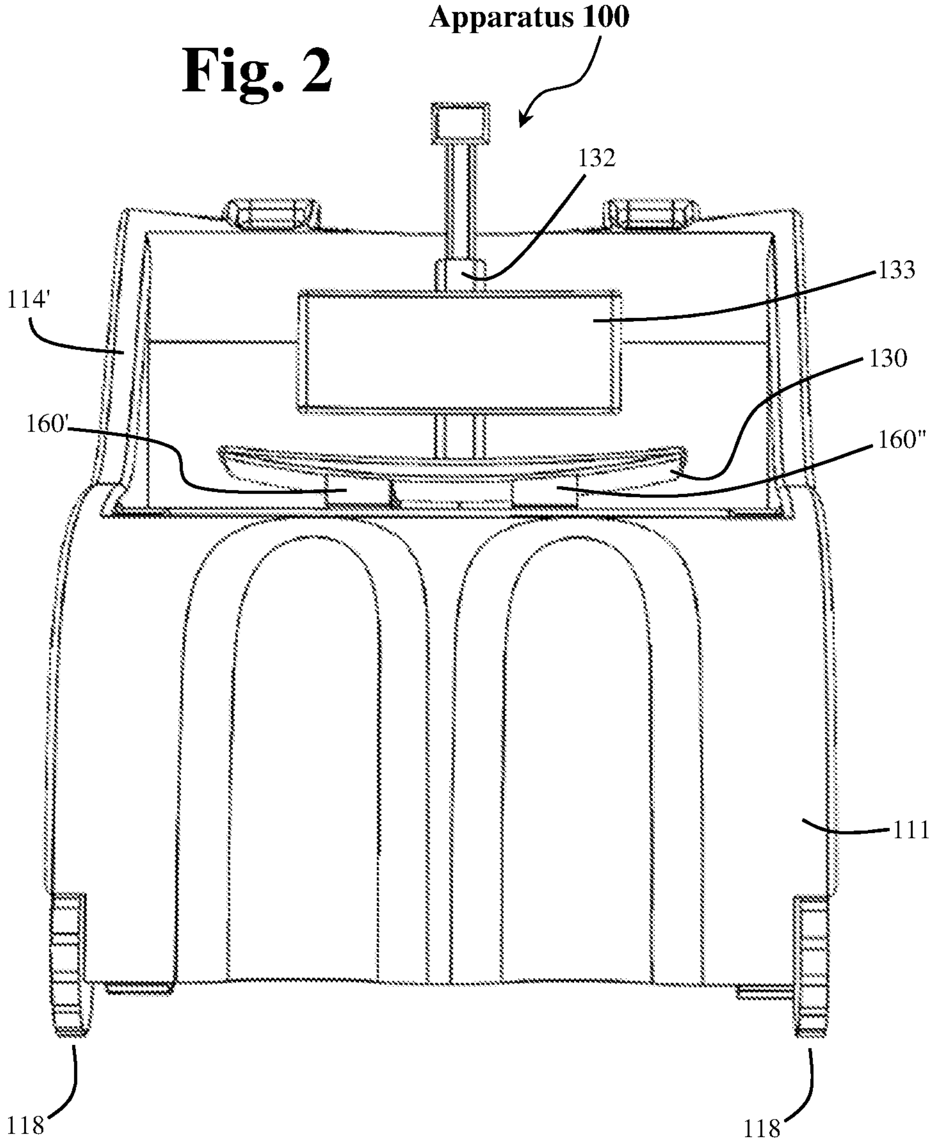
FIG. 2 is a front view of an apparatus 100 in accordance with an embodiment of the invention.

FIG. 2 is a front view of an apparatus 100 in accordance with an embodiment of the invention. In particular, FIG. 2 shows further detail of the basin portion 111. Front wheels 118 are attached at opposing front corners of the basin 111. FIG. 2 also further shows the manner in which the back support 133 is attached to the support sleeve 132. In accord with this embodiment of the invention, the seat 130 is of a "bowed" configuration such that the seat is concave on an upward side of the seat and convex on a downward side of the seat. Each of the seat coupling assemblies 160 include an angled upper surface so as to mate with a lower surface of the seat 130. FIG. 2 also shows further detail of the sidewalls 114. As shown, the sidewalls 114 may be constructed of a thickness and rigidity of material so as to provide structural integrity and so as to provide a suitable structure—such that a patient and/or caregiver can adequately grab a hold of the sidewalls 114.

Figure 3:
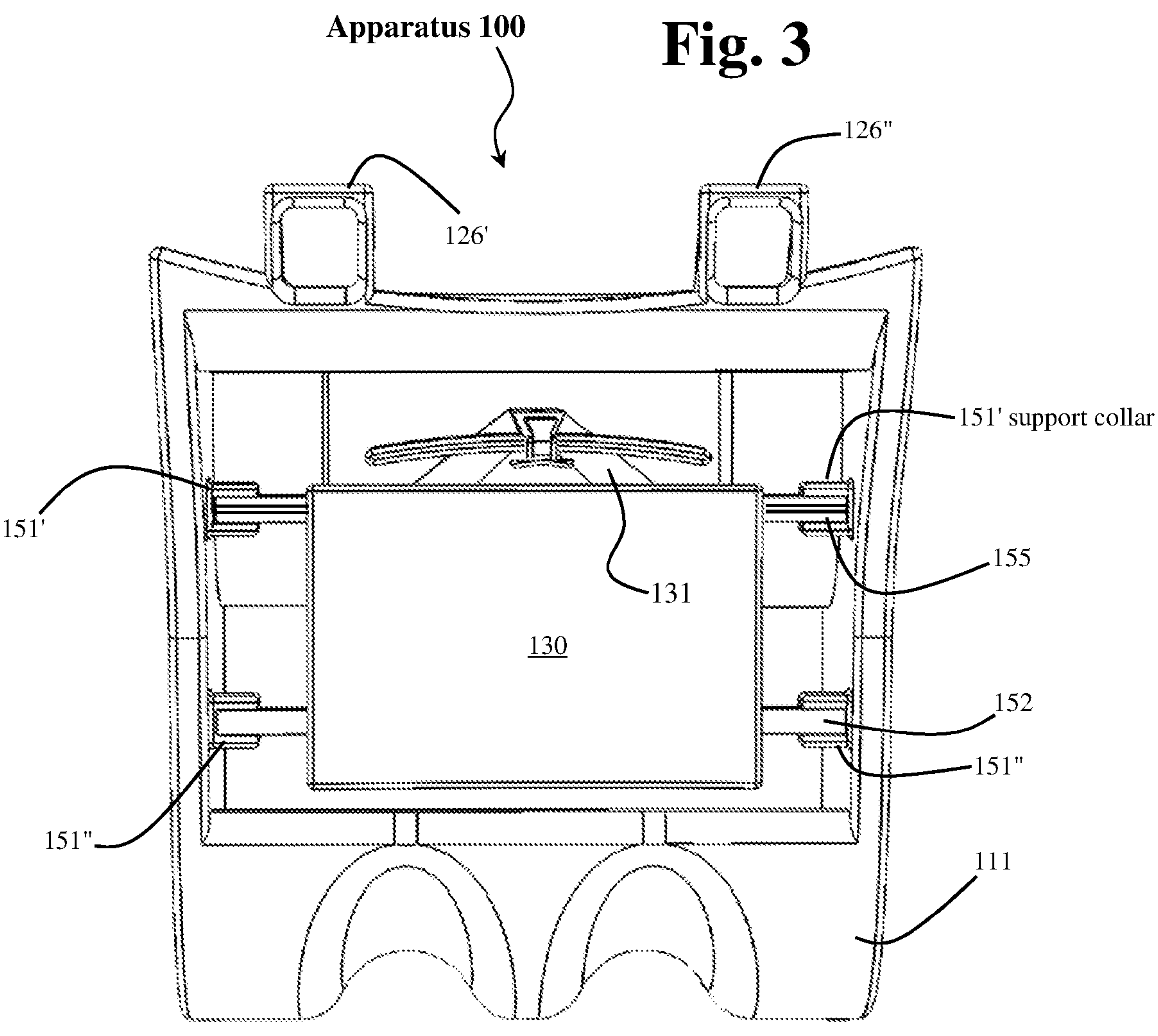
FIG. 3 is a top view of an apparatus 100 in accordance with an embodiment of the invention.

FIG. 3 is a top view of an apparatus 100 in accordance with an embodiment of the invention. FIG. 3 shows further detail of the cart handles 126. Further, FIG. 3 shows further detail of the back support flange 131 that may be connected to the lower surface of the seat 130. As shown, the back support flange 131 may be constructed in an inverted "V" shape and extend backwardly from the seat 130. The seat 130, in accordance with embodiments of the invention, is adjustable relative to the basin portion 111. More particularly, the seat 130 is adjustable relative to the rear support beam 155 and the front support beam 152. Each of the front support beam 152 and the rear support beam 155 is attached to the seat 130, as described in further detail below. Additionally, the rear support beam 155 is secured to (and supported by) the basin portion 111 using opposing support collars 151'. As shown, the rear support beam is effectively cradled in the opposing support collars 151'. The support collars 151' may be integrally formed with the basin portion 111 and/or connected to the basin portion in some suitable manner. In similar manner, the front support beam 152 is cradled by two opposing support collars 151". The support collars 151" may be of similar or exact structure as the support collars 151'.

Figure 4:
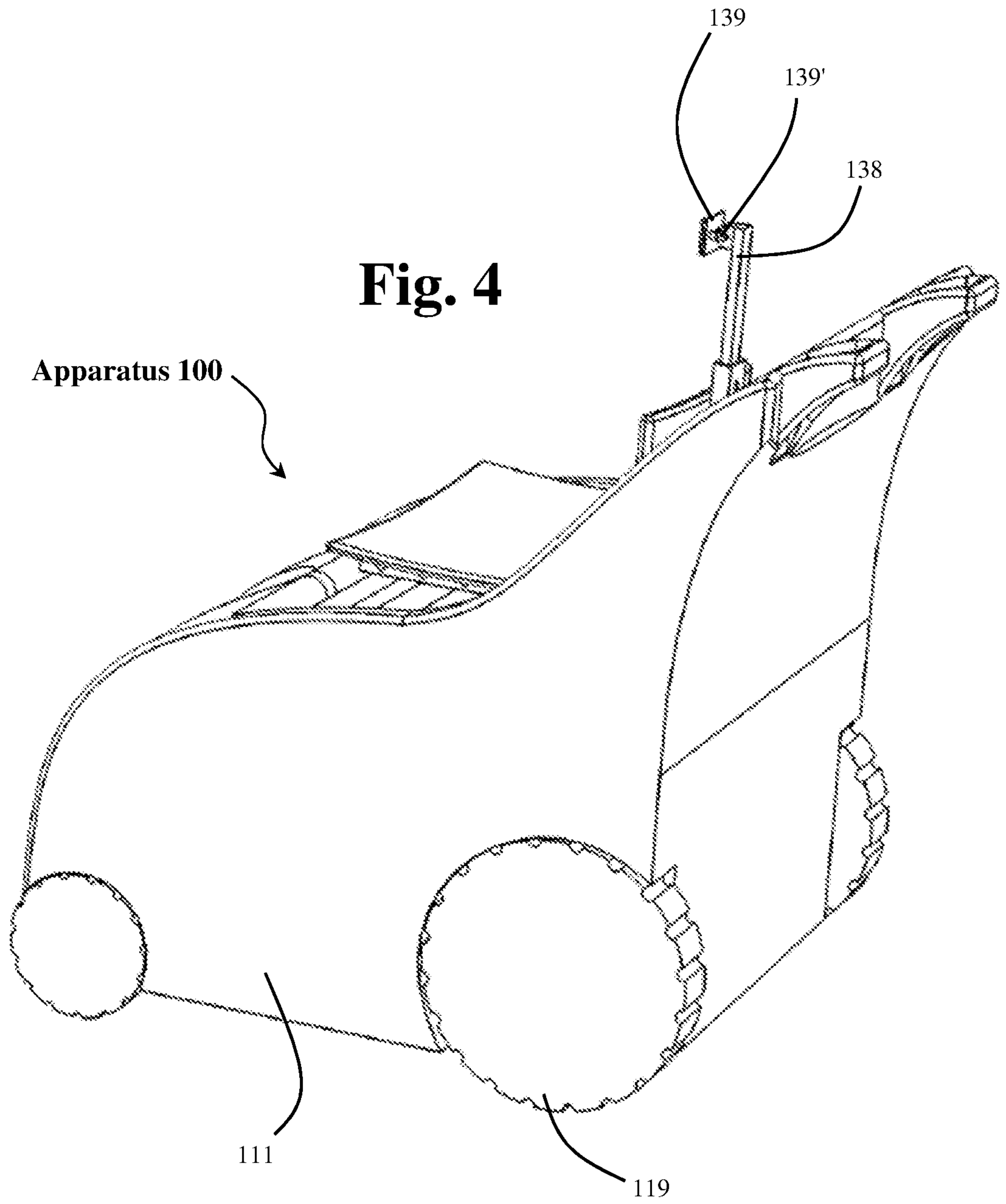
FIG. 4 is a rear perspective view of an apparatus 100 in accordance with an embodiment of the invention.

FIG. 4 is a rear perspective view of an apparatus 100 in accordance with an embodiment of the invention. In particular, FIG. 4 shows further detail of the basin portion 111, including the back of the basin portion 111. Additionally, FIG. 4 shows further detail of a front wheel 118 and the two back wheels 119. FIG. 4 also shows the manner in which the headrest 139 is attached to the head rest support 138. In particular, the headrest 139 may be attached to the headrest support 138, such as by using a pin. Such allows pivoting motion of the headrest 139 which may enhance comfort to the patient.

Figure 5:
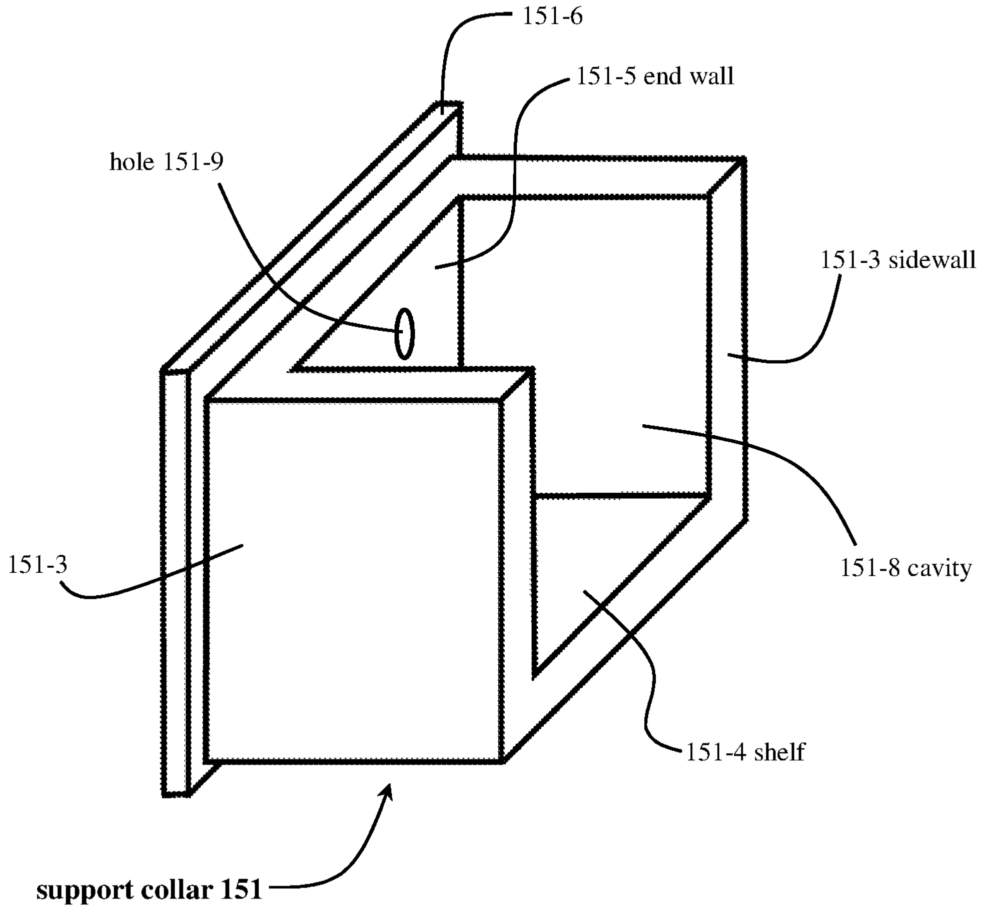
FIG. 5 is a perspective view of a support collar 151, in accordance with an embodiment of the invention.

FIG. 5 is a perspective view of a support collar 151, in accordance with an embodiment of the invention. As shown in FIG. 1 and FIG. 3, for example, a support collar may be utilized to support respective ends of a rear support beam 155. Similarly, a support collar 151 may be utilized to support respective ends of the front support beam 152.

Each support collar 151 may be in the form of the "U" shaped arrangement as defined by integrally molded and connected opposing sidewalls 151-3 and a lower shelf 151-4. Such "U" shaped arrangement provides an interior cavity 151-8 in which a support beam (152, 155) may be cradled. Each of the opposing sidewalls 151-3 (in the lower shelf 151-4) may be integrally molded and connected to an end wall 151-5. The support collar 151 may further include a framing piece 151-6. The framing piece 151-6 may be simply in the form of a square or rectangle piece of material that is attached to or integrally formed with the end wall 151-5 as well as attached to or integrally formed with the sidewalls 151-3 and the shelf 151-4. The framing piece 151-6 provides additional structural integrity and also serves to space the ends of the support beams (152, 155) from the sidewalls 114.

As noted above, the support collars 151 may be integrally formed with the basin portion 111, such as through a molding process. However, it may well be preferred to mold the support collar 151 in a single piece as shown in FIG. 5, which includes one or more holes 151-9. A suitable mechanical fastener (or other attachment mechanism) may then be utilized to attach each support collar 151 to a supporting sidewall 114. That is, a pair of support collars 151 are attached to the sidewall 114' and a pair of support collars 151 are attached to the sidewall 114", as shown in FIGS. 1 and 3, for example. In accordance with a further embodiment of the invention, each of the support collars 151 may further include a top shelf that serves to further enclose cavity 151-8. In other words, such a top shelf would extended between the upper edges of the opposing sidewalls 151-3, as shown in FIG. 5. Such a top shelf might be beneficial in preventing the support beams 152, 155 from dislodging from the cavity 151-8. However, it is appreciated that the ends of support beams 152, 155 may be secured in each support cavity 151 utilizing appropriate mechanical fasteners, such as screws and/or bolts with nuts.

Figure 6:
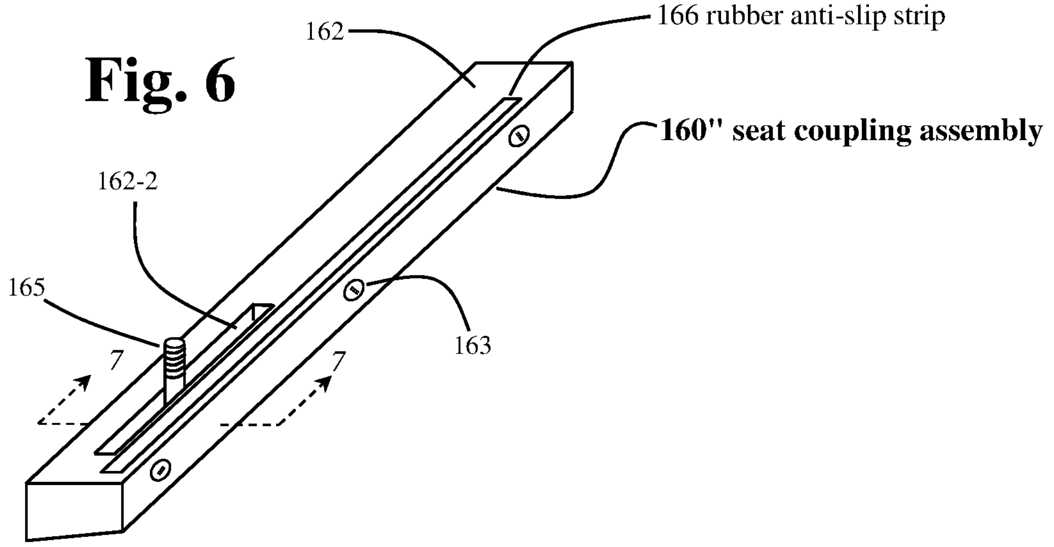
FIG. 6 is a perspective view of a seat coupling assembly of FIG. 1 and/or FIG. 2 in accordance with an embodiment of the invention.
Figure 7:
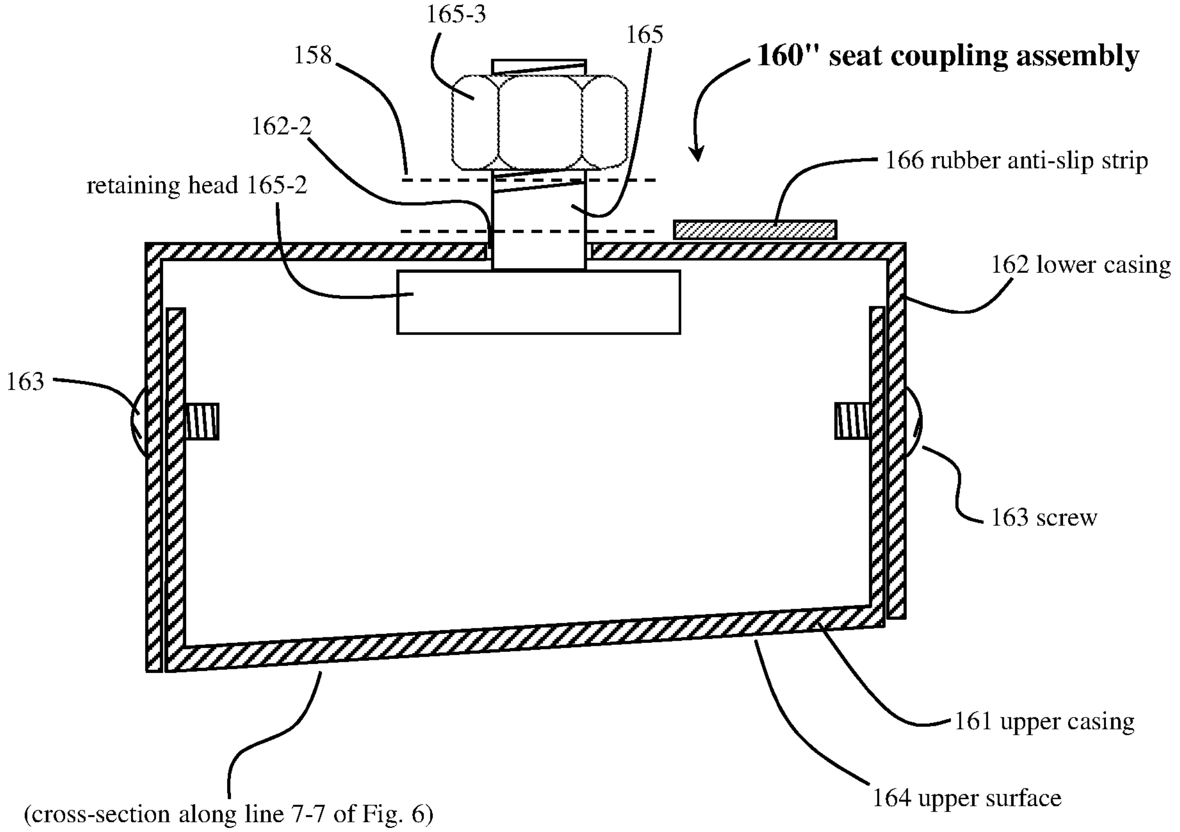
FIG. 7 is a cross-sectional view of the seat coupling assembly 160 of FIG. 6, in accordance with one embodiment of the invention.

FIG. 6 is a perspective view of a seat coupling assembly of FIG. 1 and/or FIG. 2 in accordance with an embodiment of the invention. More specifically, FIG. 6 is a perspective view of the right seat coupling assembly 160 (of FIG. 1 and/or FIG. 2) inverted, i.e. flipped over. Further, FIG. 7 is a cross-sectional view of the seat coupling assembly 160 of FIG. 6, in accordance with one embodiment of the invention. More specifically, FIG. 7 is a cross-sectional view of the seat coupling assembly along line 7-7 as shown in FIG. 6.

As shown in FIG. 7, the seat coupling assembly 160" includes an upper casing 161 and a lower casing 162. The upper casing 161 and the lower casing 162 may be constructed separately and may be constructed of sheet metal, for example. As shown in FIG. 7, sidewalls of the upper casing 161 may be slightly narrower in width vis-à-vis sidewalls of the lower casing 162—such that the casing 161 fits inside the casing 162. The casing 161 may be attached to the casing 162 such as by screws 163. However, other mechanical fastening techniques might be utilized, such as the casing 161 being crimped upon the casing 162. An upper surface 164, as shown in FIG. 7, of the upper casing 161 may be attached to a lower surface of the seat 130, such as by using a mechanical fastener and/or adhesive. As noted above, the orientation of the seat coupling assembly 160" is flipped over vis-à-vis the orientation shown in FIG. 1, for example.

Of particular note, the lower casing 162 includes a slot 162-2. The slot 162-2 accommodates a bolt 165 with bolt head 165-2. The bolt 165, along with screw nut 165-3, serves to secure the seat coupling assembly 160" to the rear support beam 155 (shown in phantom in FIG. 7). More specifically as shown in FIG. 7, the bolt 165 with bolt head 165-2 and screw nut 165-3 effectively sandwiches (there between) both the upper panel 158 (of the rear support beam 155) and the lower casing 162. This "sandwich arrangement" provides a mechanical arrangement in which the upper panel 158 (of the rear support beam 155) and the lower casing 162 are secured together in a loosely fitting manner. This might be performed, for example, by utilizing a locking screw nut 165-3. Illustratively, such locking screw nut 165-3 might utilize a nylon insert such that the screw nut maintains its position upon the bolt 165. This allows the seat coupling assembly 160" to move relative to the rear support beam 155. Accordingly, this effectively allows the seat to be moved forward or backward upon the support assembly 110 so as to adjust the position of the seat 130. Relatedly, the slot 156 in the rear support beam 155 allows travel of the bolt (within the slot 156) from left to right as shown in FIG. 1, for example. Accordingly, the arrangement of the seat coupling assembly 160 as shown in FIG. 6 and FIG. 7 provides a mechanical arrangement in which adjustment of the seat 130 is provided, i.e. both "front to back" and "left to right."

Relatedly, seat coupling assembly 160" may further be provided with a rubber anti-slip strip 166. The rubber anti-slip strip 166 is attached to the seat coupling assembly 160" such as by adhesive. Accordingly, in the arrangement as shown in FIG. 1, the rubber anti-slip strip 166 physically contacts both the front support beam 152 and the rear support beam 155. When under pressure, such as under the weight of a person or other object, the rubber anti-slip strip 166 engages both the front support beam 152 and the rear support beam 155 so as to prevent relative movement between each of the seat coupling assemblies 160 vis-à-vis each of the support beams 152, 155. However, when a person or other object is not disposed on the seat 130, the frictional pressure exerted by the rubber anti-slip strip 166 vis-à-vis the support beams 152, 155, is relieved. Indeed, the rubber anti-slip strips 166 may be slightly picked up so as to physically disengage from the support beams 152, 155. This physical disengagement is afforded by the loosely fitting "sandwich" arrangement of the bolt 165 secured to the upper panel 158 (of the rear support beam 155) and to the lower casing 162 (of the seat coupling assembly 160).

Figure 8:
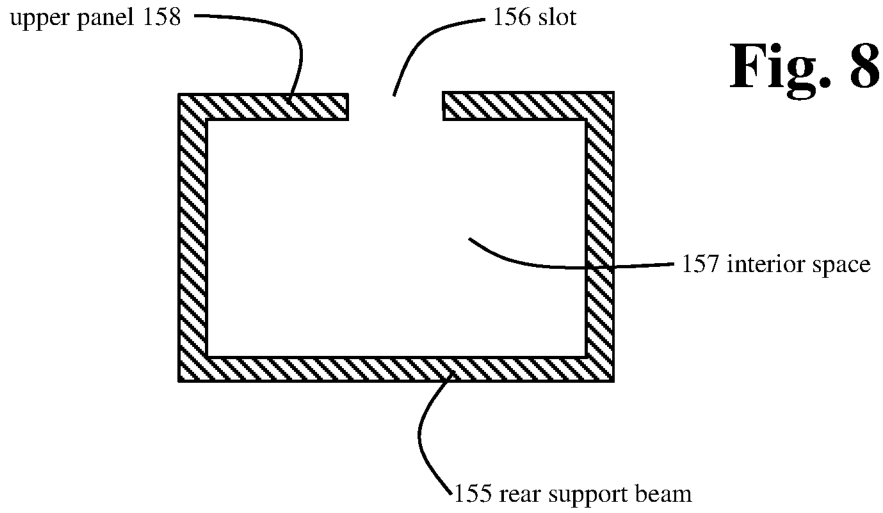
FIG. 8 is a cross-sectional view of the rear support beam 155 of FIG. 1, in accordance with one embodiment of the invention.

FIG. 8 is a cross-sectional view of the rear support beam 155 of FIG. 1, in accordance with one embodiment of the invention. As described above, the rear support beam 155 includes a slot 156 disposed in an upper panel 158 of the rear support beam 155. For simplicity of construction, the slot 156 may extend the entire length of the rear support beam 155, such as is shown in FIG. 1. However, it may be desirable (so as to limit travel of the seat from left to right) that the slot 156 only extend along a limited extant of the rear support beam 155. It is appreciated that assembly of the seat coupling assemblies 160, the front support beam 152, and the rear support beam 155 may be performed in a suitable manner, such as by sliding the nut 165-3 mounted bolt 165 in from a side of the rear support beam 155, i.e. prior to the rear support beam 155 being disposed in the support collars 151. Additionally, it is appreciated that small openings or apertures may be provided within the components so as to effectively reach screw heads and/or screw nuts, for example.

Figure 10:
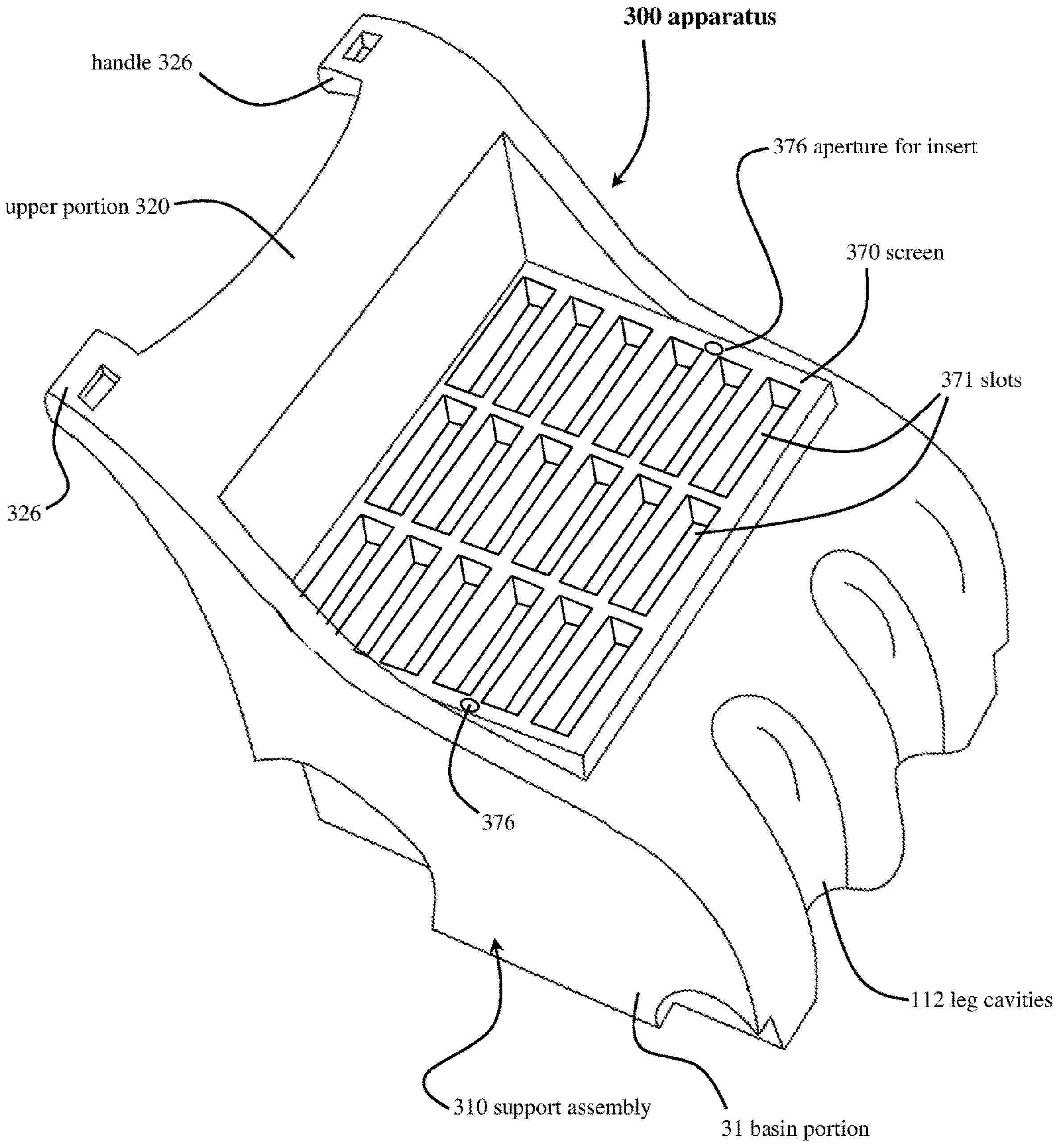
FIG. 10 is a perspective view of a further apparatus 300, in accordance with one embodiment of the invention.
Figure 11:
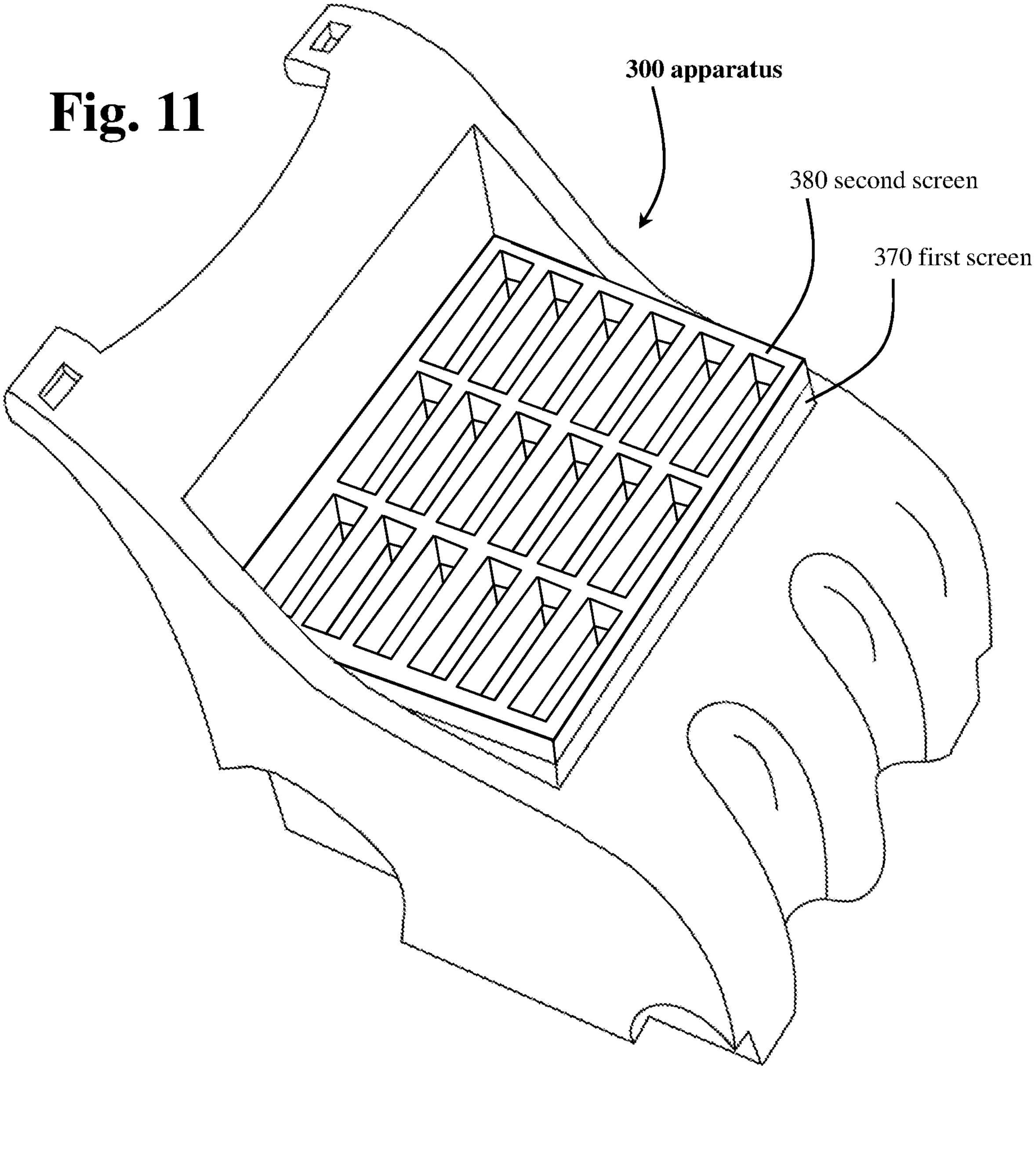
FIG. 11 is a perspective view of the apparatus 300 with a second screen 380 disposed upon the first screen 370, in accordance with one embodiment of the invention.

FIG. 10 is a perspective view of a further apparatus 300, in accordance with one embodiment of the invention. As shown in FIG. 10, the four wheels have been removed for purposes of illustration. The apparatus 300 includes a support assembly 310 of structure similar, in some ways, to the apparatus shown in FIG. 1. In particular, the support assembly 310 includes a basin portion 310 provided to hold fluid. Also, the apparatus 300, of FIG. 10, includes leg cavities 112 and an upper portion 320 with handles 326. However, the apparatus 300 differs from the apparatus 100 (FIG. 1) in regards to the structure that supports the seat and the seat itself. That is, in the embodiment of FIG. 10, the seat is supported by what is herein characterized as a screen 370. The screen 370 may be characterized as a "grated" type structure with a plurality of slots 371. It is appreciated that the shape of the slots 371 is not limited to that shown in FIG. 10. For example, the slots 371 might be round, oval or square, for example, as may be desired. The screen 370 is supported upon the support assembly 310 in a manner as described below. In addition, the screen 370 includes a plurality of apertures 376. The apertures 376 are provided to secure an additional screen, i.e. a second screen, upon the first screen 370. Accordingly, FIG. 11 is a perspective view of the apparatus 300 with a second screen 380 disposed upon the first screen 370, in accordance with one embodiment of the invention. It is appreciated that the variability in the number of screens effectively provides an easy way to adjust the height at which a person or other object is supported upon the apparatus 300. It is appreciated that additional screens may be utilized—in addition to the first screen 370 and the second screen 380 shown in FIG. 11.

Figure 12:
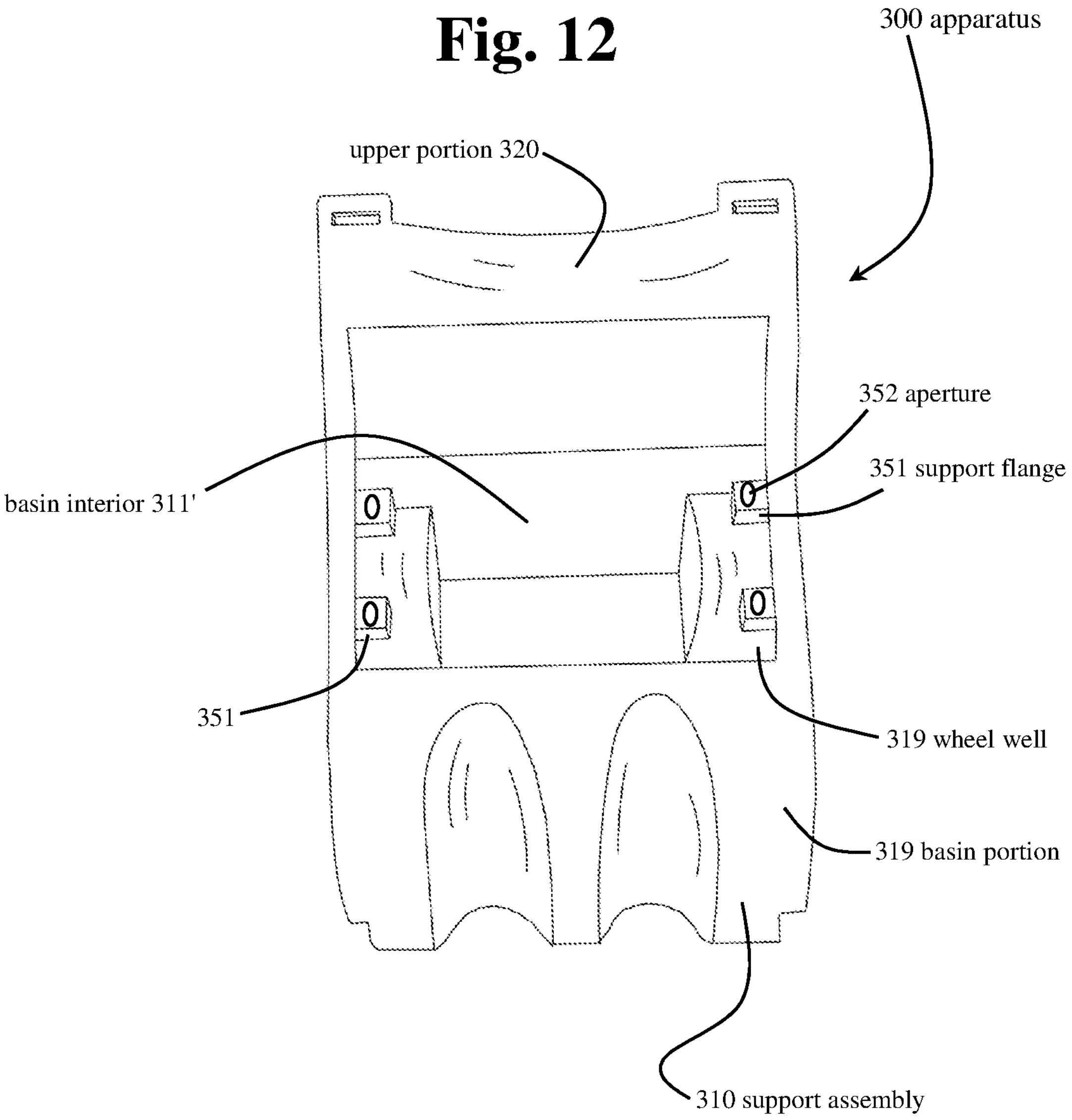
FIG. 12 is a top perspective view of the apparatus of 300, in accordance with one embodiment of the invention.

FIG. 12 is a top perspective view of the apparatus of 300, in accordance with one embodiment of the invention. As shown, the apparatus 300 includes a support assembly 310 and an upper portion 320. The support assembly 310 includes a basin portion 311 in similar manner to that shown in FIG. 1. Also, FIG. 12 shows a basin interior 311' in further detail. As described above, the basin interior 311' provides a fluid collection basin that may serve to collect water (resulting from bathing a patient disposed upon the apparatus 300, for example). As is shown in FIG. 12, the basin portion 311 may include opposing wheel wells 319, which may be molded into the basin portion 311. The opposing wheel wells 319 provide a volume that receives appropriately sized wheels, such as similar to the back wheels 119 shown in FIG. 1. It is appreciated that the various wheels described herein may be supported by suitable axles, bearings, and structural supports as would be obvious to the one of ordinary skill in the art given the disclosure of the invention.

Of particular note (regarding supporting the screens 370, 380) are a plurality of support flanges 351 shown in FIG. 12. As is shown, the support flanges 351 extend inwardly from the sidewall that forms the basin interior 311'. In accordance with one embodiment of the invention, the support flanges may simply be rectangular or square shaped structures that extend inwardly from the sidewalls. Each of the support flanges 351 may include a receiving aperture 352. The receiving aperture 352 interfaces with a pin type structure (or other protuberance) disposed on a screen, as is described in further detail below. The support flanges 351 may be integrally formed with the basin portion 311 or may be separately formed and mechanically attached to the basin portion 311 in some manner, such as with use of one or more screws. Accordingly, the plurality of support flanges 351 provide for support surfaces for the screen 372 rest upon. It is appreciated that the invention is not necessarily limited to the shape of the support flange shown in FIG. 12. The support flange 351 may be of some other suitable geometrical shape, such as round for example. Additionally, the invention is not limited to two support flanges 351 on each side. Rather, the pair of support flanges on a single side might be replaced by one elongated support flange. Such elongated support flange should be long enough to provide stability to the first screen 370 resting upon. Relatedly, it is appreciated that the support flanges 351 (FIG. 12) may indeed be switched out for the support collar 151 as shown in FIG. 1, and described above. With such variation, it is envisioned that a user is provided the capability to easily switch out between use of the screens 370, 380 and use of the seat support assembly 150 with seat 130 (FIG. 1). Accordingly, such an arrangement may provide substantial adaptability.

FIG. 13 is a section front view of the second screen 380 shown in FIG. 11, in accordance with one embodiment of the invention. That is, FIG. 13 shows the upper screen of FIG. 11. Also, FIG. 14 is a section front view of the first screen 370 of FIG. 11. That is, FIG. 14 shows the lower screen of FIG. 11. The first screen 370 includes apertures 376 as are also shown in FIG. 10. Additionally, the first screen 370 includes one or more pins 377. The pins 377 are disposed on the first screen 370 so as to be received in the apertures 352 (of the support flanges 351) as such are shown in FIG. 12. In addition, the first screen 370 includes a plurality of apertures 376. These apertures are also shown in the screen 370 (of FIG. 10). Relatedly, the second screen 380 includes one or more pins 387. The pins 387 are specially arranged so as to be received within the apertures 376 of the first screen 370. This results in the arrangement of the second screen 380 stacked upon the first screen 370, as is shown in FIG. 11.

Accordingly, as shown in FIGS. 13 and 14, the structure of the first screen 370 may be different vis-à-vis the structure of the second screen 380—in that the first screen 370 includes the additional apertures 376. However, it is appreciated that a plurality of screens of the same structure of the first screen 370 might be utilized, i.e. and not utilize the structure of the second screen 380. This would effectively allow stacking of 2, 3 or even more screens upon each other. However, it is appreciated that it may be beneficial to have a top positioned screen of the structure of the second screen 380. The reason for this is that the structure of the second screen 380 does not include the apertures 376. Such arrangement might be slightly more aesthetically pleasing, as well as to eliminate a standing water issue in the apertures 376. However, given the present disclosure, the particular arrangement may be varied as desired.

The structure of the first screen 370 and the structure of the second screen 380 may be constructed as desired. In accordance with one embodiment, the screens 370, 380 may be entirely integrally constructed, such as through a molding process. With such construction, the pins 377 would be integrally molded as a part of the first screen 370. In similar manner, the pins 387 would be integrally molded with the second screen 380. However, alternatively, the molding process of the first screen 370 might be constituted by each of the pins 377 being separately constructed hand in hand with the first screen being constructed with apertures to receive the pins 377. The pins 377 might then be glued, for example, within such receiving apertures. The second screen 380 might be constructed in similar manner, i.e. with the pins 387 being separately constructed and then adhesively secured within apertures formed in the second screen 380.

Figure 15:
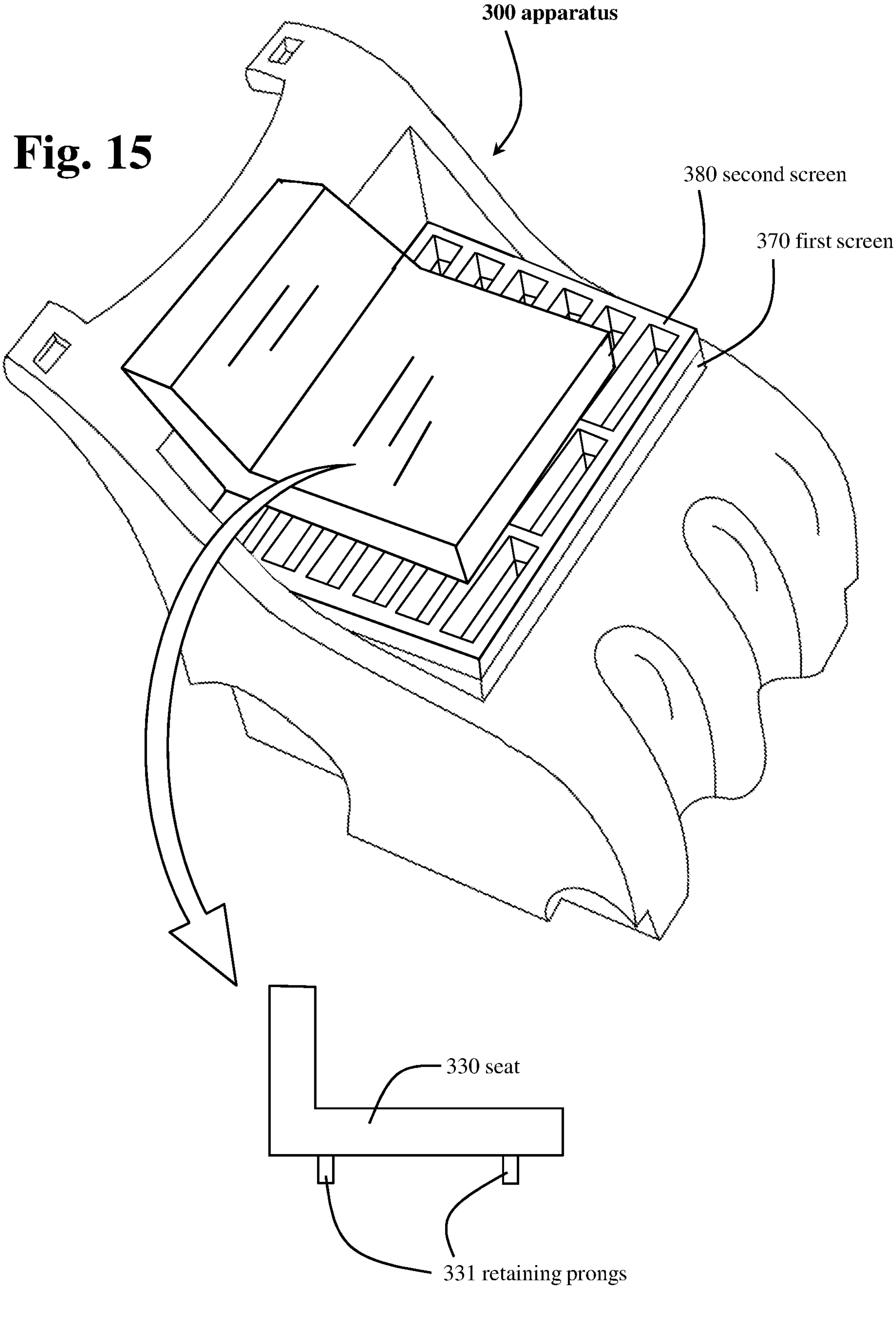
FIG. 15 is a further perspective view of the apparatus 300 of FIG. 11, in accordance with one embodiment of the invention.

FIG. 15 is a further perspective view of the apparatus 300 of FIG. 11, in accordance with one embodiment of the invention. In particular, FIG. 15 includes a seat 330, which is disposed on the second screen 380. In accordance with one embodiment, the seat 330 includes a plurality of retaining prongs 331. The retaining prongs 331 are received into the openings in the second screen 380. As result, the retaining prongs 331 serve to prevent relative movement between the seat 330 and the second screen 380. As described above, it is appreciated that the second screen 380 may be removed—and the seat placed on the first screen 370. In such an arrangement, the retaining prongs 331 would of course be received in openings of the first screen 370. Yet alternatively, is appreciated that a third screen might be added to the apparatus 300 is shown in FIG. 15, and the seat 330 placed upon the third screen. This would of course raise the seat relative to the height shown in FIG. 15.

The retaining prongs 331, including the size and shape of the retaining prongs 331, and the openings in the screens, including the size and shape of the openings in the screens, may be varied as desired. Additionally, it is appreciated that the shape of the seat, including the shape and dimension of the base and the back, may be varied as desired.

Figure 16:
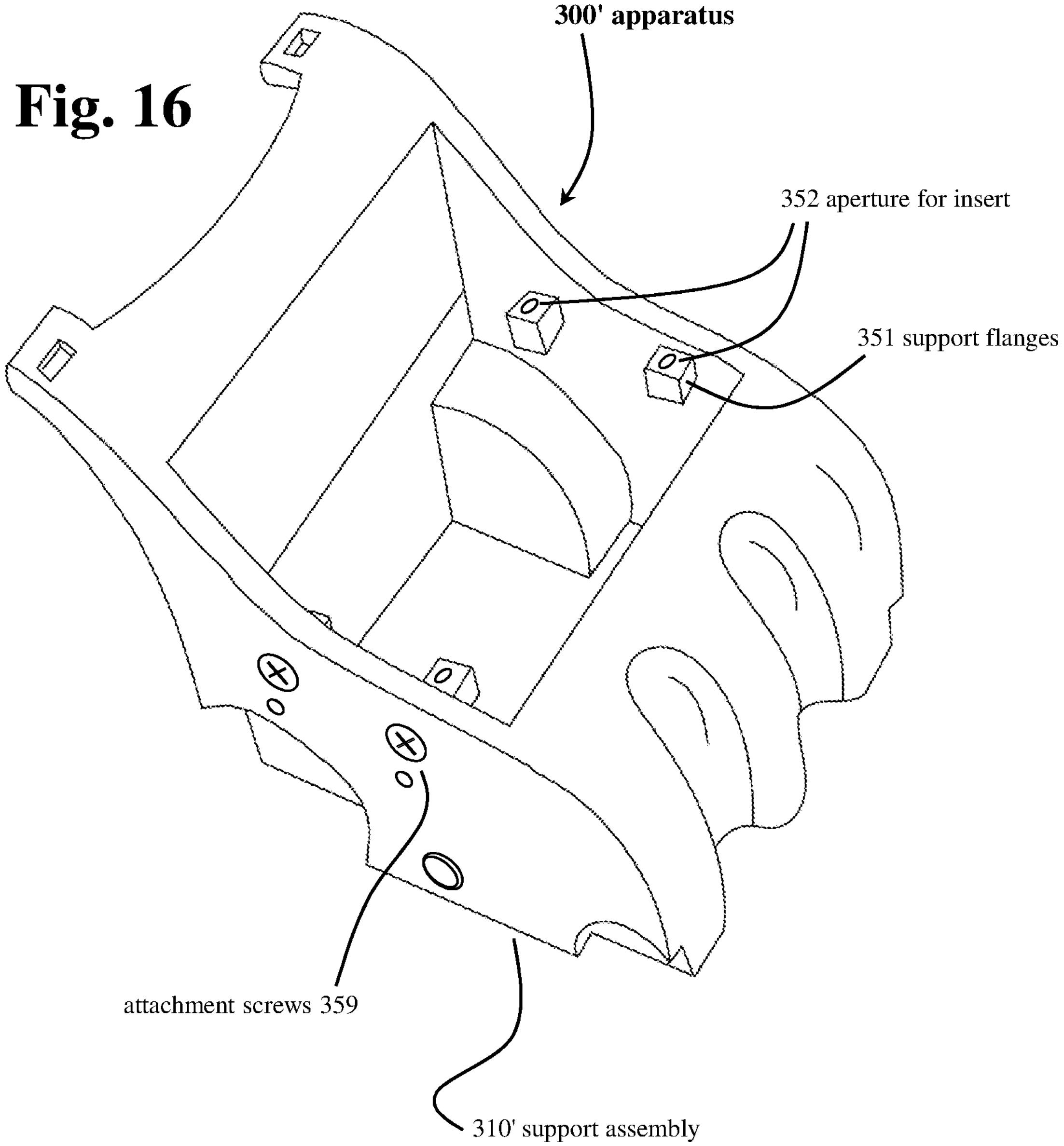
FIG. 16 is a perspective view of a further apparatus 300' in accordance with one embodiment of the invention.

FIG. 16 is a perspective view of a further apparatus 300' in accordance with one embodiment of the invention. As shown in FIG. 16, the apparatus 300' includes a support assembly 310. In similar manner to FIG. 12, the support assembly 310 includes support flanges 351. Additionally, the support flanges 351 each includes an aperture 352. As described above, such apertures 352 are provided to receive pins of a screen disposed upon the support flanges 351. FIG. 16 is provided to show a different perspective view of a support assembly 310 in accord with an embodiment. Additionally, the support assembly 310' is provided with attachment screws 359 to connect each support flange 351 to a sidewall of the support assembly 310'. Accordingly, in the embodiment of FIG. 16, the support flanges 351 are not integrally formed with the body of the support assembly 310'—rather the support flanges 351 are separately formed and then attached to the sidewall of the support assembly 310' via the attachment screws 359.

Figure 17:
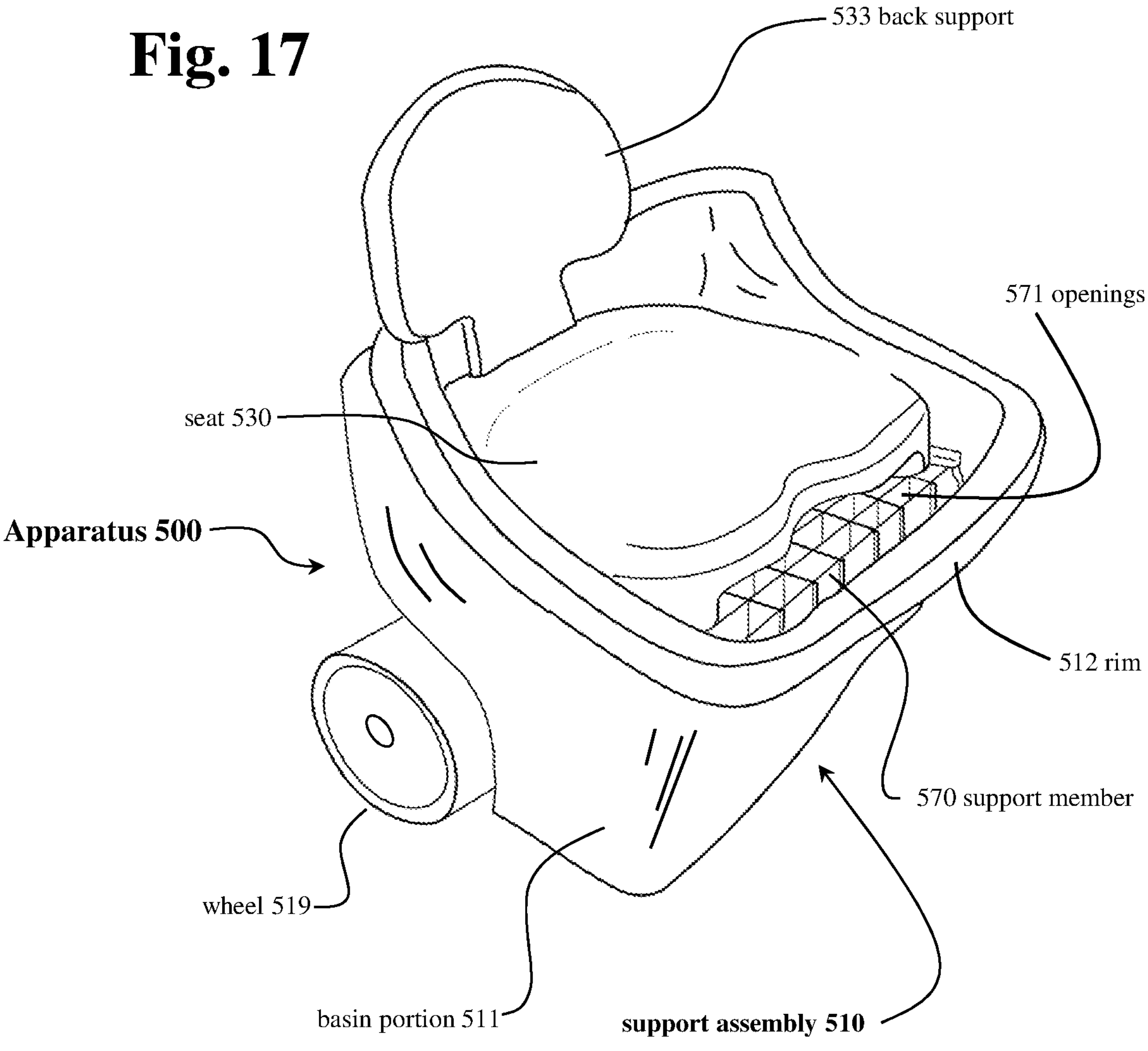
FIG. 17 is a perspective view of a further apparatus 500, in accordance with one embodiment of the invention.

FIG. 17 is a perspective view of a further apparatus 500, in accordance with one embodiment of the invention. As shown, the apparatus 500 includes a support assembly 510. As shown, the support assembly 510 may include a basin portion 511. The support assembly 510 may further include a pair of wheels 519. The apparatus 500 also includes a rim 512 extending around an upper edge of the basin portion 511. Accordingly, the rim 512 provides a useful structure to grab a hold of—so that one may lift or pull the apparatus 500. In particular, one might slightly lift up and pull the front of the apparatus 500, with the back of the apparatus 500 supported by the wheels 519.

Additionally, the apparatus 500 includes a support member 570. The interior of the basin portion 511 may be provided with support flanges, in a manner similar to the support flanges 351 of FIG. 12. Accordingly, the support member 570 may then rest upon such support flanges disposed on the interior of the basin portion 511. Also, the interior of the basin portion 511 may be tapered so as to support the support member 570 at a desired position within the basin portion 511. Lastly, the support member 570 may include legs that extend down to a bottom of the support assembly 510. Accordingly, the support member 570 may be supported in the basin portion 511 using various mechanical arrangements including a tapered interior of the basin portion 511 (which might include a molded shelf type arrangement), legs extending down from the support member 570, and/or support flanges extending inwardly and disposed on the interior of the basin portion 511, for example.

As is shown in FIG. 17, the apparatus 500 may further include a seat 530 and a back support 533, which is mounted to the seat 530. The seat 530 may be any suitable shape and dimensions, such as that shown in FIG. 17 or of a shape similar to that shown in FIG. 15. It is appreciated that the shape and dimension of the seat 530 vis-à-vis the shape and dimension of the support member 570 may be such that openings 571 (of the support member 570) are exposed both on the front and the sides of the seat 530. Such an arrangement allows fluid, such as water, to freely flow over the object being washed (and disposed on top of the seat 530). That is, the fluid can flow freely over the object being washed and have access to openings 571 to freely drain into the basin portion 511 either on the front of the seat 534 on the sides of the seat 530. It is appreciated that a larger area on the sides will provide more access for fluid to drain through the openings 571 on the side. It is appreciated that the seat 530 may be secured to the support number 570 in a suitable arrangement. For example, the seat 530 may be provided with prongs similar to those prongs shown in FIG. 15.

Figure 18:
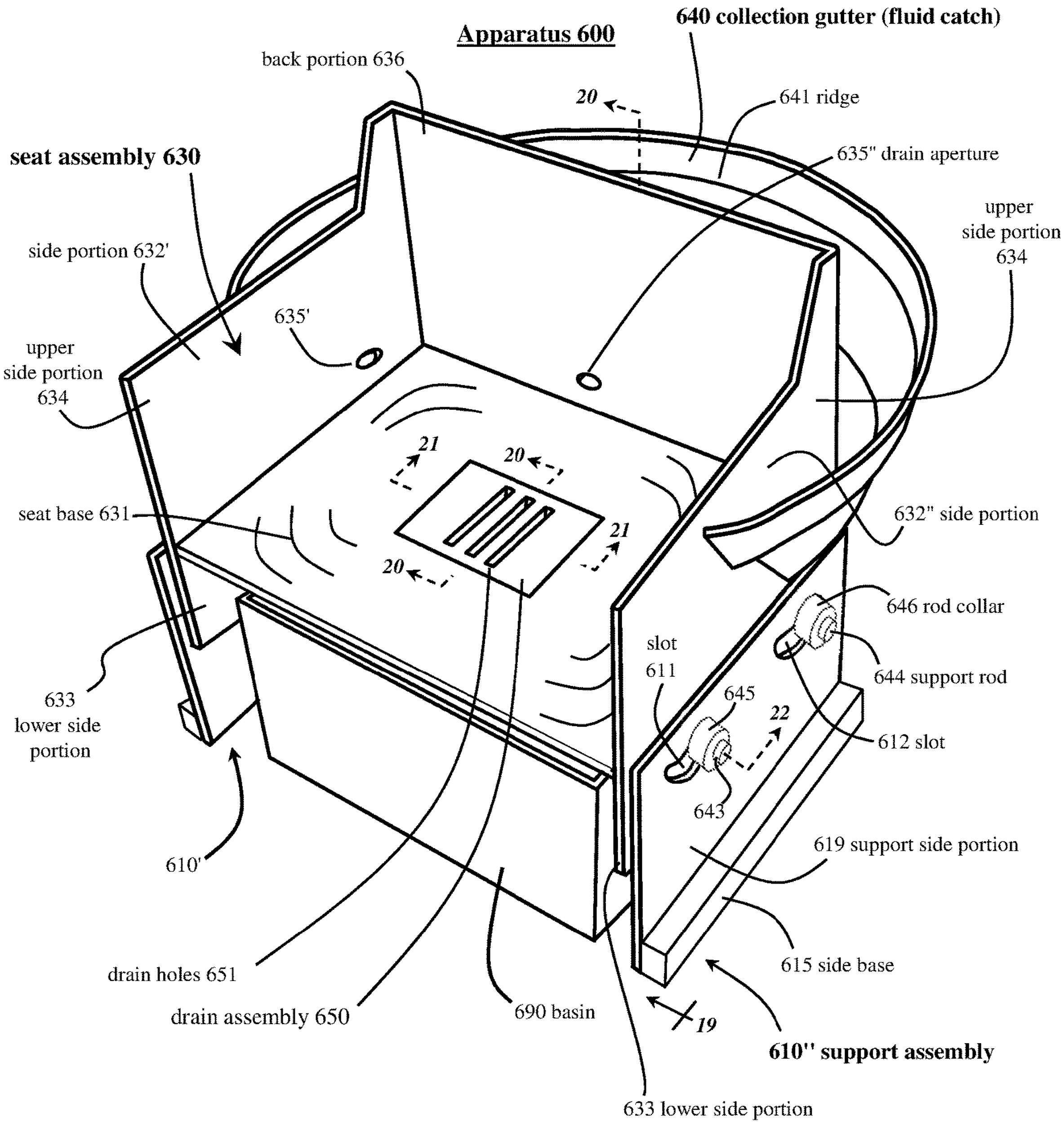
FIG. 18 is a perspective view of a further apparatus 600, in accordance with one embodiment of the invention.

FIG. 18 is a perspective view of a further apparatus 600, in accordance with one embodiment of the invention. The apparatus 600 includes a pair of support assemblies 610, including support assembly 610' on the left and support assembly 610" on the right, as shown in FIG. 18. Additionally, the apparatus includes a seat assembly 630 and a collection gutter 640. The collection gutter 640 functions as a fluid catch that surrounds the seat assembly 630. Additionally, as shown in FIG. 18, the apparatus 600 includes a drain assembly 650 and a basin 690. Each of these components, as well as various related features, are described below.

As shown in FIG. 18, the seat assembly 630 includes a seat base 631 and a plurality of side portions 632, including a left side portion 632' and a right side portion 632". Each of the side portions 632 include a lower side portion 633 and an upper side portion 634. Additionally, the seat assembly 630 includes a back portion 636. The two side portions 632 are each joined at a respective back edge to the back portion 636. Accordingly, the two side portions 632 together with the back portion 636 provide an enclosed area so as to contain and enclose an object disposed on the seat base 631.

The collection gutter 640 of the apparatus 600 is mounted outside of the side portions 632 and the back portion 636. As shown in FIG. 18, the collection gutter 640 effectively surrounds a backward portion of the seat assembly 630. The collection gutter 640 may be provided with a ridge 641 or other feature to provide structural integrity, i.e. in the nature of an I-beam. The collection gutter 640 may be attached to the seat assembly 630 through a mechanical fastener, using adhesive, or in some other suitable manner is desired. It is appreciated that the extent that the collection gutter 640 surrounds the seat assembly 630 may vary. For example, if the apparatus 600 is intended to be used primarily to wash hair, for example, then the collection gutter 640 might be disposed mostly at the back of the seat assembly 630, i.e. and not extend around the seat assembly 630 as much as in the situation of other applications. Specifically, such other applications might include the situation that the apparatus 600 is intended for use in washing the hair and body of a patient and/or varied sized objects. In such a situation, the apparatus 600 may be constructed such that the collection gutter 640 extends a substantial way up the side of each corresponding (opposed) upper side portions 634. Indeed, the collection gutter 640 might be constructed such that it extends around the entirety of the seat assembly 630, i.e. from the front edge of the upper side portion 634 on the left and around to the front edge of the upper side portion 634 on the right. The collection gutter 640 might be circular, oval, square, rectangular, or some other shape as desired.

The collection gutter 640 collects fluid as such fluid flows and/or drains off a person or other object being washed. As fluid is collected in the collection gutter 640, that fluid may in turn be drained, in accordance with one embodiment of the invention, through drain apertures 635 (including drain aperture 635' on the left-hand side, drain aperture 635" in the center and extending through the back portion 636, and drain aperture 635" on the right-hand side). Preferably, each of the drain apertures 635 may be disposed adjacent a bottom extent of the collection gutter 640—since such would allow most if not all of the fluid collecting in the collection gutter 640 to drain out, i.e. and eliminate pooling in the collection gutter 640.

As shown in FIG. 18, the seat assembly 630 is supported, in accordance with one embodiment of the invention, by a support assembly 610 disposed on each side of the apparatus 600. Specifically, the support assembly 610 includes a right support assembly 610' and a left support assembly 610". In particular, each support assembly includes a front slot 611 and a rear slot 612. Received in such slots 611, 612 is a respective support rod 643 and support rod 644. On each side, the support rod 643 is rigidly connected to the side portion 632 and extends outwardly from the side portion 632. In similar manner, on each side, the support rod 644 is rigidly connected to the side portion 632 extends outwardly from such side portion 632. Accordingly, on each side of the apparatus 600, the support rods 643, 644 respectively extend through the slots 611, 612 in the support assembly 610. Further, the support rods 643, 644 are retained in a respective slot 611, 612 utilizing a suitable retainment mechanism. Illustratively, as shown in FIG. 18, that retainment mechanism is simply a rod collar, disposed on each respective support rod 643, 644.

The shape of each slot 611, 612 may be elongated and curved. This allows the support rod 643 to slide along the extent of slot 611 hand-in-hand with the support rod 644 provided to slide along the slot 612. Given the relative curvature and angle of the slots 611, 612, this sliding arrangement effectively adjusts the angle and position of the seat assembly 630 relative to the support assembly 610. This arrangement, and the advantages provided thereby are further described below with reference to FIG. 22(A) and FIG. 22(B).

The apparatus 600 further includes a drain assembly 650, in accordance with one embodiment of the invention. The drain assembly 650 is disposed proximate the seat base 631. As shown, the drain assembly 650 includes a plurality of the drain holes 651. Relatedly, it is appreciated that the seat base 631 may be concave (as shown in FIG. 18) such that water, or other fluid, disposed upon the seat base 631 may drain into the drain assembly 650. As described further below, the drain assembly 650 may be removably seated in an opening in the seat base 631. Fluid entering the drain assembly 650 passes through the drain assembly into a suitable basin 690, in accord with the embodiment shown in FIG. 18. Also, in accord with some embodiments, fluid collecting in the collection gutter 640 may also drain into the basin 690. Various further aspects of the collection gutter 640, the drain assembly 650, the basin 690, the interrelationship between such features, and additional related features, are described below with reference to further FIGS. 19 and 20, for example.

The support assembly 610' on the left and the support assembly 610" on the right may be connected and structurally reinforced so as to adequately support the seat assembly 630 and be strong enough to support both the seat assembly 630 and an object disposed on the seat assembly 630. In particular, it is envisioned that the support beam may extend along the back of the apparatus 600 so as to structurally connect the support assembly 610' and the support assembly 610". Also, each side may include side base 615 attached along the lower edge of the support assembly 610". The side base 615 may serve to enhance the structural integrity of the support side portion 619 and serve to enhance the stability of the apparatus 600.

Figure 19:
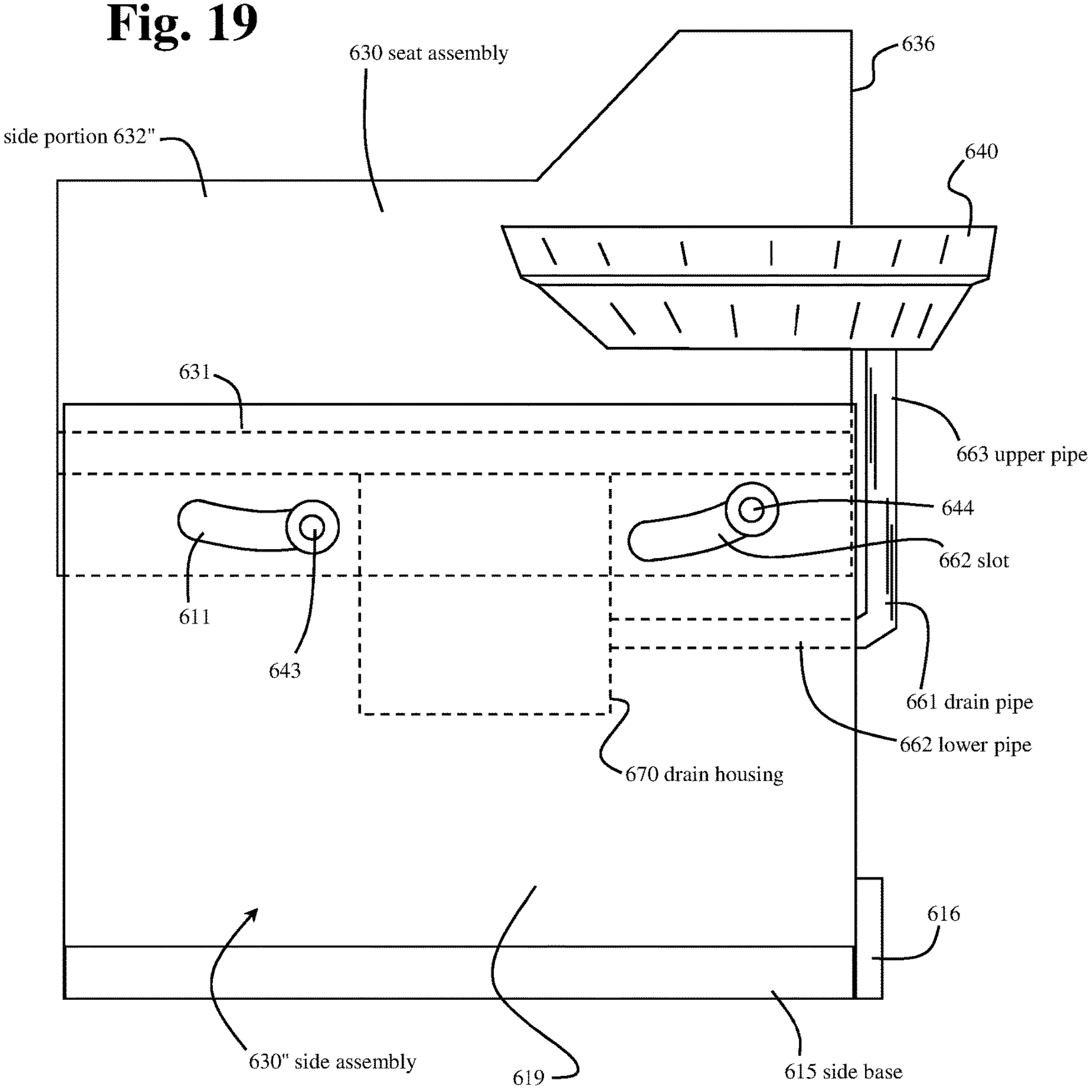
FIG. 19 is a side view of the embodiment of FIG. 18 (along line 19 as shown in FIG. 18), in accordance with one embodiment of the invention.

FIG. 19 is a side view of the embodiment of FIG. 18 (along line 19 as shown in FIG. 18), in accordance with one embodiment of the invention. FIG. 19 shows further detail of the side portion 632" (the right side portion is illustrated in FIG. 18) and shows further detail of the support assembly 610", including the side base 615. FIG. 19 further shows the position and the angle of the elongated slots 611, 612. As described above, it is appreciated that the slots 611, 612 may vary in position and orientation so as to provide for tilt of the seat assembly 630, as supported upon the support assembly 610. As shown in FIG. 19, as the seat assembly 630 is rotated clockwise—the support rod 643 will be moved to the left (as shown in FIG. 19) in the slot 611, and the support rod 644 will be moved to the left in the slot 612. Such movement will result in overall movement of the seat assembly 630 forward (i.e. to the left as shown in FIG. 19) and tilting of the seat assembly 630 backwards. Such adjustment may be desired in conjunction with washing a patient's hair, for example.

FIG. 19 additionally shows features of a drain pipe 661. In accord with embodiments, the drain pipe 661 serves to convey water or other fluid from the collection gutter to a drain housing 671, which extends downwardly from the seat base 631, in accordance with some embodiments of the invention. Various further details of the structure of the housing 671 as well as related features are described below.

More particularly, the drain pipe 661 may be characterized as including an upper pipe 662 and a lower pipe 663. The upper pipe 662 and the lower pipe 663 may be one continuous pipe, with the upper pipe extending vertically (along a substantially vertical axis) from the collection gutter 640 downwardly along a back side of the seat assembly 630. Hand-in-hand, the lower pipe 662 may extend from a lower terminus of the upper pipe 663 horizontally (along a substantially horizontal axis) to the housing 671. The size and shape of the drain pipe 661 may vary as desired. However, it is appreciated that the size of the drain pipe 661 should be sufficient so as to adequately carry the fluid from the collection gutter 640 to the housing 671, as well as large enough to allow cleaning and flushing of the drain pipe 661.

FIG. 19 also further shows the side base 615 and the back cross support 616. The size and particular dimensions of the side base 615 and back cross support 616 may vary as desired. For example, an increased height of the back cross support 616, as shown in FIG. 19, may be desired to provide increased structural strength.

Figure 20:
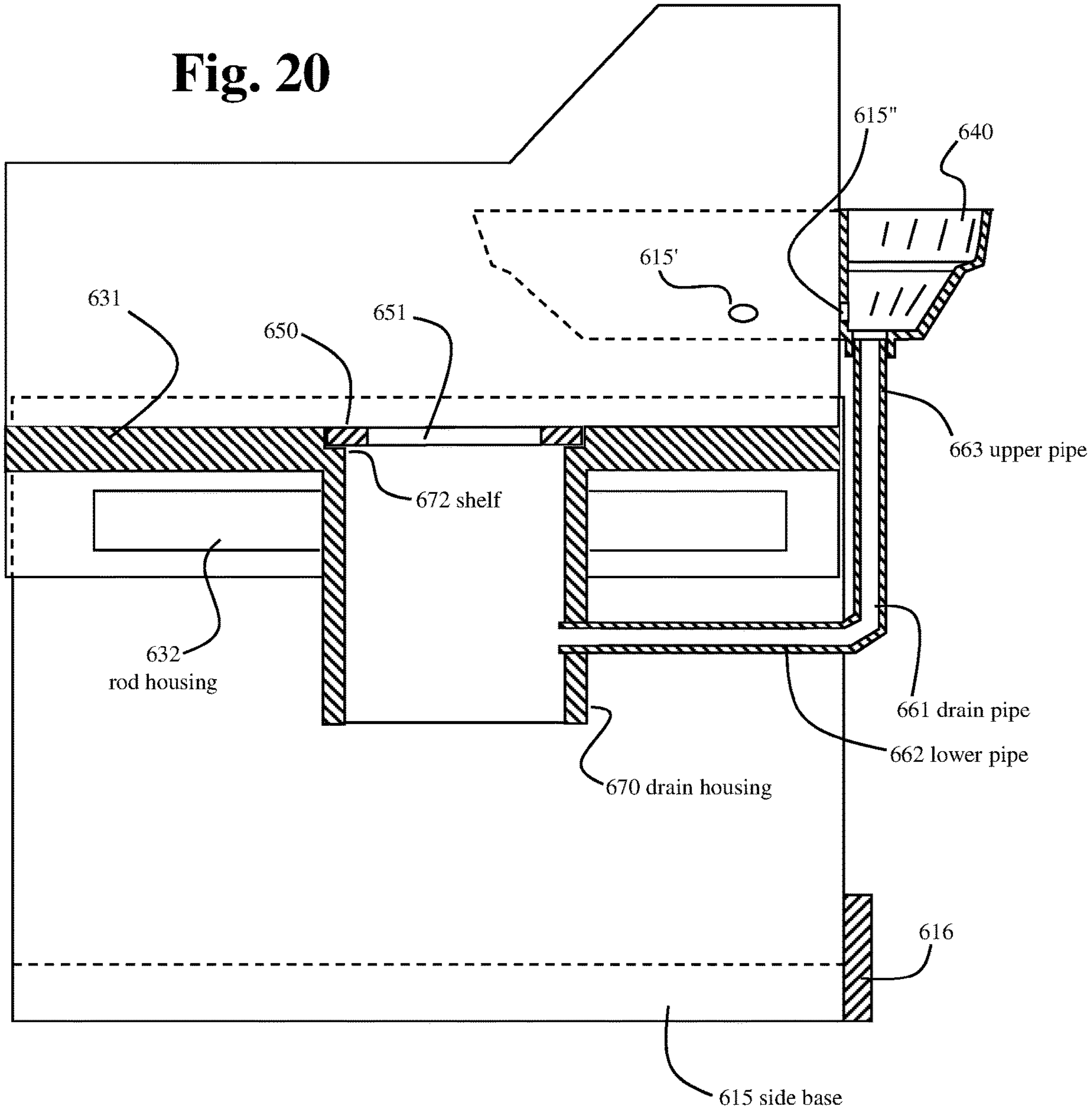
FIG. 20 is a side cross-sectional view of the embodiment of FIG. 18 (along line 20-20), in accordance with one embodiment of the invention.

FIG. 20 is a side cross-sectional view of the embodiment of FIG. 18 (along line 20-20), in accordance with one embodiment of the invention. FIG. 20 shows a cross-section of the seat base 631 and the drain housing 671 extending down from the seat base 631. Accordingly, in the embodiment of FIG. 20, the seat base 631 and the drain housing 671 are integrally formed, such as through a molding process. The drain housing may be in the shape of a square prism, rectangular prism, cylinder or some other shape as desired. Further, it may well be that the drain assembly 650 is rectangular while the drain housing 671 is shaped as a cylinder. The drain housing 671 includes a shelf 672 that extends at least on opposing sides as shown in FIG. 20. The drain assembly 650 is seated upon the shelf 672 such that the top of the drain assembly 650 is flush with the top of the seat base 631. In the example of FIG. 20, the drain assembly 650 is a rectangular plate that includes the drain holes 651. The drain assembly 670 may be more complex in arrangement as described below. In general, the purpose of the drain housing 671 is to convey water that drains from the seat base 631 (through the drain holes 651) into a further basin disposed below the drain housing 670. Alternatively, the drain housing 670 might be connected to a tube or pipe at the bottom—so as to convey fluid to a further receptacle.

FIG. 20 further illustrates the drain pipe 661. As shown, the drain pipe 661 is attached at an upper pipe end to the collection gutter 640. The drain pipe 661 is connected at a lower pipe end so as to pass through a sidewall of the drain housing 670 and into the volume formed by the drain housing 670.

Additionally, FIG. 20 shows a rod housing 637 that assists to provide securement of the support rods 643, 644 to the side portion 632. Further details of the rod housing are described below with reference to FIG. 24 in particular.

Figure 21:
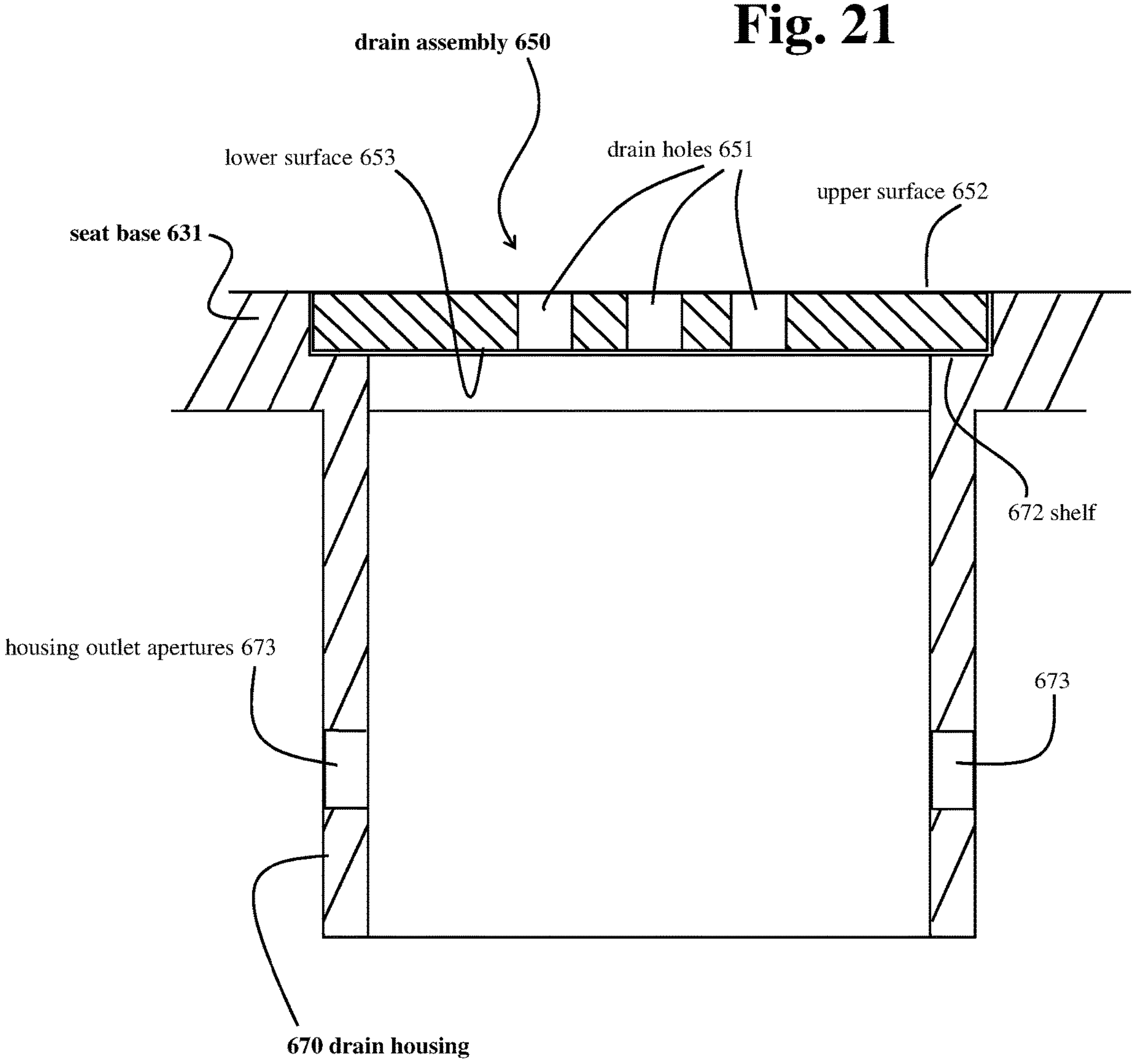
FIG. 21 is a cross-sectional view of the drain arrangement along line 21-21 of FIG. 18, in accordance with one embodiment of the invention.

FIG. 21 is a cross-sectional view of the drain arrangement along line 21-21 of FIG. 18, in accordance with one embodiment of the invention. As described above, the drain assembly 650 is seated upon a shelf 672 that extends around the perimeter at the top of the drain housing 670. The drain assembly 650 may be provided with any number of drain holes 651 in the shape and size as desired. Further, as shown in FIG. 20, the drain housing 670 is provided with housing outlet apertures 673. The housing outlet apertures 673 assist in allowing fluid, such as water, to exit from the interior of the drain housing 670. In particular, the housing outlet apertures 673 are needed when an end of the drain housing 670 becomes abutted with a lower surface of a basin, such as the basin 690 shown in FIG. 18. That is, the housing outlet apertures 673 may be needed when the end of the drain housing 670 becomes blocked for one reason or another. For example, the drain housing 670 might become blocked when the end of the drain housing 670 is in close proximity to the bottom of a basin and washed off material may block the clearance between the end of the drain housing 670 and the bottom of a basin.

Figure 22A:
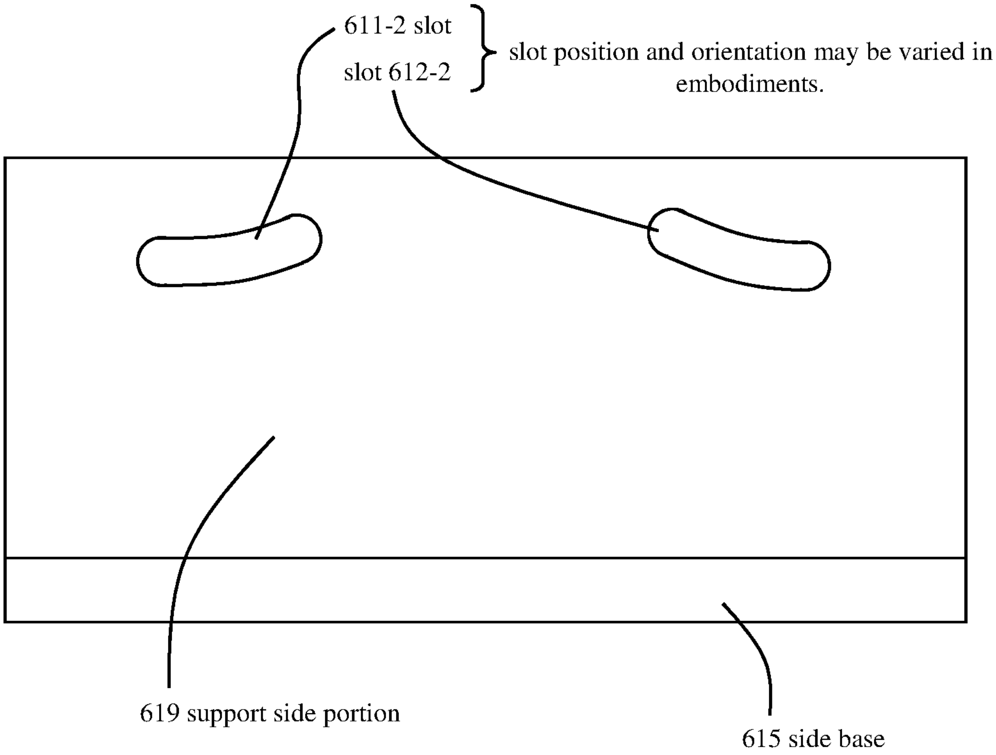
FIG. 22(A) and FIG. 22(B) are further side views of the support side portion 619, in accordance with embodiments of the invention.
Figure 22B:
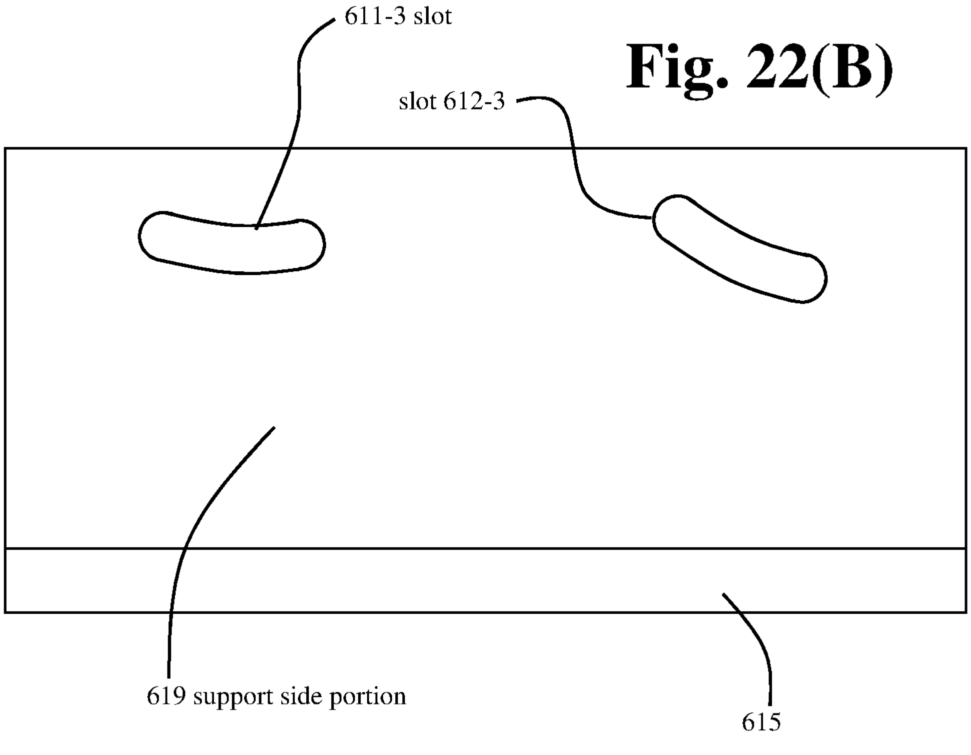

FIG. 22(A) and FIG. 22(B) are further side views of the support side portion 619, in accordance with embodiments of the invention. In particular, FIG. 22(A) and FIG. 22(B) further show how the position and orientation of slots 611, 612 that serve to support the support rods 643, 644 may be varied. FIG. 22(A) shows a support side portion 619 with slots 611-2 and 612-2. For purposes of comparison, FIG. 22(B) shows a support side portion 619 with slots 611-3 and 612-3. It is appreciated that change in the orientation of each respective slot (e.g. whether the back of each slot is higher than the front of each slot or vice-a-versa)—as well as the relative positioning between the slots—controls how the orientation of the support surface (e.g. seat) changes as the support surface is moved front-to-back and back-to-front.

Figure 23:
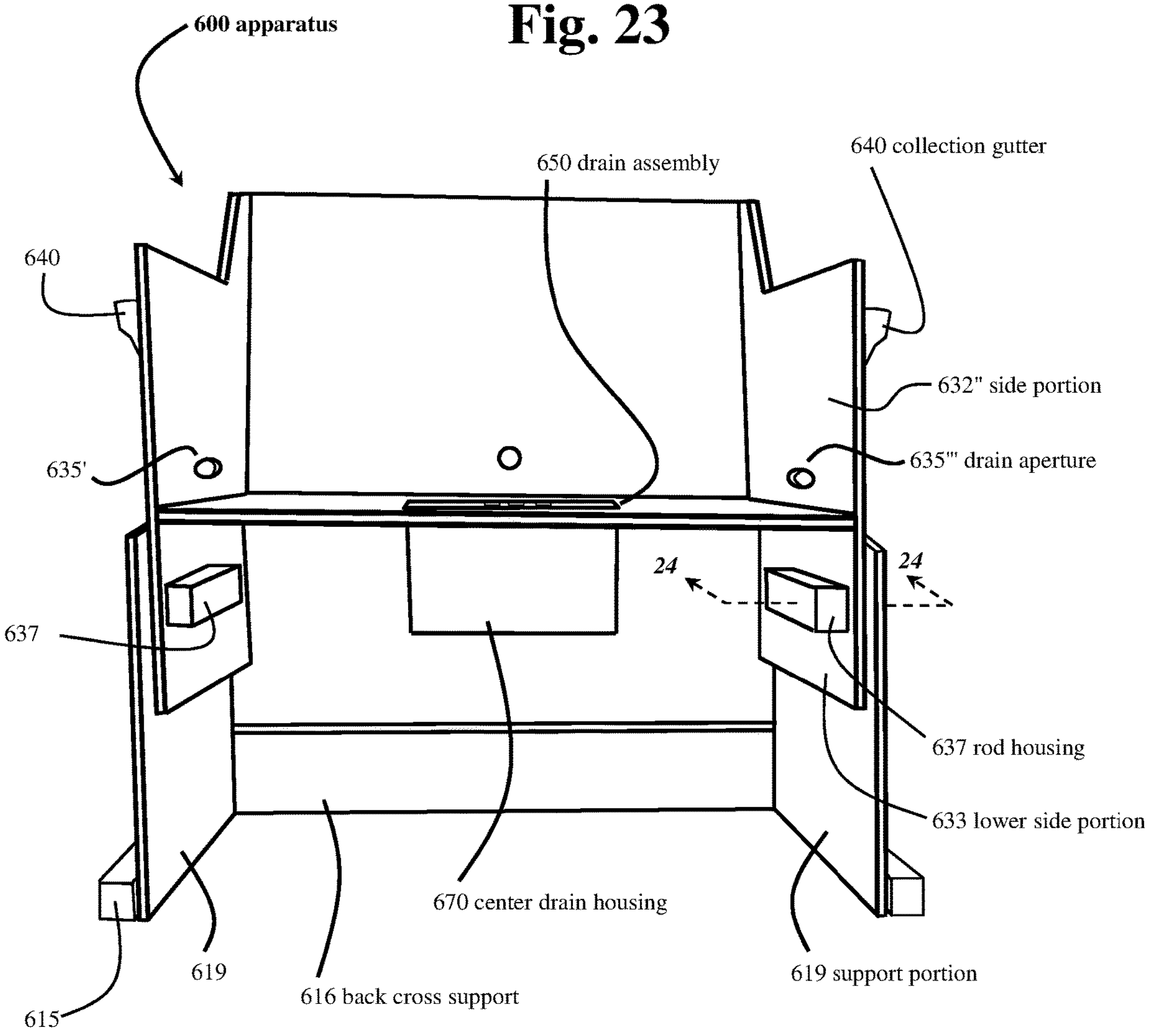
FIG. 23 is a perspective front view of the apparatus 600, in accordance with an embodiment of the invention.

FIG. 23 is a perspective front view of an apparatus 600, in accordance with an embodiment of the invention. In particular, FIG. 23 is provided to show rod housings 637 disposed on both sides of the apparatus 600. To explain in more detail, the apparatus 600, as shown in FIG. 23, includes side portions 632. Each side portion 632 (i.e. the left side portion 632' and the right side portion 632") include a lower side portion 633. Mounted on an interior side of the lower side portion 633 (on each side) is a rod housing 637. The rod housing 637 serves to fixedly secure support rods 643, 644. Further details of the structure of the rod housings 637 are described below with reference to FIG. 24. As described above, FIG. 23 also shows various other features described in embodiments including a center drain housing 670, the collection gutter 640, the drain assembly 650, and the back cross support 616.

Figure 24:
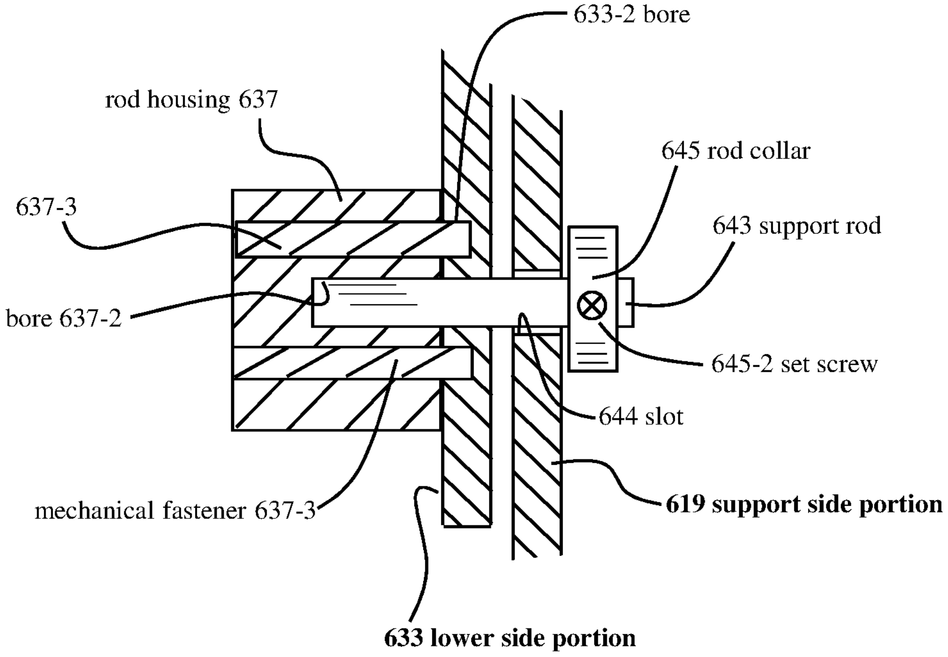
FIG. 24 is a cross-sectional front view along line 22-22 of FIG. 23, in accordance with one embodiment of the invention.

FIG. 24 is a cross-sectional front view along line 22-22 of FIG. 23, in accordance with one embodiment of the invention. More specifically, FIG. 24 shows construction of the rod housing 637, the manner in which the rod housing 637 supports the support rod 643 (see related FIG. 18) and related features.

The rod housing 637 is in the shape of a rectangular prism as shown in FIG. 24, in accordance with one embodiment of the invention. The rod housing 637 is fixedly attached to a corresponding lower side portion 633. Such attachment may utilize suitable mechanical fasteners 637-3 as shown. Such mechanical fasteners 637-3 may be in the form of threaded bolts or screws that are threadably received into and passing through the rod housing 637 into the lower side portion 633. However, it is of course appreciated that other arrangements might be utilized including the rod housing 637 and the lower side portion 633 being integrally formed, such as through a suitable molding process.

The rod housing 637 includes a bore 637-2 which receives the support rod 643. Relatedly, the lower side portion 633 includes a hole 633-2 through which the support rod 643 extends. The support rods 643 may be retained in bore 637-2 and hole 633-2 in any suitable manner, such as utilizing a friction fit, adhesive, and/or a set screw, for example. FIG. 24 also shows the rod collar 645. The rod collar 645 prevents the support rod 643 from slipping out of the lower side portion 633. Accordingly, the rod collar 645 is disposed along the length of the support rod 643 so as to loosely sandwich the lower side portion 633 between the rod collar 645 and the lower side portion 633. Hand-in-hand, the slot 644 is slightly larger than the diameter of the support rod 643. This arrangement allows for the support rod 643 to slide between the various positions in the slot 644.

Accordingly, FIG. 24 shows the structure of the rod housing 637 as it supports the support rod 643. It is appreciated that the same structure may be utilized to support the support rod 644 as is shown in FIG. 18. Relatedly, FIG. 23 shows the rod housing 637 in the shape of a rectangular prison which serves to support both the support rod 643 and the support rod 644. However, it is appreciated that separate and distinct structures might instead be utilized to support the support rods 643, 644. The rod housings on both the right side and the left side of the apparatus 600 may be of similar structure—and be mirror image of each other.

Figure 25:
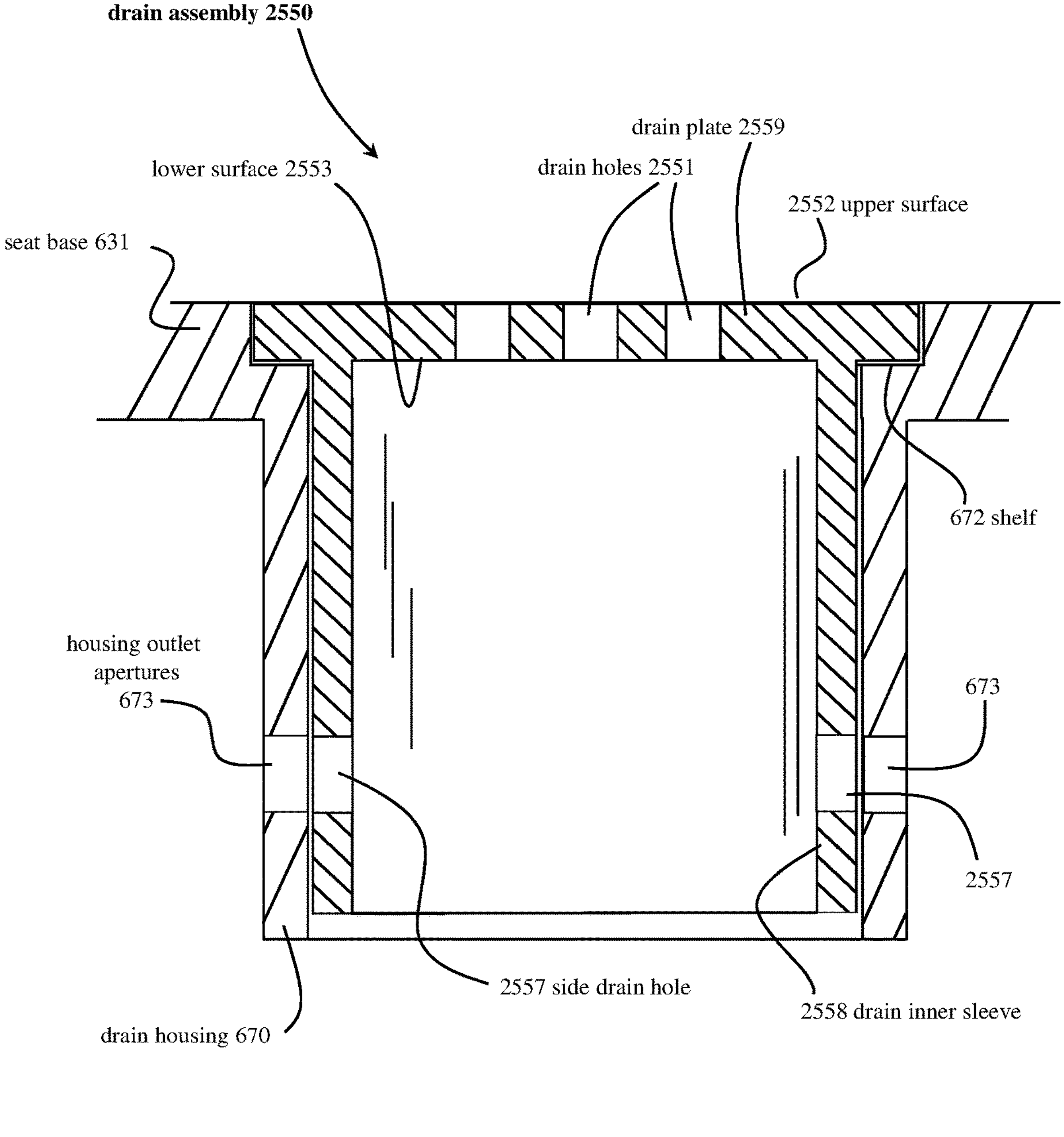
FIG. 25 is a cross-sectional view along line 21-21 of FIG. 18, in accordance with a further embodiment of the invention.

FIG. 25 is a cross-sectional view along line 21-21 of FIG. 18, in accordance with a further embodiment of the invention. Accordingly, the cross-sectional view of FIG. 25 is similar to the cross-sectional view of FIG. 21. However, the drain assembly 650 of FIG. 21 is varied vis-à-vis the drain assembly 2550 of FIG. 25.

To explain, FIG. 25 shows a drain assembly 2550 that is received into the seat base 631 and seated upon a shelf 672 in the seat base 631. The drain assembly 6550 includes a drain plate 2559. The drain plate 2559 includes an upper surface 2552 and a lower surface 2553. Extending downwardly from the lower surface 2553 is a drain inner sleeve 2558. The drain inner sleeve 2558 might be a cylinder or a rectangular prism, for example. The drain inner sleeve 2558 also includes side drain holes 2557. The side drain holes 2557 may match, i.e. be in alignment, with the housing outlet aperture 673. Such arrangement allows fluid to pass out of the drain inner sleeve 2558 in the situation where the end of the drain inner sleeve 2558 becomes blocked. As shown, the drain plate 2559 is provided with drain holes 2551. While not shown in FIG. 25, it is appreciated that the arrangement of FIG. 25 may be utilized in conjunction with the drain pipe 661 FIG. 20, for example. Such arrangement involves the drain inner sleeve 2558 being provided with apertures to match with the output end of the lower pipe 662 (as shown in FIG. 20)

Figure 26:
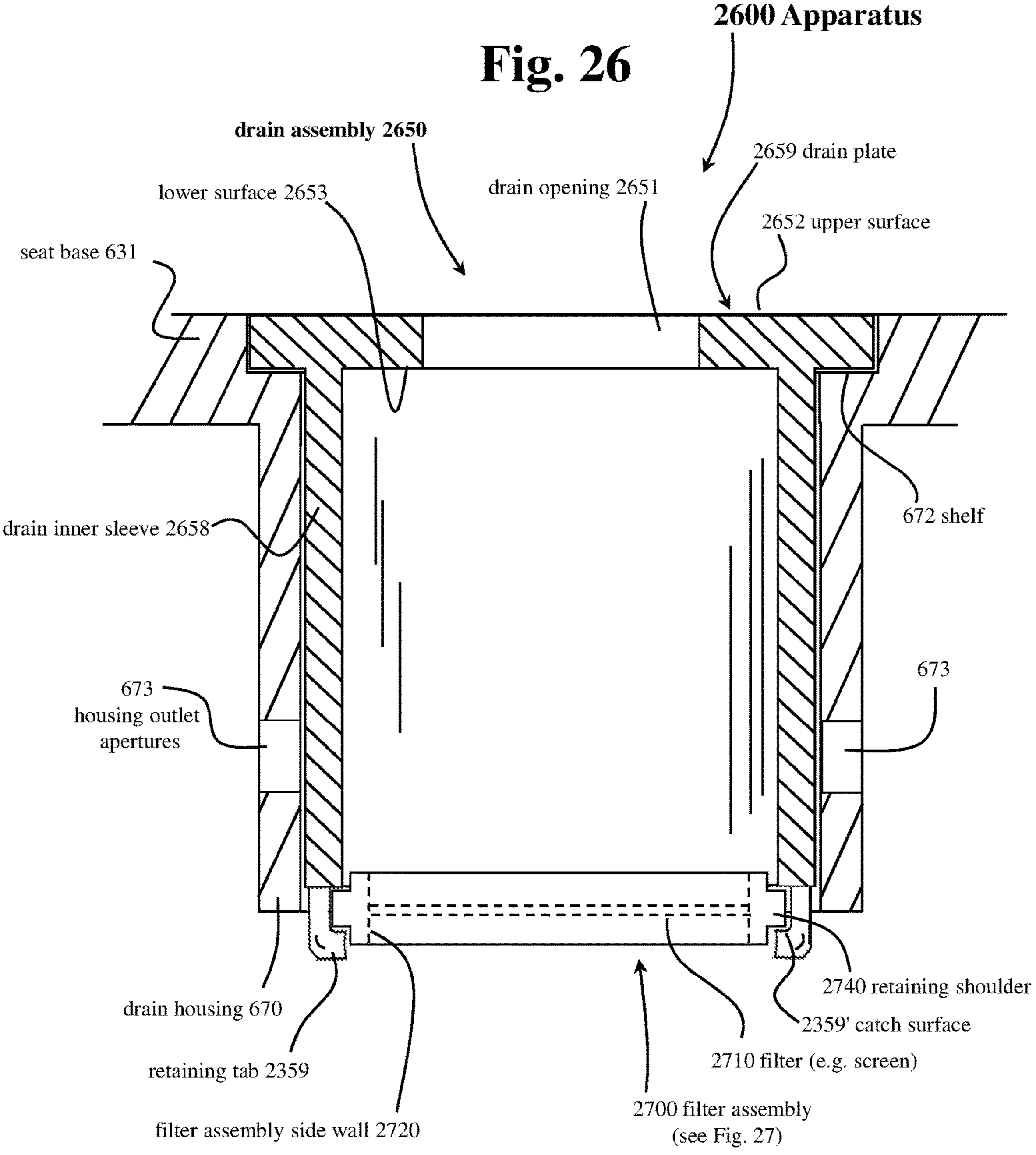
FIG. 26 is a further partial cross-sectional view of a drain assembly along line 20-20 of FIG. 18, in accordance with an embodiment of the invention.

FIG. 26 is a further partial cross-sectional view of a drain assembly along line 20-20 of FIG. 18, in accordance with an embodiment of the invention. In the embodiment of FIG. 26, a drain assembly 2650 includes a filter assembly 2700. Such an arrangement may be useful in any of a variety of situations in which an object is being washed—and it is desired that solid or semi-solid material be filtered away from fluid. Additionally, is appreciated that the arrangement of FIG. 26 may be useful in providing a portable toilet.

As shown, a drain assembly 2650 includes a drain plate 2659 with a drain opening 2651. The drain opening 2651 may be sufficiently large such that the apparatus 2600 may function as a portable toilet. However, it is appreciated that the arrangement of FIG. 26 might be used in a variety of situations, and the particular dimensions of the apparatus (including size of the drain opening 2651) may vary as desired. As noted above, the drain assembly 2650 may be utilized in the apparatus of FIG. 18 or in some other supporting apparatus. As used in the apparatus of FIG. 18, the drain assembly 2650 sits upon a shelf 672 in the seat base 631. The drain plate 2659 includes an upper surface 2652 and a lower surface 2653. The drain opening 2651 constitutes an opening that extends between the upper surface 2652 and the lower surface 2653. A drain inner sleeve 2658 is connected to and extends downwardly from the lower surface 2653 of the drain plate 2659. In accordance with one embodiment, the drain inner sleeve 2658 does not include any openings such that all fluids and/or materials passing through the drain opening 2651 must either pass through the filter assembly 2700 or be retained in the filter assembly 2700. Accordingly, the arrangement of FIG. 26 is not provided with drain holes akin to the side drain holes 2557 in FIG. 25.

The drain inner sleeve 2658 may be cylindrical in shape or in the shape of a square prism, or in some other shape as may be desired. However, the drain inner sleeve 2658 should of course be of the geometrical shape so as to be received within the drain housing 670, as shown in FIG. 26.

The filter assembly 2700 is disposed at a lower extent of the drain inner sleeve 2658 and effectively closes off the lower end of the drain inner sleeve 2658, i.e. such that fluid and/or material cannot escape without passing through (or being retained) by the filter assembly 2700.

Figure 27:
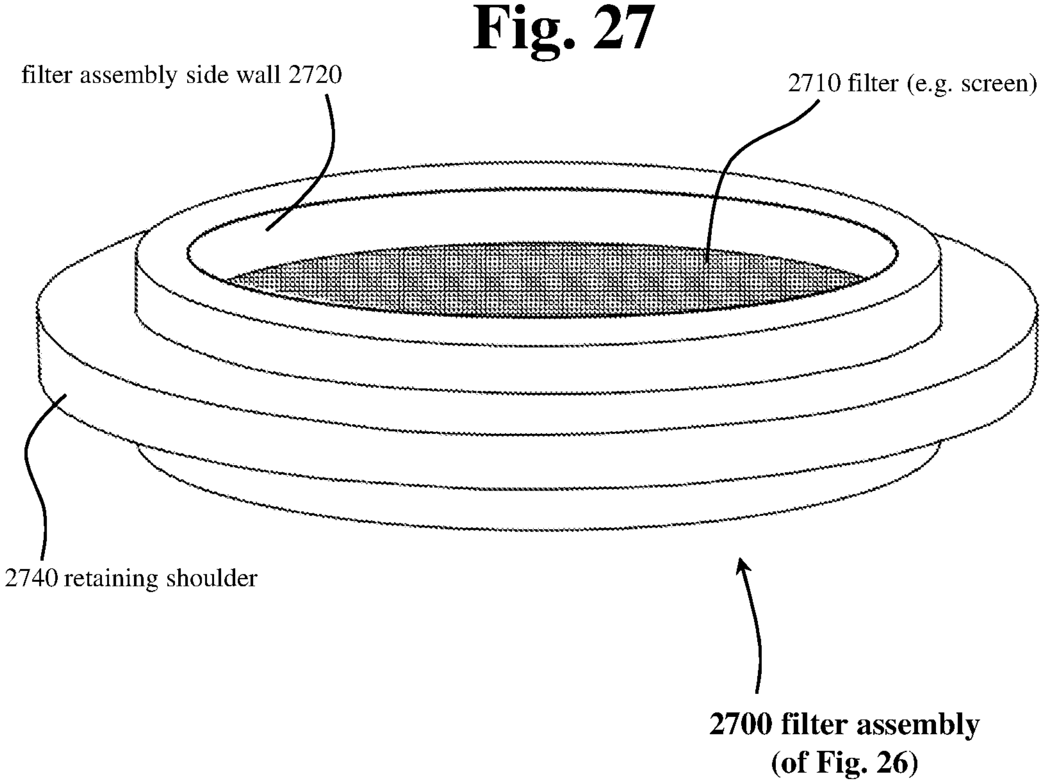
FIG. 27 is a perspective view of a filter assembly, in accordance with one embodiment of the invention.

FIG. 27 is a perspective view of a filter assembly, in accordance with one embodiment of the invention. The filter assembly 2700 includes a filter assembly sidewall 2720. An annular retaining shoulder 2740 is attached upon an outer diameter surface of the filter assembly sidewall 2720. It is appreciated that the filter assembly sidewall 2720 and the retaining shoulder 2748 may be formed integrally with each other. As shown in FIG. 27, a filter 2720 is supported by the filter assembly sidewall 2720. The filter provides a structure which is designed to allow fluids and other small materials to pass, while retaining larger objects. It is appreciated that the particular size mesh or other opening of the filter i.e. which might be characterized as a screen, may vary as desired.

Figure 28:
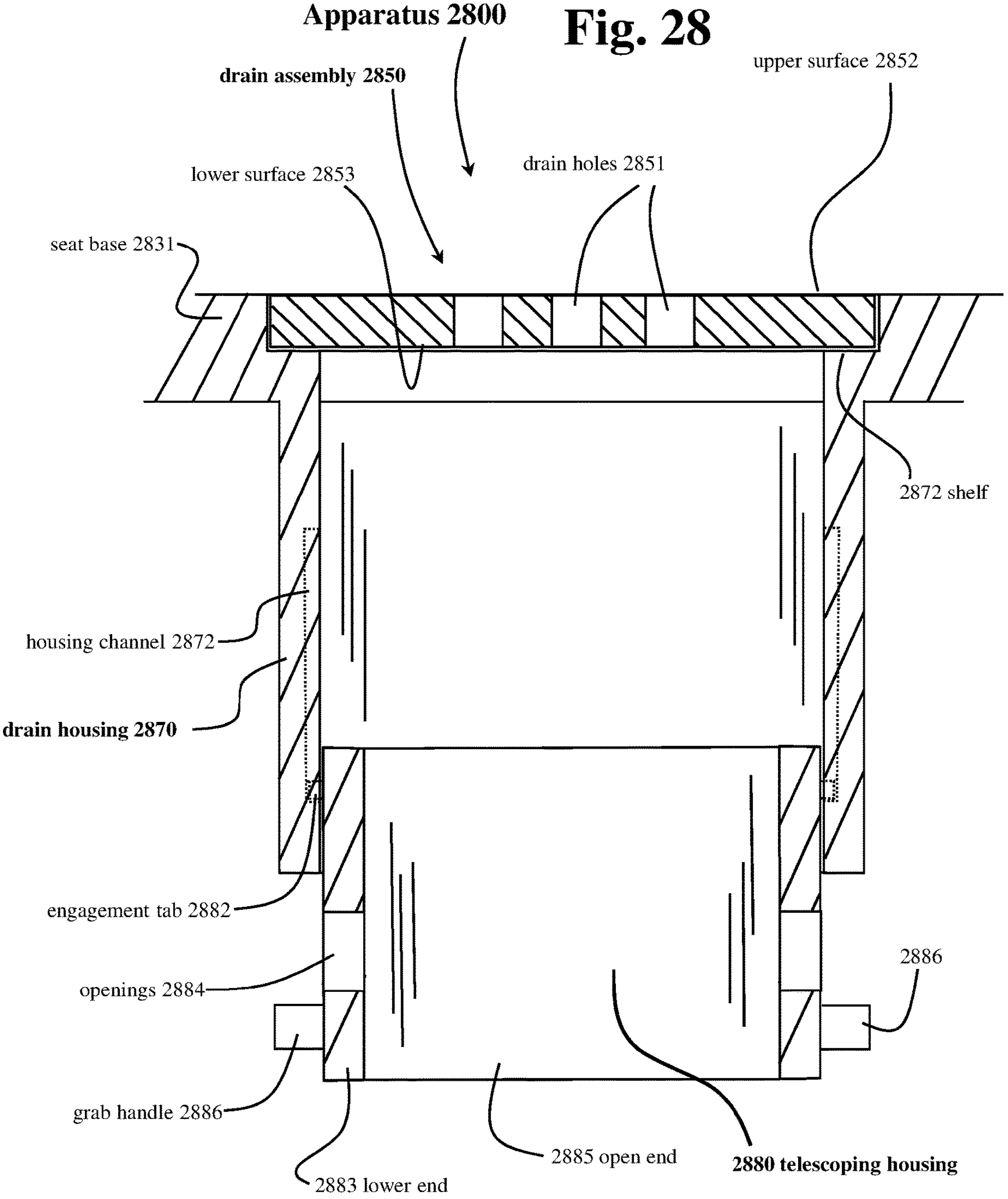
FIG. 28 is a further cross-sectional partial view of apparatus 2800 including a drain assembly with drain housing, in accordance with one embodiment of the invention.

In accord with one embodiment, the filter assembly 2700 may be retained in position by a plurality of flexible retaining tabs 2359 which extend from a lower surface of the drain inner sleeve 2658. The retaining tabs 2359 might, for example, be in the form of four flexible fingers that each include a catch surface 2359'. Indeed, each retaining tab might be approximately the size of a human finger, but may vary in size as desired. Each retaining tab 2359 may be bent outwardly to disengage the catch surface 2359' vis-à-vis the retaining shoulder 2740. Accordingly, upon disengaging one or two of the retaining tabs 2359, a user may remove the filter assembly 2700 from the drain inner sleeve 2658. In particular, the filter assembly 2700 might be illustratively removed so as to clean and/or empty the filter assembly 2700—or to replace the filter assembly 2700. Relatedly, is appreciated that the drain assembly 2650 may be removed from the seat base 631 first, and then the filter assembly 2700 removed from the drain inner sleeve 2658. Alternatively, the filter assembly 2700 may be removed with the drain inner sleeve 2658 disposed in the seat base 631. However, in yet a further embodiment, outward bending of the retaining tab 2359 may be prevented due to the position of the drain housing 670 vis-à-vis each retaining tab 2359. That is, it may be desired to construct the drain assembly 2650 and the drain housing 670 such that each retaining tab 2359 is precluded from flexing outwardly due to the position against the proximate drain housing 670 (as shown in FIG. 26). Indeed, it is appreciated that the length of the drain housing 670 may be further extended (as compared to the length shown in FIG. 26) so as to further ensure that the retaining tabs 2359 cannot be flexed outwardly (so as to release the filter assembly 2700). In such an arrangement, it is of course necessary (and by design) that the drain assembly 2650 be removed from the seat base 631—in order to remove the filter assembly 2700 from the drain inner sleeve 2658. FIG. 28 is a further cross-sectional partial view of apparatus 2800 including a drain assembly with drain housing, in accordance with one embodiment of the invention. More specifically, FIG. 28 shows a drain housing 2870 extending down from a seat base 2831. A drain assembly 2850 is received in the seat base 2831 and rests on a shelf 2872 in the seat base 2831. The drain assembly 2850 includes drain holes 2851. In the embodiment of FIG. 28, the drain assembly 2850 includes a plate-like structure which includes a lower surface 2853 and an upper surface 2052. Further, the drain assembly 2050 includes a plurality of drain holes 2051. Accordingly, the drain assembly 2850, as distinct from the drain assembly of FIG. 26, does not include an inner sleeve extending down. As shown in FIG. 28, the drain housing 28 may be integrally formed with the seat base 2831, in accordance with one embodiment of the invention—or alternatively may be formed as a separate piece.

Of particular note, the apparatus 2800 of FIG. 28 includes a telescoping housing 2880. The telescoping housing 2880 is telescopically received within the drain housing 2870. As shown in FIG. 28, the telescoping housing 2880 is disposed at its lowermost position. The housing 2880 may be raised (i.e. telescopically received within the drain housing 2870). Accordingly, in a raised position, a basin may be slid under the drain housing 2870. Once a basin (such as the basin 2890 shown in FIG. 29 or the basin 3090 shown in FIG. 30) is disposed under the drain housing 2870, the telescoping housing 2880 may then be lowered into the basin. Accordingly, the arrangement of FIG. 28 provides an enclosed conduit to transfer fluids and other materials (washed from an item) into the basin disposed below the drain assembly 2050. In particular, the lower end 2083 may be disposed proximate the bottom of a basin and thus prevent splashing. It is appreciated that openings 2884 may be disposed proximate the lower end 2883 of the telescoping housing 2880. Such openings 2084 may allow the passage of fluid and other materials out the side of the telescoping housing 2880. The openings 2084 may in particular be useful if the lower end 2085 of the housing 2880 is very close to or against the bottom of the basin (in such manner that the open end 2885 of the telescoping housing 2880 might become blocked.

FIG. 28 shows one example of structure that allows the telescoping housing 2880 to be telescopically received within the drain housing 2870, in accordance with one embodiment of the invention. The telescoping housing 2080 is provided with engagement tabs 2882. Such engagement tabs 2882 may be in the form of plastic or metal pins that extend outwardly from the telescoping housing 2880. The engagement tabs 2882 are received within a housing channel 2872 in the drain housing 2870. The housing channel 2872 may be constituted by an elongated slot or channel vertically disposed in the inner wall of the drain housing 2870. Accordingly, the engagement tab 2882 is provided to slide (vertically) along the length of the housing channel 2872. It is appreciated that the dimensions of the drain housing 2870 and telescoping housing 2880—and the distance of telescopic movement of the telescoping housing 2880 within the drain housing 2870—may be varied as desired. In accord with one embodiment, the telescoping housing 2880 may be toleranced so as to frictionally engage the drain housing 2870. Such a relationship may provide for the telescoping housing 2880 to be pushed to a particular height—and frictionally retained at that height. On the other hand, in other embodiments, it may be desired to construct the telescoping housing 2880 such that it loosely fits within the drain housing 2870. In such an arrangement, it would be needed for the user to hold the telescoping housing "up" so as to remove a basin, for example and illustratively. The telescoping housing 2880 may be provided with one or more grab handles 2886 or similar structure, so as to assist in manipulation of the telescoping housing 2880.

It is appreciated that the drain assembly 2850, the drain housing 2870, and the telescoping housing 2880 may be dimensioned and shaped as desired. For example, the drain assembly 2850 as well as the drain housing 2870 and telescoping housing 2880—might be circular, oval or square, for example.

Figure 29:
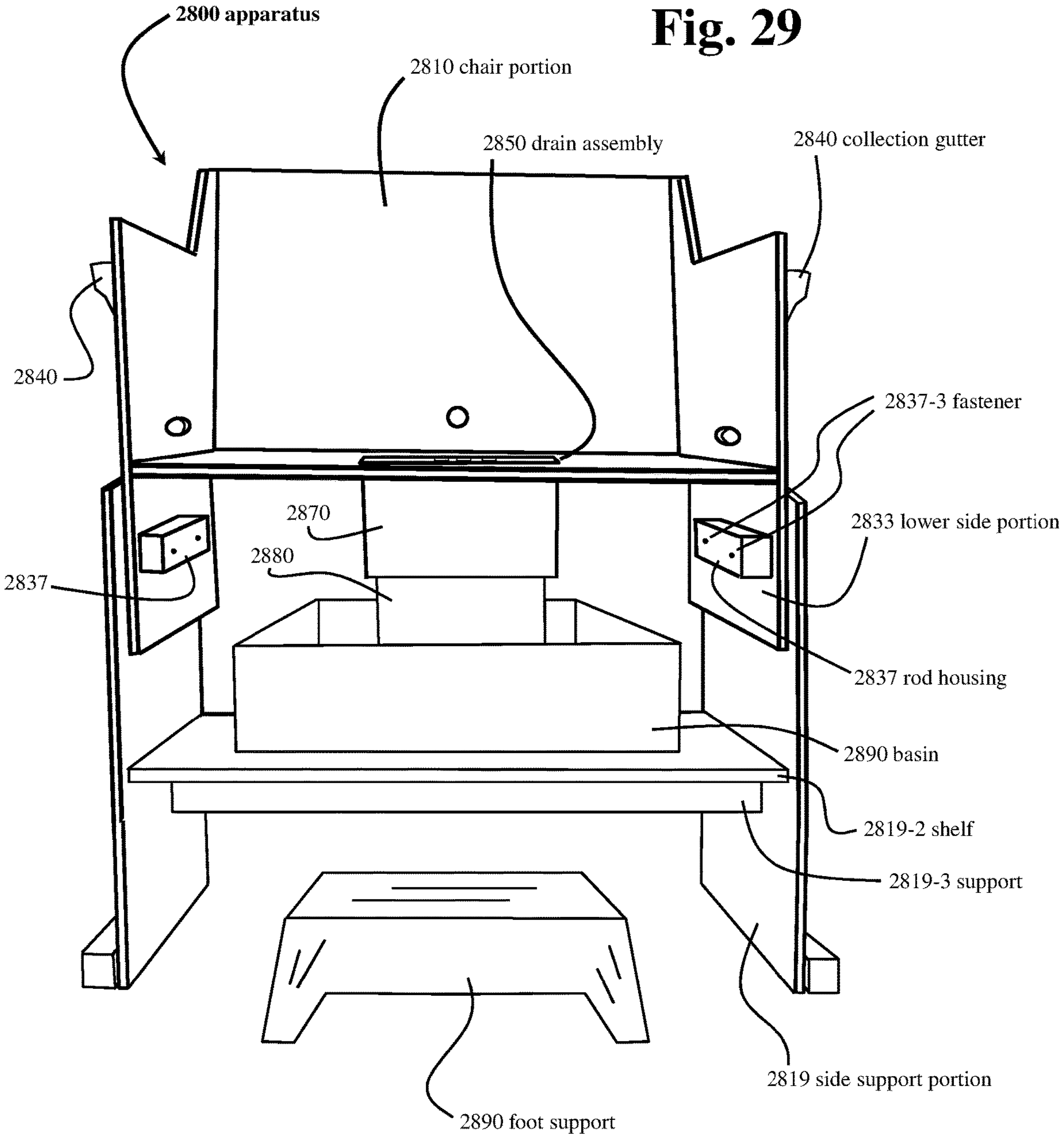
FIG. 29 is a front perspective view of a further apparatus 2800, in accordance with one embodiment of the invention.

FIG. 29 is a front perspective view of a further apparatus 2800, in accordance with one embodiment of the invention. Of particular note, the apparatus 2800 is provided with a telescoping housing as described above with reference to FIG. 28, as well as with a shelf 2819-2 that supports a basin 2890.

More specifically, the apparatus 2800 of FIG. 29 includes a chair portion 2810. A collection gutter 2840 extends around the chair portion 2810 in the manner described above with reference to FIG. 18. In manner as described above, the chair portion 2810 includes side portions (on each side) that includes a lower side portion 2833. The lower side portion 2833 is connected to a side support portion 2819 in manner as described above, i.e. including rod housings 2837 that support pins that engage with the side support portion 2819. Each rod housing 2837 is connected to a lower side portion 2833 via mechanical fasteners 2837-3, in the manner described above with reference to FIG. 24.

FIG. 29 shows various components of a drain arrangement, in accordance with one embodiment of the invention. In particular, FIG. 29 shows a drain assembly 2850, as well as a drain housing 2870 and a telescoping housing 2880.

The apparatus 2800 includes a shelf 2819-2 that extends between opposing side support portions 2819. The shelf 2819-2 may be supported by a vertically oriented support 2819-3. As shown, the support 2819-3 is provided to extend also between the side support portion 2819. The basin 2890 is disposed upon the shelf 2819-2. It is appreciated that to position the basin 2890 upon the shelf (or to remove the basin 2890 from the shelf 2819-2) it is needed for the user to raise the telescoping housing 2880 in the manner as described above with reference to FIG. 28.

As shown, the apparatus 2800 may also include a foot support 2890. The foot support may be used to assist a patient in sitting down or standing up from the chair portion 2810. In addition, the support 2890 may be of benefit to support a patient's feet—when a patient is disposed upon the chair portion 2810 and being washed.

Figure 30:
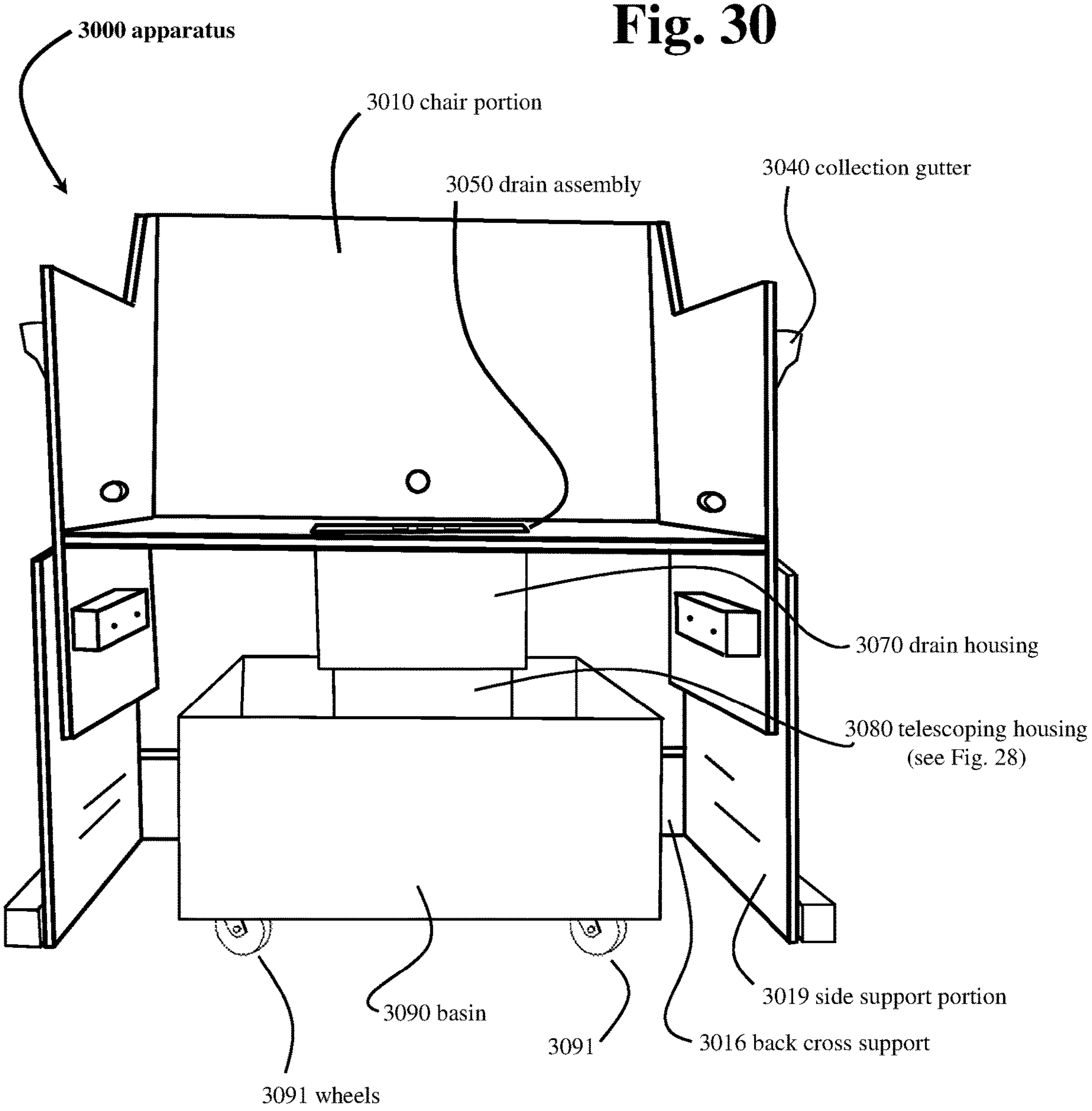
FIG. 30 is a front perspective view of a further apparatus 3000, in accordance with one embodiment of the invention.

FIG. 30 is a front perspective view of a further apparatus 3000, in accordance with one embodiment of the invention. As shown, the apparatus 3000 includes a chair portion 3010 and a collection gutter 3040 disposed around the chair portion 3010.

FIG. 30 shows various components of a drain arrangement, in accordance with one embodiment of the invention. In particular, FIG. 30 shows a drain assembly 3050, as well as a drain housing 3070 and a telescoping housing 3080.

In contrast to the arrangement of FIG. 29 with a shelf that supports a basin, the arrangement of FIG. 30 includes a basin 3090 on wheels 3091. Accordingly, the basin 3090 may be easily moved to and positioned underneath the chair portion 3010, as well as easily removed from underneath the chair portion 3010 (and then wheeled to a convenient location for emptying of the basin, such as adjacent a shower stall). In order for a user to place the basin 3090 under the chair portion 3010, the telescoping housing 3080 must be raised. As shown in FIG. 30, this is due to the height of the walls of the basin 3090. That is, when the telescoping housing 3080 is in the raised position, it "clears" the walls of the movable basin 3090. When the telescoping housing 3080 is fully extended downwardly—as shown in FIG. 30—the arrangement provides a very effective conduit to convey water into the basin 3090 with minimal splashing, for example.

Figure 31:
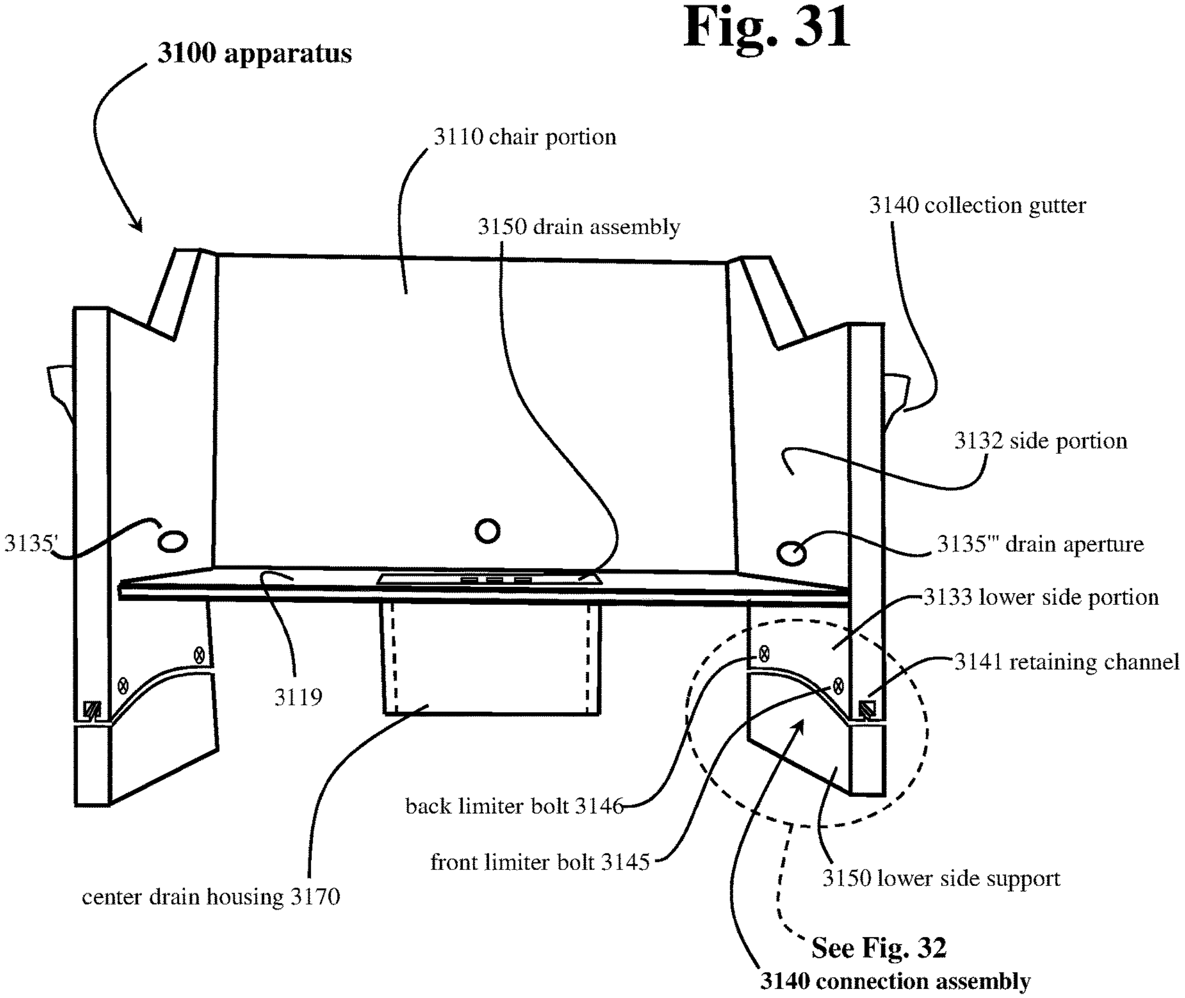
FIG. 31 is a front perspective view showing an apparatus 3100 in accordance with a further embodiment of the invention.

FIG. 31 is a front perspective view showing an apparatus 3100 in accordance with a further embodiment of the invention. As shown, the apparatus 3100 includes a chair portion 3110. The chair portion supports a person or other object. A collection gutter 3140 surrounds the chair portion 3110 in the manner described above, illustratively. As fluid, such as water, is collected into the collection gutter 3140, such fluid drains into drain apertures 3135. Such fluid may then continue to drain through a drain assembly 3150 into a center drain housing 3170. It is appreciated that the drain assembly 3150 may be replaced with any other drain assembly, as may be desired, described herein. In general, it is appreciated that features of one embodiment described herein, such as a drain assembly for example, may well be used in other embodiments described herein and/or with other features described herein as may be desired.

Of particular note with regard to FIG. 31, the apparatus 3100 includes a different support structure as compared to the support structure of FIG. 18, for example. To explain, the chair portion 3110 includes a back portion as well as side portions 3132 on opposing sides. Each side portion 3132 further includes a lower side portion 3133. As shown, the lower side portion 3133 (of each side portion 3132) may be characterized as the portion of the side that is disposed beneath the horizontal seat surface 3119.

As shown in FIG. 31, each lower side portion 3133 is supported by a lower side support 3150. A connection assembly 3140 serves to movably connect the lower side portion 3133 upon the lower side support 3133. Such connection includes a retaining channel 3141 disposed in a lower extent of the lower side portion 3133. The retaining channel 3141 houses a securement anchor, as described below. As described in further detail below, with reference to FIG. 32, the connection assembly 3140 serves to connect the lower side portion 3133 to the lower side support 3150 in a manner such that the lower side portion 3133 may slide relative to the lower side support 3150. However, the extent of such relative slide is limited by limiter bolts 3145, 3146.

Figure 32:
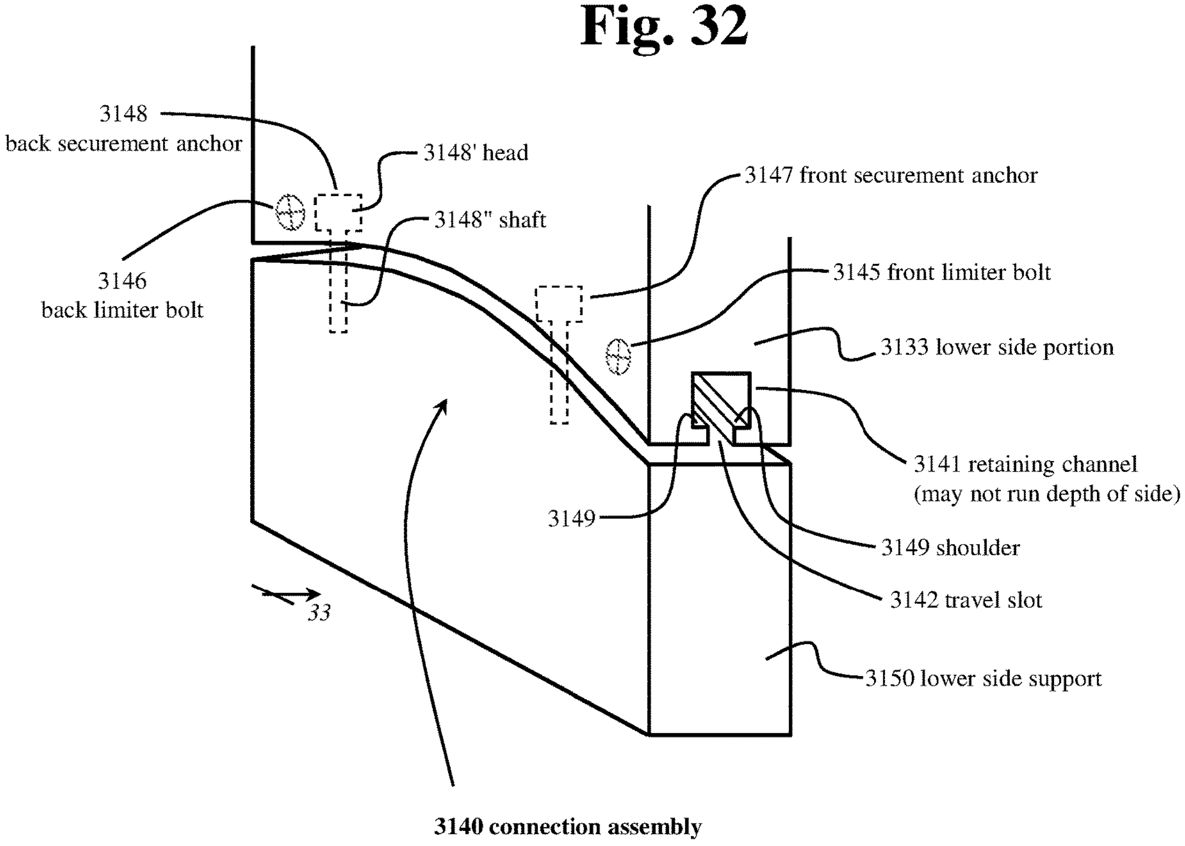
FIG. 32 is a perspective view showing further details of the connection assembly 3140 (securing a lower side portion 3133 to the lower side support 3150) in accordance with one embodiment of the invention.

FIG. 32 is a perspective diagram showing further details of the connection assembly 3140 (securing a lower side portion 3133 to the lower side support 3150) in accordance with one embodiment of the invention. As shown in phantom, in FIG. 32, the connection assembly 3140 includes a back securement anchor 3148 and a front securement anchor 3147. Each of these securement anchors 3147, 3148 includes an elongated shaft 3148' with an enlarged head 3148". A lower end of the elongated shaft 3148''' is fixedly secured into the lower side support 3150. For example, the securement anchors 3147, 3148 might be secured into the lower side support 3150 via threading the shaft into threaded holes in the lower side support 3150. Alternatively, the shafts 3148" might be glued into bores that are drilled into the lower side support 3150. As a further embodiment, the securement anchors 3147, 3148 might be in some manner integrally formed with the lower side support 3150.

Figure 33:
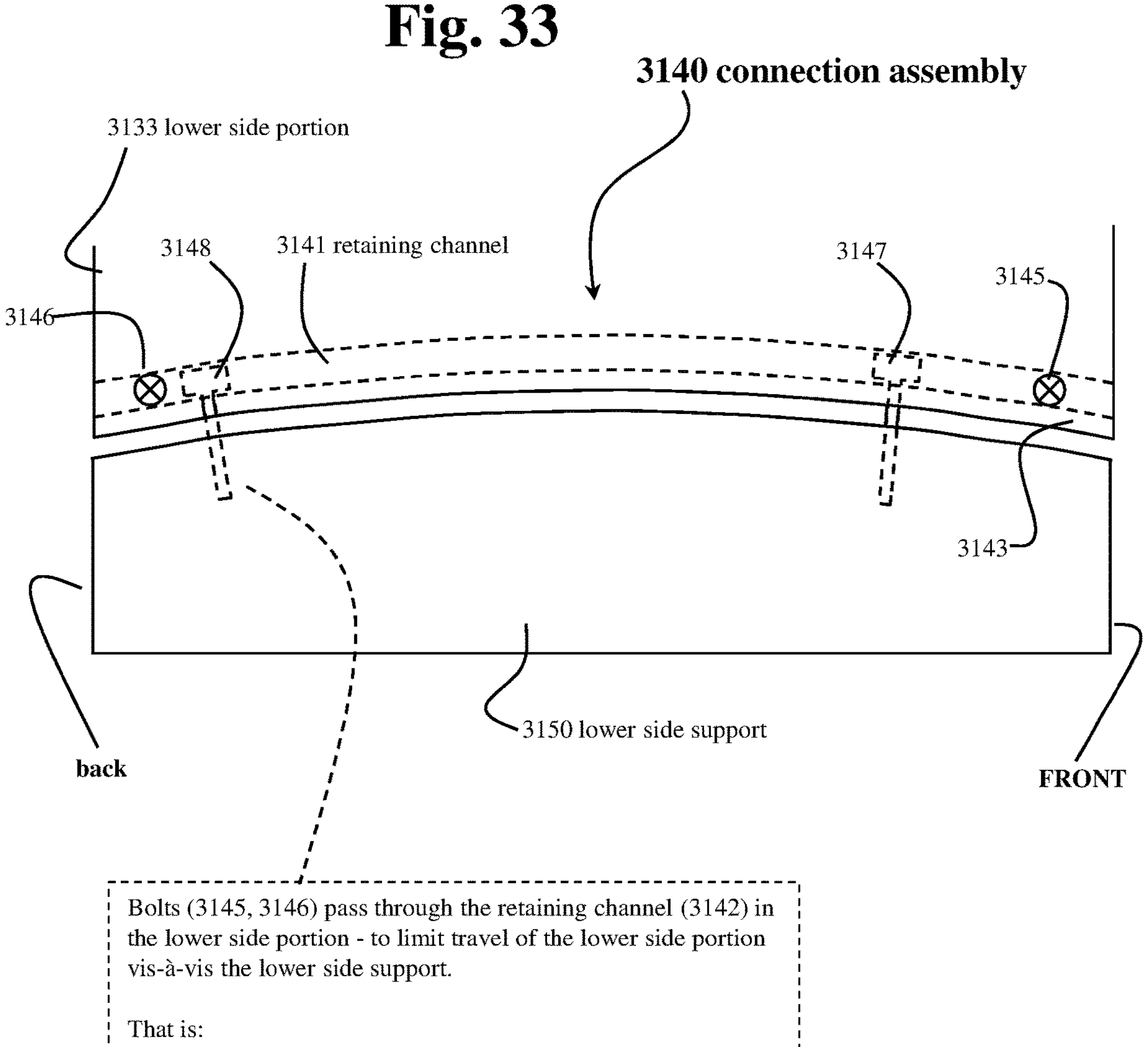
FIG. 33 is a side view showing further details of the connection assembly 3140 in accordance with one embodiment of the invention.

While the securement anchors 3147, 3148 are fixedly secured to the lower side support 3150—the head of each securement anchor 3147, 3148 is movably retained within a retaining channel 3141 in the lower side portion 3133. More specifically, the head 3148' of each securement anchor is dimensioned such that a lower side of each head 3148' freely passes within the retaining channel 3141 (albeit with some frictional resistance as may be desired) but is retained in the retaining channel 3140 by abutment with shoulders 3149. The shaft 3148" passes through a travel slot 3142—and is also dimensioned so as to freely move within travel slot 3142. However, as shown in FIG. 32 and FIG. 33, the amount that the securement anchors 3147, 3148 are allowed to travel in the retaining channel 3141 is limited. Specifically, such travel is limited by limiter bolts 3145, 3146. Further details are described below with reference to FIG. 33.

As shown in FIG. 32, it is appreciated that the retaining channel 3141 may not extend the entirety of the front to back distance of the lower side portion 3133 as shown in FIG. 32. Indeed, it only need be that the retaining channel 3141 extends sufficiently to allow movement of the securement anchors 3147, 3148 (within one or more retaining channels 3141) as desired. Relatedly, it is appreciated that the front limiter bolt 3145 and the back limiter bolt 3146 may not be needed. That is, if the retaining channel 3141 only extends the distance that travel is desired, then there is no need for the limiter bolts 3145, 3146—since the securement anchors would simply abut at an end of the retaining channel or channels 3141. However, it is appreciated that it may be desired to construct the retaining channel 3141 the entirety of the front to back distance of the lower side portion 3133, as shown. The reason for this is that such may be easier to construct, such as through utilization of a router.

FIG. 33 is a side view (along line 33 in FIG. 32) of the connection assembly 3140, in accordance with one embodiment of the invention. As shown, limiter bolts 3145, 3146 pass through a travel slot 3142 and into a retaining channel 3142. As described above, the securement anchors are retained in the retaining channel 3141. The bolts 3145, 3146 limit travel of the lower side portion vis-à-vis the lower side support. More specifically, bolt 3146 abuts against securement anchor 3148 to limit movement of the lower side portion frontward. On the other hand, bolt 3145 abuts against securement anchor 3147 to limit movement of the lower side portion backwards. It is appreciated that the size of each securement anchor head 3148' may be dimensioned relative to the retaining channel 3141 to display a desired amount of free movement in conjunction with a desired amount of frictional resistance.

Hereinafter, further embodiments of the invention and features will be described. In particular, various features of inventive embodiments directed to a chair cover and inventive embodiments directed to a support wall will be described. Such further embodiments may be used in conjunction with the above described embodiments, and other embodiments described herein, as desired and as described.

Figure 34:
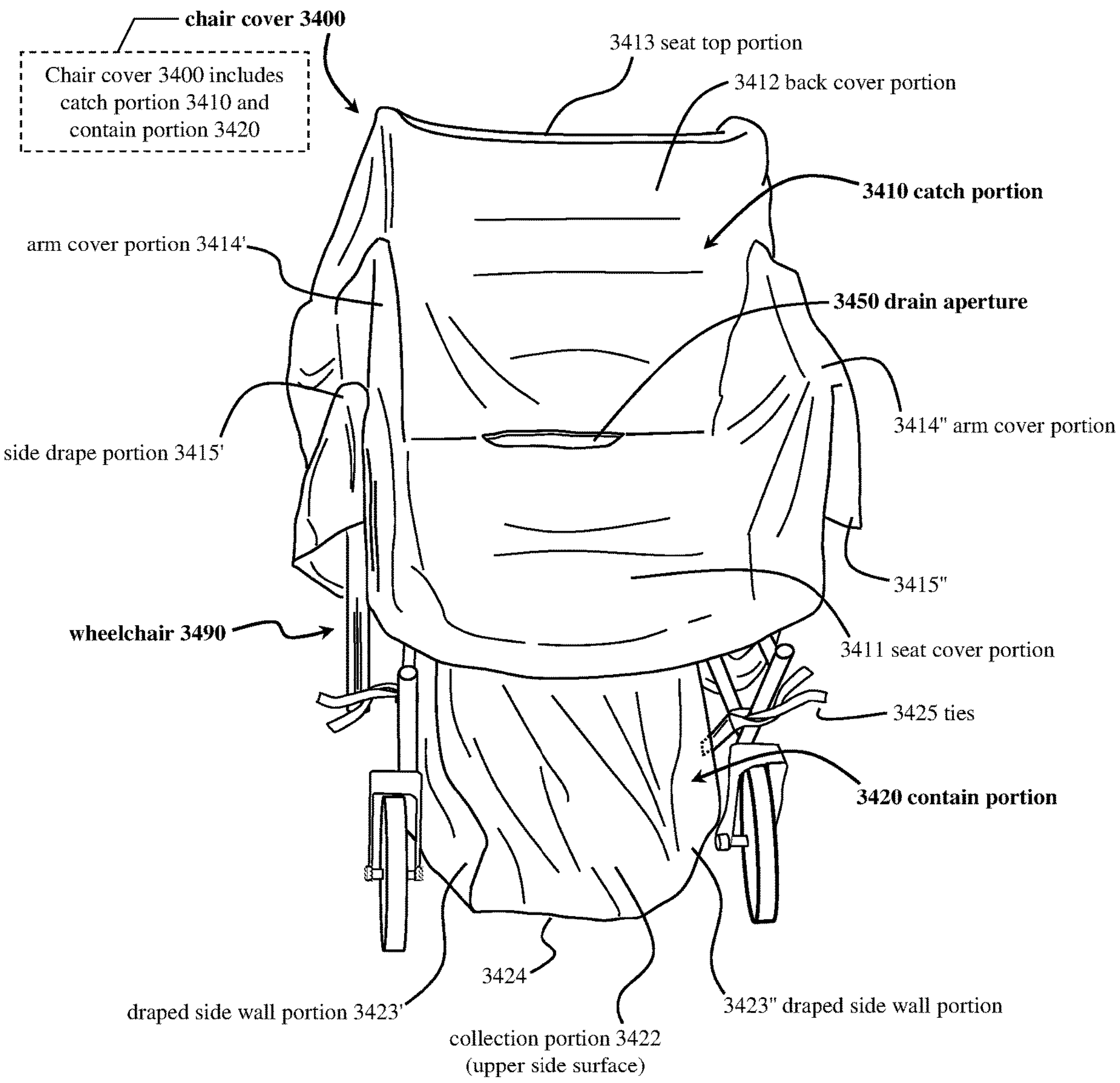
FIG. 34 is a perspective drawing showing a chair cover in accordance with at least one further embodiment of the invention.

FIG. 34 is a perspective drawing showing a chair cover 3400 in accordance with at least one further embodiment of the invention. The chair cover 34 provides novel structure by which a chair, and in particular a wheelchair 3490 as shown, may be utilized as a bathing apparatus. Specifically, the chair cover 3400 fits over a wheelchair, for example, so as to perform the functions of both “catching” water that is used to bath a person and also “containing” that same water in a suitable manner. Accordingly, the structure of the chair cover 3400 includes both a catch portion 3410 and a contain portion 3420. Various features of such structure are described in detail below. In particular, the catch portion 3410 includes a drain aperture 3450. The drain aperture 3450 provides a conduit for collected water to flow from the catch portion 3410 to the contain portion 3420. Hereinafter, further details will be described.

As shown in FIG. 34, the catch portion 3410 includes various components. The overall function of these various components is to catch either flowing water or sprayed water, for example, and effectively funnel or route that water to the drain aperture 3450. As otherwise described herein, is appreciated that the fluid being utilized in conjunction with the invention is variously and illustratively described herein as being water. However, the invention is of course not limited to such fluid. And in particular, the invention of course may be utilized using a mixture of water and cleaning additive, such as soap or detergent, for example.

In accordance with embodiments of FIG. 34, the catch portion 3410 includes a seat cover portion 3411 that covers a seat of the wheelchair as shown. On opposing sides of the seat cover portion and connected thereto are arm cover portions 3114 (3414' and 3414"). In turn, connected to each arm cover portion 30 114 is a corresponding side drape portion 3115 (3415', 3415"), such as the side drape portion 3415' shown on the left in FIG. 34. Each side drape portion 3415 may be utilized to further cover a side structure of a chair, for example. In particular, in the example of FIG. 34, each side drape portion 3415 may be provided to cover and protect a wheel structure of the wheelchair 3490.

Connected at a back portion of the seat cover portion 3411 is a back cover portion 3412. As shown, the drain aperture 3450 is interposed in the junction of the seat cover portion 3411 and the back cover portion 3412. The catch portion also includes the back cover portion 3412. The seat top portion 3413 is disposed in a top of the back cover portion 3412.

It is appreciated that such portions of the catch portion 3410, as well as portions of the contain portion 3420, may or may not be demarcated by edges or separate pieces of material, for example. In general, it is appreciated that portions of the catch portion 3410 and portions of the contain portion 3420 may be integrally formed from pieces of material, or on the other hand, formed from distinct pieces of material that are mechanically connected together, such as by sewing. For example, FIG. 58, described below, shows further aspects of non-integral construction, i.e., pieces of the chair cover are constructed and utilized separately.

Figure 35:
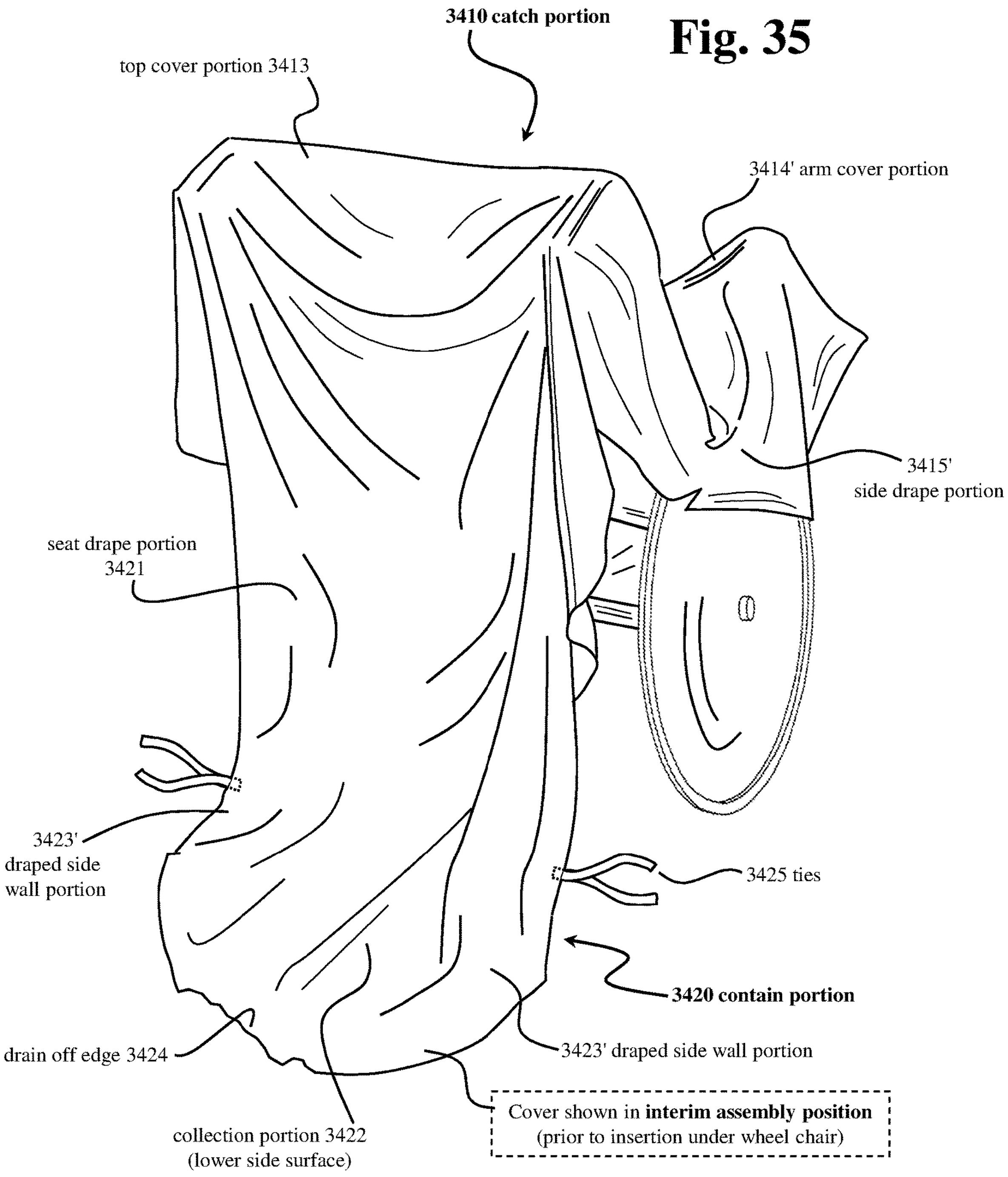
FIG. 35 is a perspective drawing showing a chair cover the same as, or similar to, that shown in FIG. 34, in accordance with one embodiment of the invention.

With regard to the contain portion 3420, FIG. 35 shows further details of such contain portion. FIG. 35 is a perspective drawing showing in further detail a chair cover 3400 the same as (or similar to) that shown in FIG. 34, in accordance with one embodiment of the invention. In particular, FIG. 35 shows further details of the contain portion 3420. As shown, the contain portion 3420 includes a seat drape portion 3421 and a collection portion 3422. As shown in FIG. 35, the chair cover 3400 is shown in an interim assembly position prior to insertion of the collection portion 3422 under the wheelchair. On the other hand, FIG. 34 shows the assembled, functional arrangement with the collection portion 3422 disposed underneath the wheelchair 3490. As shown in both FIG. 34 and FIG. 35, the chair cover 3400 includes a draped sidewall portion 3423 (3423',3423") disposed on opposing sides of the collection portion 3422. Additionally, a drain off edge 3424 is disposed as the forward edge of the collection portion 3422, as shown in FIG. 34. The collection portion 3422 is attached to the opposing draped sidewall portions 3423 and may be provided with ties 3425. As shown in FIG. 34, in particular, the ties 3425 may be utilized to connect each draped sidewall portion 3423, on opposing sides, to a structural component of the wheelchair 3490. For example, the ties 3425 may be connected to a structural rod of the wheelchair, as shown in FIG. 34.

As described above, the overall function of the components of the catch portion 3410 is to catch either flowing water or sprayed water, for example, and effectively funnel that water to the drain aperture 3450. In particular, it is envisioned that any water collected on the seat cover portion 3411 will flow to the back of the seat cover portion 3411 and pass into and through the drain aperture 3450. The water will then pass onto and be controlled (in flow) by the seat drape portion 3421. Relatedly, is appreciated that the structure of the wheelchair 3490, or other chair, will preferably afford flow of the water passing from the drain aperture 3450 and onto the seat drape portion 3421. For example, it is envisioned that the wheelchair 3490 will be open at the back or at the least have a structure that would allow the water to pass through. Illustratively, the wheelchair may be of a fold-up type such that a back of the wheelchair is separated from the seat of the wheelchair. As a result, such structure of the wheelchair provides for the water to easily pass from the drain aperture 3450 and onto the seat drape portion 3421.

Once the water flows upon the seat drape portion 3421, the flow of the water is controlled so as to run down a forward surface of the seat drape portion 3421 (i.e. the surface opposite that shown in FIG. 35) and pass on to the collection portion 3422. Such flow of water may be controlled by the draped sidewall portions 3423. Various embodiments of the collection portion 3422 are described in detail below. In the particular example shown in FIG. 34, it is envisioned that the collection portion 3422 will be physically disposed next to a floor drain, for example. Accordingly, subsequent to the water being funneled by the seat drape portion 3421 and being routed on to the collection portion 3422, the water than flows out of the collection portion 3422 over the drain off edge 3424. The water would then be free to pass into a suitable floor drain as described above. For example, the floor of the particular washroom, in which the wheelchair 3490 is disposed, might be provided with such a floor drain.

In the embodiment of FIG. 34, it is appreciated that the ties 3425 may be provided to support the collection portion 3422 in a somewhat elevated position above a supporting floor surface, i.e., the floor surface upon which the wheelchair 3490 is disposed. In particular, it may be beneficial to support the collection portion 3422 in an elevated manner so as to better ensure that water indeed runs off of the collection portion 3422 and onto a suitable draining surface. However, in a different applied use, the ties 3425 may simply support the collection portion 3422 spatially between the wheels and other support structure of the wheelchair 3490, and allow the collection portion 34222 to lay on—and be supported by—the floor upon which the wheelchair 3490 is positioned. However, it is appreciated that the invention is not limited to the collection portion 3422, as shown in FIG. 34. Indeed, alternative collection portions 3422 as described below do contain and hold the water, as opposed to providing a surface over which the water flows.

The ties 3425 as shown in FIG. 34 are illustrative. The number and positioning of the ties may be varied from that shown in FIG. 34. Additionally, it is fully appreciated that other structure might be utilized in lieu of the ties. For example, physical strips of plastic might be connected to each draped sidewall portion and secured to a structural component of the wheelchair, such as by utilizing hook and loop fasteners mounted upon the plastic strips, such as Velcro.

It is appreciated that the seat cover 3400 may be constructed of any of a wide variety of materials, including those otherwise described herein, for example. In particular, the seat cover 3400 may be constructed of waterproof material. Relatedly, one side of the material (from which the chair cover 3400 is constructed) may be provided to be waterproof, whereas the other side is not provided to be waterproof. Accordingly, FIG. 35 shows a lower side surface of the collection portion 3422 which may not be waterproofed. On the other hand, the upper side surface of the collection portion 3422 as shown in FIG. 34 may be waterproofed.

Figure 36:
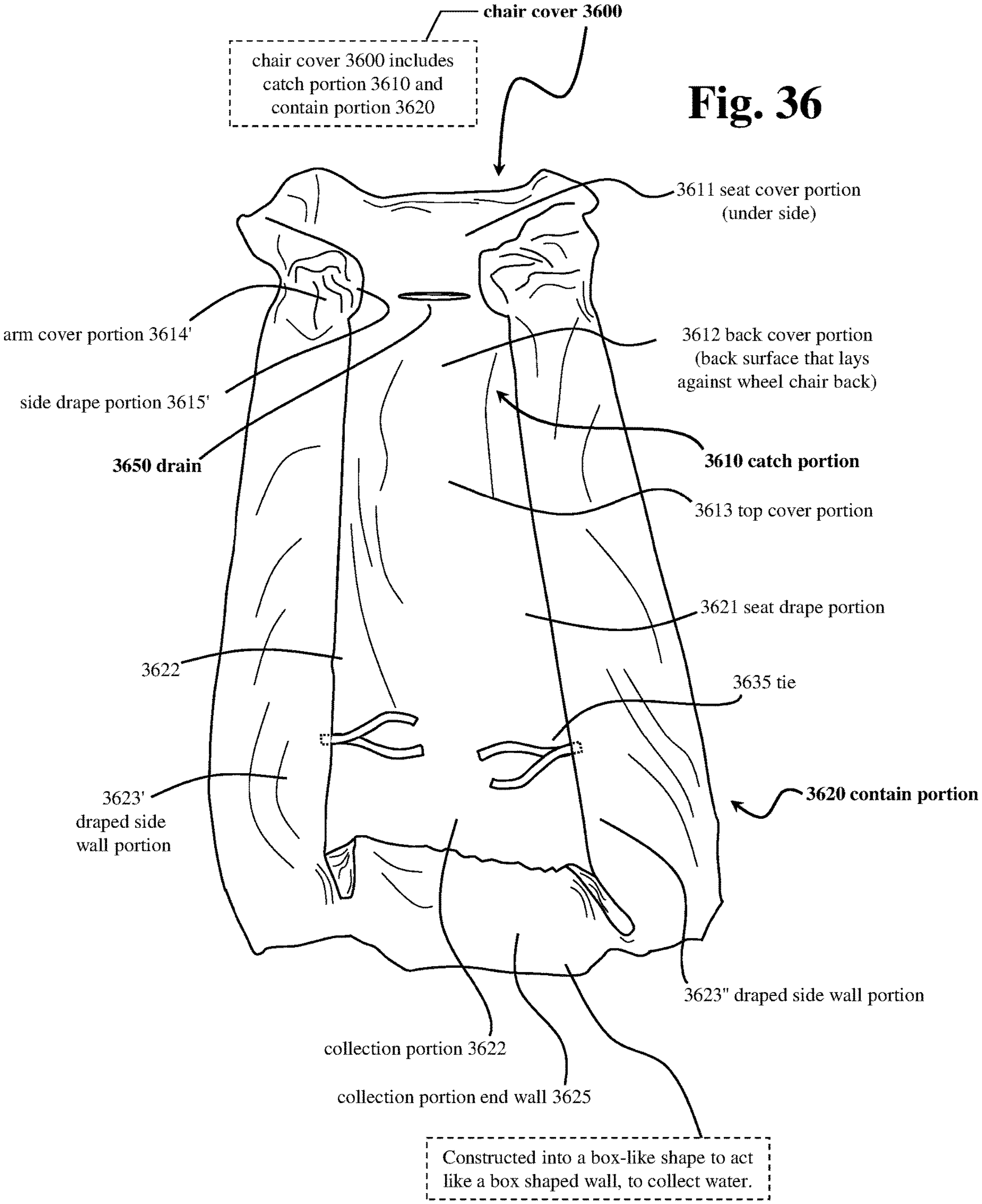
FIG. 36 is a top perspective view of a chair cover, in accordance with a further embodiment of the invention.

FIG. 36 is a top perspective view of a chair cover 3600 in accordance with a further embodiment of the invention. As shown, the chair cover 3600 is illustrated in a stretched out arrangement, such as would be the case when spreading the chair cover out on a floor—prior to placing the chair cover upon a wheelchair, for example. Overall, the chair cover 3600 (of FIG. 36) is of similar structure to that shown in FIG. 34. In a manner similar to the chair cover of FIG. 34 and FIG. 35, the chair cover 3600 includes a catch portion 3010 and a contain portion 3620. That is, in particular, the catch portion 3610 includes a seat cover portion, an arm cover portion, a side drape portion (that may also be characterized as a wheel cover portion when used in the environment of a wheel chair), and a top cover portion. To explain further detail, FIG. 36 shows an underside of the seat cover portion 3611. Both the arm cover portions 3614 and the side drape portions 3615 are shown in a gathered arrangement. Accordingly, in use, the arm cover portions and the side drape portions would be spread out over the arm rests and wheels of the wheelchair. It is appreciated that various components of the chair cover 3600 of the embodiment of FIG. 36 (as well as other embodiments) may be provided with elastic integrated into the particular material, so as to better engage one or more structural components of a wheelchair or other chair or other structure.

Additionally, FIG. 36 clearly shows a back surface of a back cover portion 3612 of the chair cover. Accordingly, such back surface of the back cover portion 36 112, as shown in FIG. 36, would be the surface that lays against the back of the supporting wheelchair. Additionally, FIG. 36 shows a top cover portion 3613. As noted above, and as shown in FIG. 36, is appreciated that the various portions of the embodiment of FIG. 36, as well as other embodiments, may be constructed of integral pieces of material.

In a manner similar to the embodiment of FIG. 34, the chair cover 3600 also includes a drain, i.e. a drain aperture, 3650. The particular size and dimension of the drain 3650 may be varied as desired. Also, the drain 3650 may be reinforced, such as from tearing, by utilizing reinforcing material or construction. For example, such reinforcing might be constituted by stitching around the drain 3650. The drain 3650 might also be provided with a filter, so as to restrict flow of varied items as desired.

In a manner similar to the cover of FIG. 34, the chair cover 3600 includes a contain portion 3620. The contain portion 3620, in particular, includes a seat drape portion 3621 and a collection portion 3622. In a manner similar to FIG. 34, the seat drape portion 3621 is provided to receive water or other fluid exiting from the drain 3650 and route that water to the collection portion 3622.

In a manner similar to chair cover 3400, the chair cover 3600 includes draped sidewall portions 3623 (3623', 3623"). However, the structure of the chair cover 3600 does differ from the chair cover of FIG. 34. That is, the chair cover 3600 is provided with a collection portion end wall 3625. Accordingly, in the arrangement of FIG. 36, the collection portion 3622 retains the water. More specifically, once the water is funneled by the seat drape portion 3621 to the collection portion 3622, water is retained in the collection portion 3622 as enclosed by both the collection portion end wall 3625 and the two opposing draped sidewall portions 3623. Accordingly, the collection portion 3622 and surrounding structure may be constructed into a box-like shape to act like a box shaped structure, to collect water. With such an arrangement, the chair cover 3600 may be used on a supporting floor surface that is not provided with a drain. For example, the chair cover 3600 might be utilized with a wheelchair, i.e. so as to cover a wheelchair, on a rug covered surface, hardwood floor, or other surface typically found in a residential living space.

As shown in FIG. 36, it is appreciated that the chair cover 3600 may be provided with ties 3635, straps, or other mechanical attachment components so as to attach the chair cover 3600 to a structural component of the supporting chair, such as a wheelchair.

Figure 37:
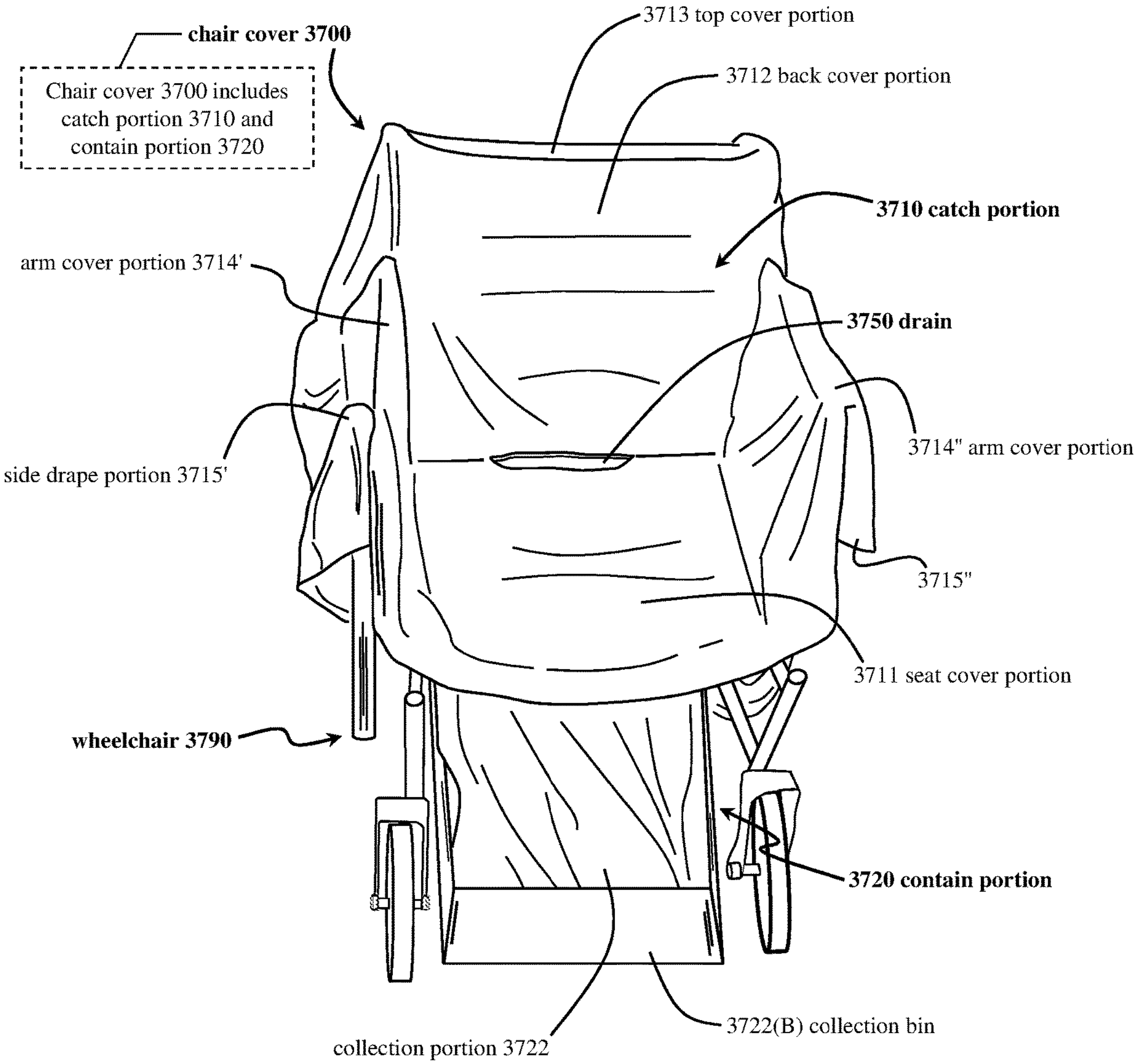
FIG. 37 is a top perspective view of a chair cover, in accordance with a further embodiment of the invention.

FIG. 37 is a top perspective view of a chair cover 3700, in accordance with a further embodiment of the invention. As shown, the chair cover 3700 includes a catch portion 3710 and a contain portion 3720. In a similar manner to the embodiments described above, the chair cover 3700 may be disposed on a suitable supporting chair, such as the wheelchair 3790 shown. The catch portion 3710 includes a seat cover portion 3711, a back cover portion 3712, a top cover portion 3713, and opposing arm cover portions 3714 (3714', 3714"). As shown, the chair cover 3700 further includes drain 3750. The drain 3750 is disposed proximate a rear portion of the seat cover portion 3711 and proximate a lower portion of the back cover portion 3712.

Figure 40:
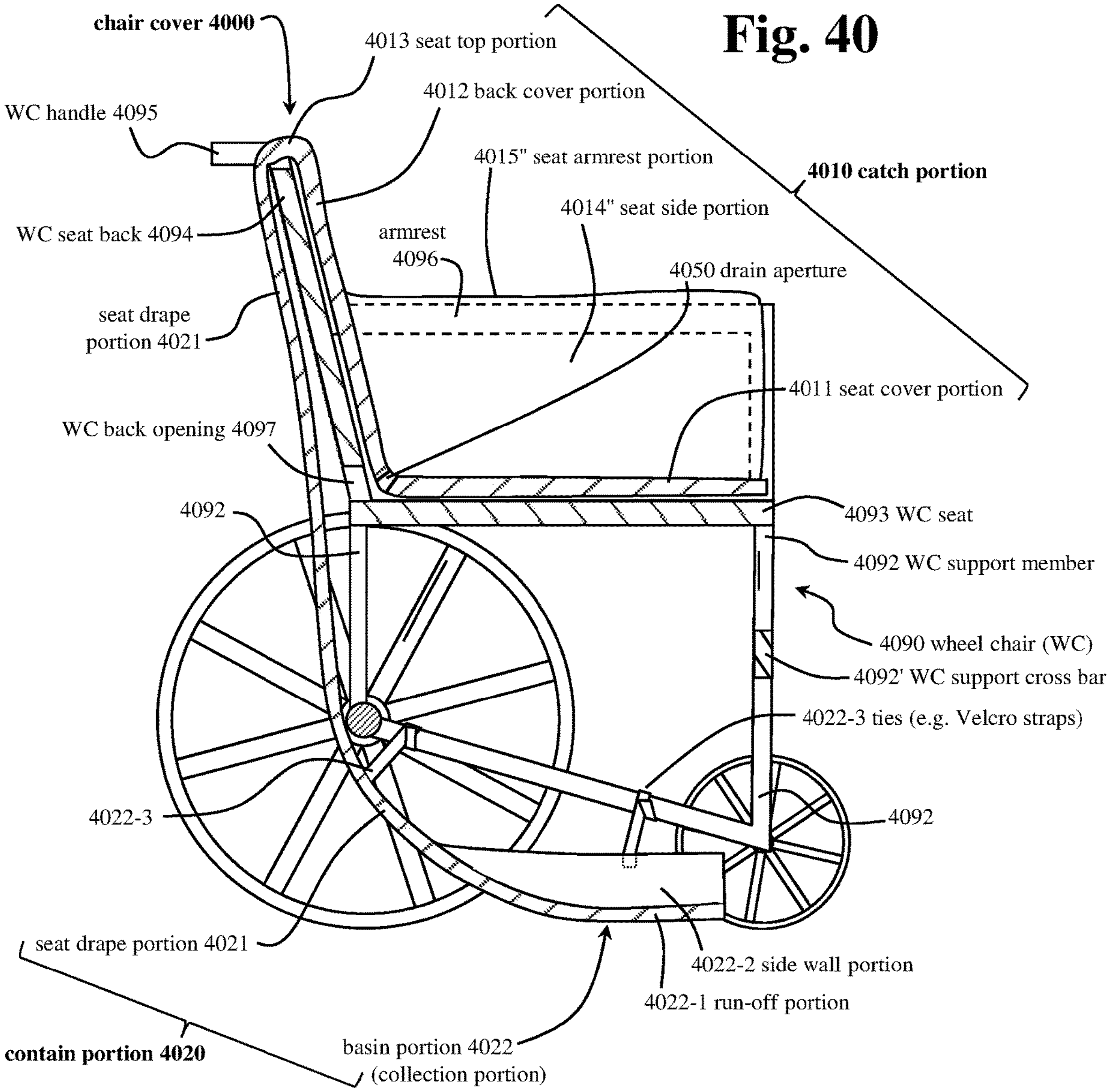
FIG. 40 is a side cross-sectional view of a chair cover with wheelchair, in accordance with one embodiment of the invention
Figure 41:
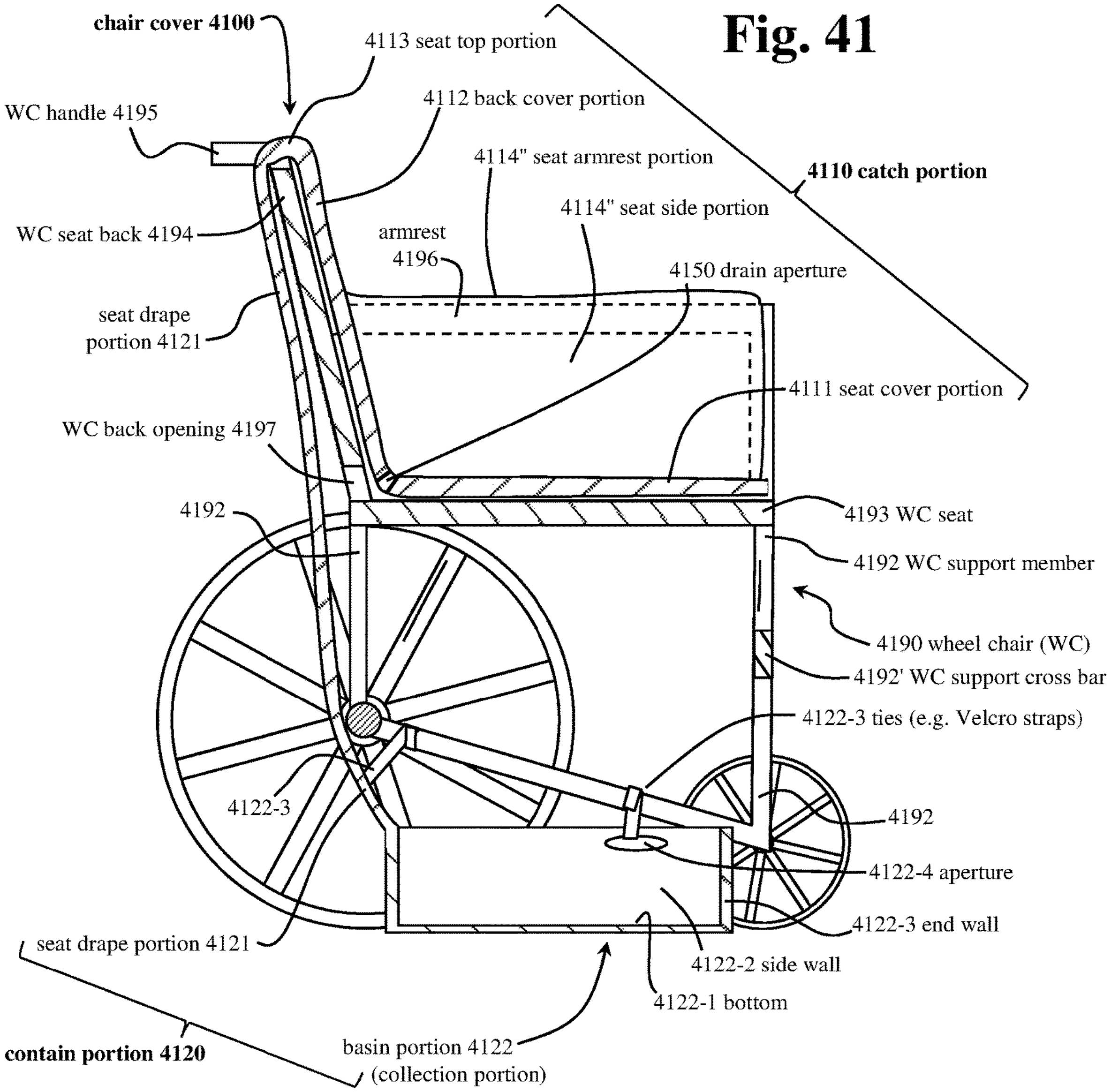
FIG. 41 is a further side cross-sectional view of a chair cover with wheelchair, in accordance with one embodiment of the invention.

When bathing a person, water used to bath the person is effectively captured by the catch portion 3710 so as to be routed to the drain 3750. The water then passes into and through the drain 3750—so as to pass onto the contain portion 3720. The contain portion 3720 includes a seat drape portion (not shown in FIG. 37). The seat drape portion further routes the water onto a collection portion 3722. In the embodiment of FIG. 37, the collection portion 3722 may indeed be of similar structure to that shown in FIG. 35. With such structure, the water is not contained by the collection portion 3722, but rather allowed to run off the collection portion 3722. However, as shown in the embodiment of FIG. 37, the arrangement further includes the additional structure of a collection bin 3722(B). In this embodiment, the collection bin 3722 (B) is a separate structural component vis-à-vis the collection portion 3722. The collection bin 3722(B) serves to collect and contain any water passing through the drain 3750, as opposed to such water being allowed to flow upon a supporting floor surface. Further details with regard to similar structure are described below, with reference to FIG. 42. Relatedly, FIG. 40 and FIG. 41 show arrangements in which a bin type structure are integrally formed with a collection portion. Further details are described below with reference to such drawings.

Figure 38:
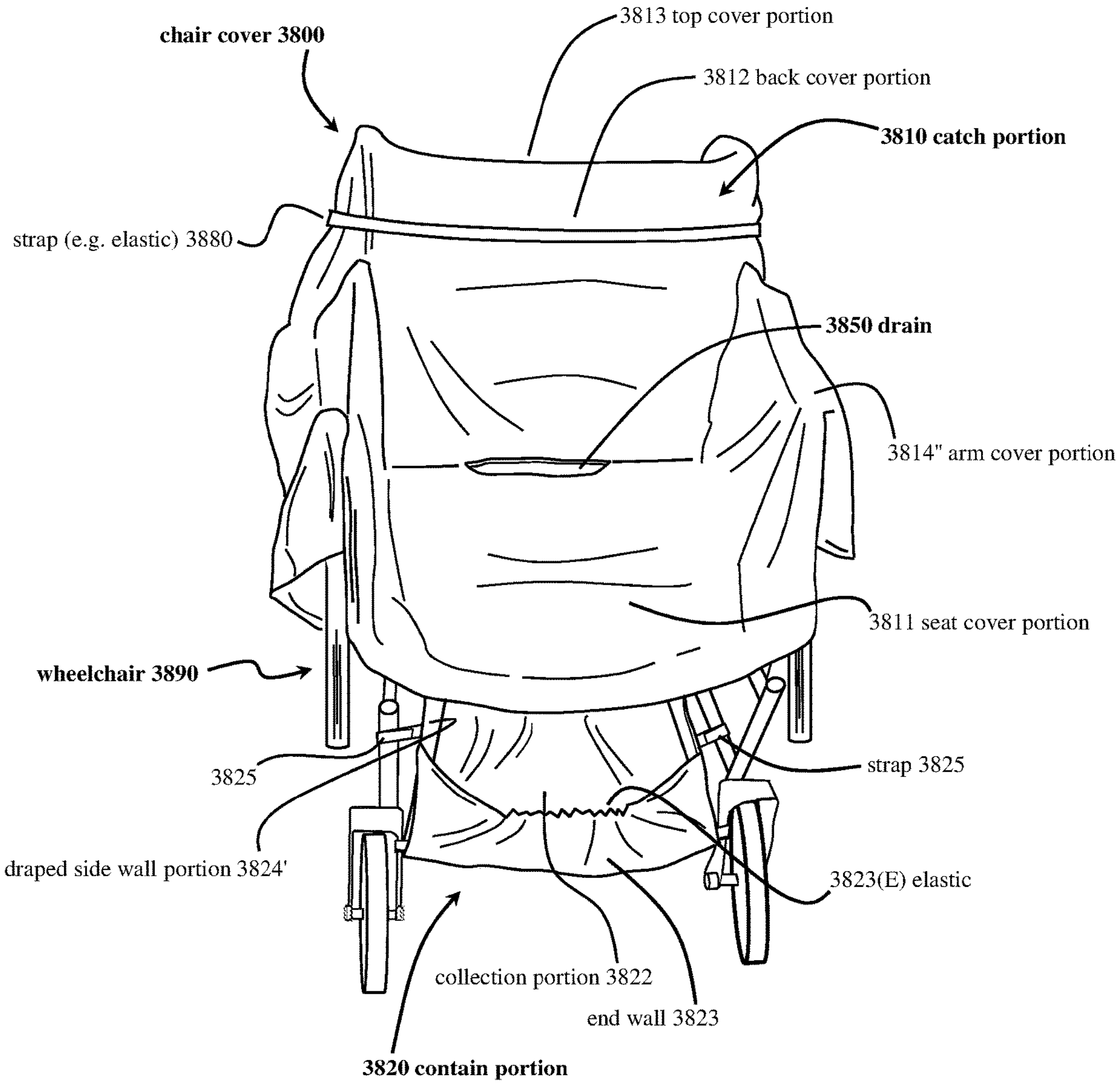
FIG. 38 is a top perspective view of a further chair cover, in accordance with one embodiment of the invention.

FIG. 38 is a top perspective view of a further chair cover 3800, in accordance with one embodiment of the invention. As shown, the chair cover 3800 is disposed upon a wheelchair 3890. The chair cover 3800 includes a catch portion 3810 and a contain portion 3820. Further, the chair cover 3800 includes a drain 3850.

As shown, catch portion 3810 includes a seat cover portion 3811, an arm cover portion 3814, a back cover portion 3812, and a top cover portion 3813. In a manner similar to that described above, the catch portion 3810 catches water so as to funnel, i.e. route, such water to the drain 3850. After passing through the drain 3850 and onto the seat drape portion (not shown in FIG. 38) the water then passes on to a collection portion 3822. In the embodiment of FIG. 38, the collection portion 3822 is constructed of flexible material that is effectively “strung up” so as to form a bin or container of sorts in which water may be contained, i.e. so as to not flow out onto a supporting floor surface. The collection portion 3822 may include an end wall 3823 as well as opposing draped sidewall portions 3824 (3824', 3824"). Such structure, as shown in FIG. 38, may be attached to the structure of the supporting wheelchair using a variety of straps and/or ties, for example. Illustratively, as shown in FIG. 38, the collection portion 3822 is supported using straps 3825 connected to each draped sidewall portion 3824 and/or the end wall structure 3823, for example.

Figure 39:
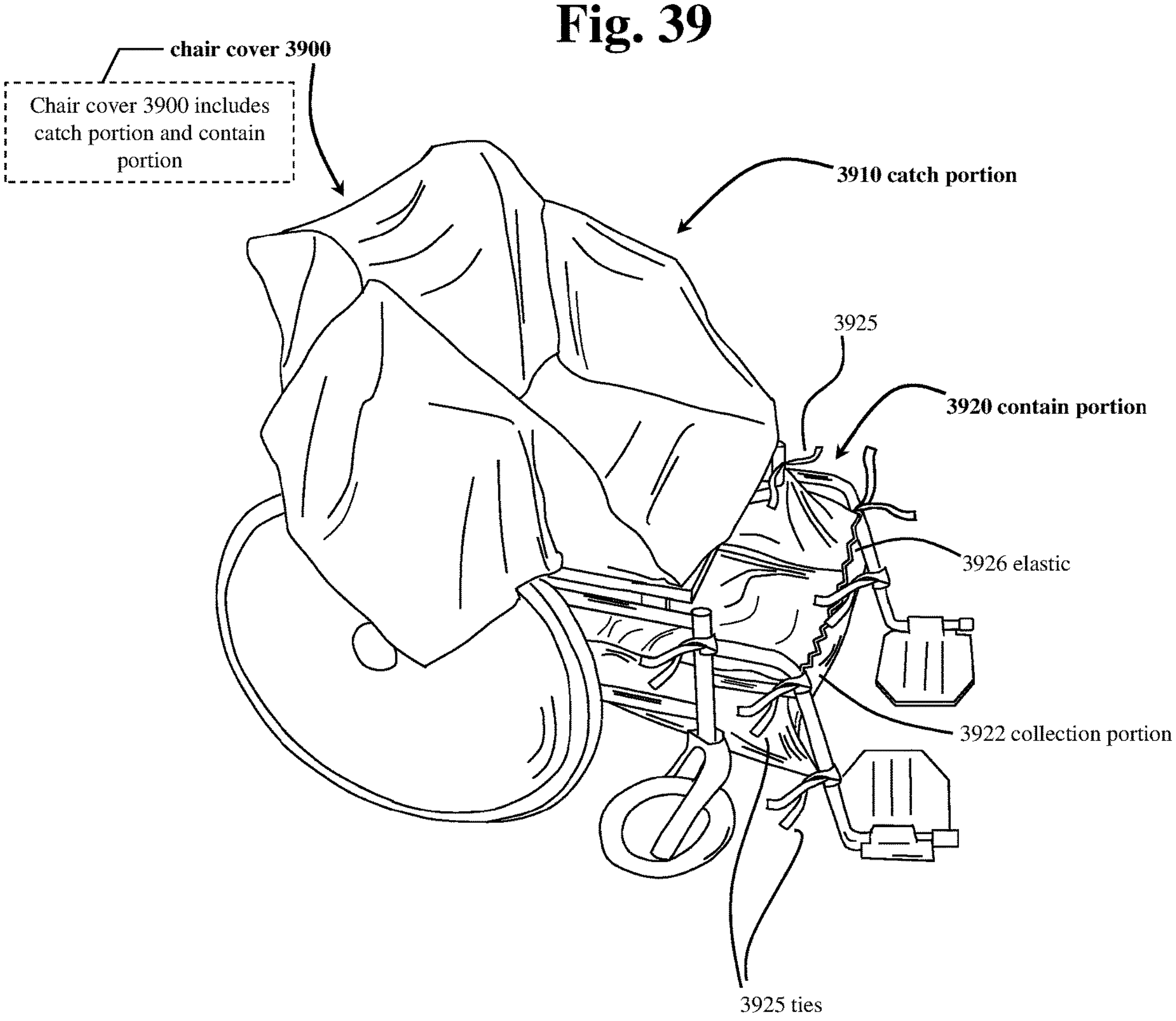
FIG. 39 is a top perspective view of a further chair cover, in accordance with one embodiment of the invention.

FIG. 39 is a top perspective view of a further chair cover 3900, in accordance with one embodiment of the invention. In a manner similar to the arrangements described above, the chair cover 3900 is mounted upon a supporting wheelchair, illustratively. Further, the chair cover 3900 includes a catch portion 3910 and a contain portion 3920. As shown, the contain portion 3920 includes a collection portion 3922. In particular, the structure of FIG. 39 illustrates that the collection portion 3922 may be constructed of flexible material and/or structurally supported material and secured to a supporting structure (in this case a wheelchair) using a plurality of ties 3925. As shown, elastic support members 3926 (either embedded into the material of the collection portion and/or disposed adjacent to such material of the collection portion) may be utilized in conjunction with the collection portion 3922. In particular, such elastic support members might be utilized in conjunction with the ties 3925 so as to maintain the collection portion 3922 in a “box” shaped arrangement, so as to be capable of collecting and holding water. As shown, additional suitable ties and/or straps, for example, may be attached to the collection portion 3922 as desired.

FIG. 40-FIG. 44 are provided to illustrate further aspects of the invention. In particular, such additional FIGS. 40-44 illustrate features of the invention related to different collection portions.

Specifically, FIG. 40 is a side cross-sectional view of a chair cover 4000 with wheelchair (WC) 4090, in accordance with one embodiment of the invention. In the side cross-sectional view, various wheelchair structural components are shown. Specifically, the wheelchair structure components include a wheelchair seat 4093, a wheelchair seat back 4094, a wheelchair handle 495, and a wheelchair arm rest 4096. As shown, the structure of the wheelchair is further provided with a wheelchair back opening 4097. As shown, the wheelchair 4090 further includes wheels as shown, and various structural support members including a plurality of wheelchair support members 4092, including wheelchair support crossbar 4092'.

In a similar manner to embodiments described above, the chair cover 4000 includes a catch portion 4010 and a contain portion 4020. The catch portion 4010 includes a seat cover portion 4011 and a back cover portion 4012. A drain aperture 4050 is disposed proximate the junction of the seat cover portion 4011 and the back cover portion 4012. Positioned at the top of the back cover portion 4012 is a seat top portion 4013. The seat top portion 4013 lays over the top edge of the wheelchair seat back 4094 and connects to a top edge of a seat drape portion 4021. Accordingly, the back cover portion 4012, the seat top portion 4013, and the seat drape portion 4021 provide cover and protection to the seat back 4091 of the wheelchair. The seat cover portion 4011 provides protection to the wheelchair seat 4093 and other lower components of the wheelchair, in particular. Also, the catch portion 4010 includes a seat side portion 4014 and a seat armrest portion 4015. Such portions 4014 and 4015 protect the armrest 4096 of the wheelchair, as well as the seat 4093 of the wheelchair.

The contain portion 4020 (of the chair cover 4000) includes the seat drape portion 4021 and a basin portion 4022. Accordingly, in this embodiment of the invention, the basin portion 4022 constitutes a "collection portion" as described in the embodiments above.

In utilization of the chair cover 4000 to bath a person, a person is seated in the wheelchair, upon the seat cover portion 4011. As the person (for example a patient) is bathed using water, the water is caught by the catch portion 4010 and routed to the drain aperture 4050. Upon passing through and exiting the drain aperture 4050, the water passes through the wheelchair back opening 4097. Accordingly, in this embodiment, the wheelchair is provided structurally with an opening so as to allow water to pass through. Thereafter, the water passes onto the seat drape portion 4021. The water then runs down the seat drape portion 4021—on the right surface of the portion 4021, as shown in FIG. 40. The water then passes into the basin portion 4022.

As shown, the basin portion 4022 includes a run-off portion 4022-1 and a sidewall portion 4022-2. In this embodiment, the water is allowed to pass over the run-off portion and onto the supporting floor. Accordingly, in this version of the invention, the assembly would preferably need to be disposed on a floor surface provided with some type of a drain, such as in a bathroom.

The catch portion 4010 and the contain portion 4020 may be supported and maintained in position using ties 4022-3 or using some other mechanical support, such as Velcro straps.

FIG. 41 is a further side cross-sectional view of a chair cover 4100 with wheelchair (WC) 4190, in accordance with one embodiment of the invention. In the side cross-sectional view, various wheelchair structural components are shown. Specifically, the wheelchair structure components include a wheelchair seat 4193, a wheelchair seat back 4194, a wheelchair handle 495, and a wheelchair arm rest 4196. As shown, the structure of the wheelchair is further provided with a wheelchair back opening 4197. As shown, the wheelchair 4190 further includes wheels as shown, and various structural support members including a plurality of wheelchair support members 4192, including wheelchair support crossbar 4192'.

In a similar manner to embodiments described above, the chair cover 4100 includes a catch portion 4110 and a contain portion 4120. The catch portion 4110 includes a seat cover portion 4111 and a back cover portion 4112. A drain aperture 4150 is disposed proximate the junction of the seat cover portion 4111 and the back cover portion 4112. Positioned at the top of the back cover portion 4112 is a seat top portion 4113. The seat top portion 4113 lays over the top edge of the wheelchair seat back 4194 and connects to a top edge of a seat drape portion 4121. Accordingly, the back cover portion 4112, the seat top portion 4113, and the seat drape portion 4121 provide cover and protection to the seat back 4191 of the wheelchair. The seat cover portion 4111 provides protection to the wheelchair seat 4193 and other lower components of the wheelchair, in particular. Also, the catch portion 4110 includes a seat side portion 4114 and a seat armrest portion 4115. Such portions 4114 and 4115 protect the armrest 4196 of the wheelchair, as well as the seat 4193 of the wheelchair, in particular.

The contain portion 4120 (of the chair cover 4100) includes the seat drape portion 4121 and a basin portion 4122. Accordingly, in this embodiment of the invention, the basin portion 4122 constitutes a "collection portion" as described in the embodiments above.

In utilization of the chair cover 4100 to bath a person, a person is seated in the wheelchair, upon the seat cover portion 4111. As the person is bathed using water (or a water and soap combination), the water is caught by the catch portion 4110 and routed to the drain aperture 4150. Upon passing through and exiting the drain aperture 4150, the water passes through the wheelchair back opening 4197. In this embodiment, the wheelchair is provided structurally with an opening so as to allow water to pass through. Thereafter, the water passes onto the seat drape portion 4121. The water then runs down the seat drape portion 4121—on the right surface of the portion 4121, as shown in FIG. 41. The water then passes into the basin portion 4122.

As shown, the basin portion 4122, i.e. the collection portion, is in the shape of a bin that is integrally connected at an end of the seat drape portion 4121, as shown. Accordingly, in the embodiment of FIG. 41, water running off the seat drape portion 4121 is collected in and retained by the basin portion 4122. The basin portion 4122 may include a bottom 4122-1, opposing sidewalls 4122-2, and opposing end walls 4122-3. As shown, the end wall 4122-3 disposed on the left (as shown in FIG. 41) is integrally connected to a distal end of the seat drape portion 4121. Such construction might be achieved by a suitable molding process in which the seat drape portion 4121 and the basin portion 4122 are molded together.

The catch portion 4110 and the contain portion 4120 may be supported and maintained in position using ties 4122-3 or using some other mechanical support, such as Velcro straps. To assist in such securement, the basin portion 4122 may be provided with one or more apertures 4122-4. Such apertures may be helpful in order to connect straps to the sidewalls 4122-2.

While FIG. 41 illustrates the basin portion 4122 integrally connected to the seat drape portion 4121, is appreciated that, alternatively, a similar arrangement may be provided with the ability to disconnect the basin portion 4122 from the seat drape portion 4121. For example, such functionality might be provided using a suitable attachment mechanical device disposed at the lower end of the seat drape portion 4121, which mechanically attaches to a top edge of the basin portion 4122. For example, such mechanical device might be in the form of snaps, zipper, or ties.

Figure 42:
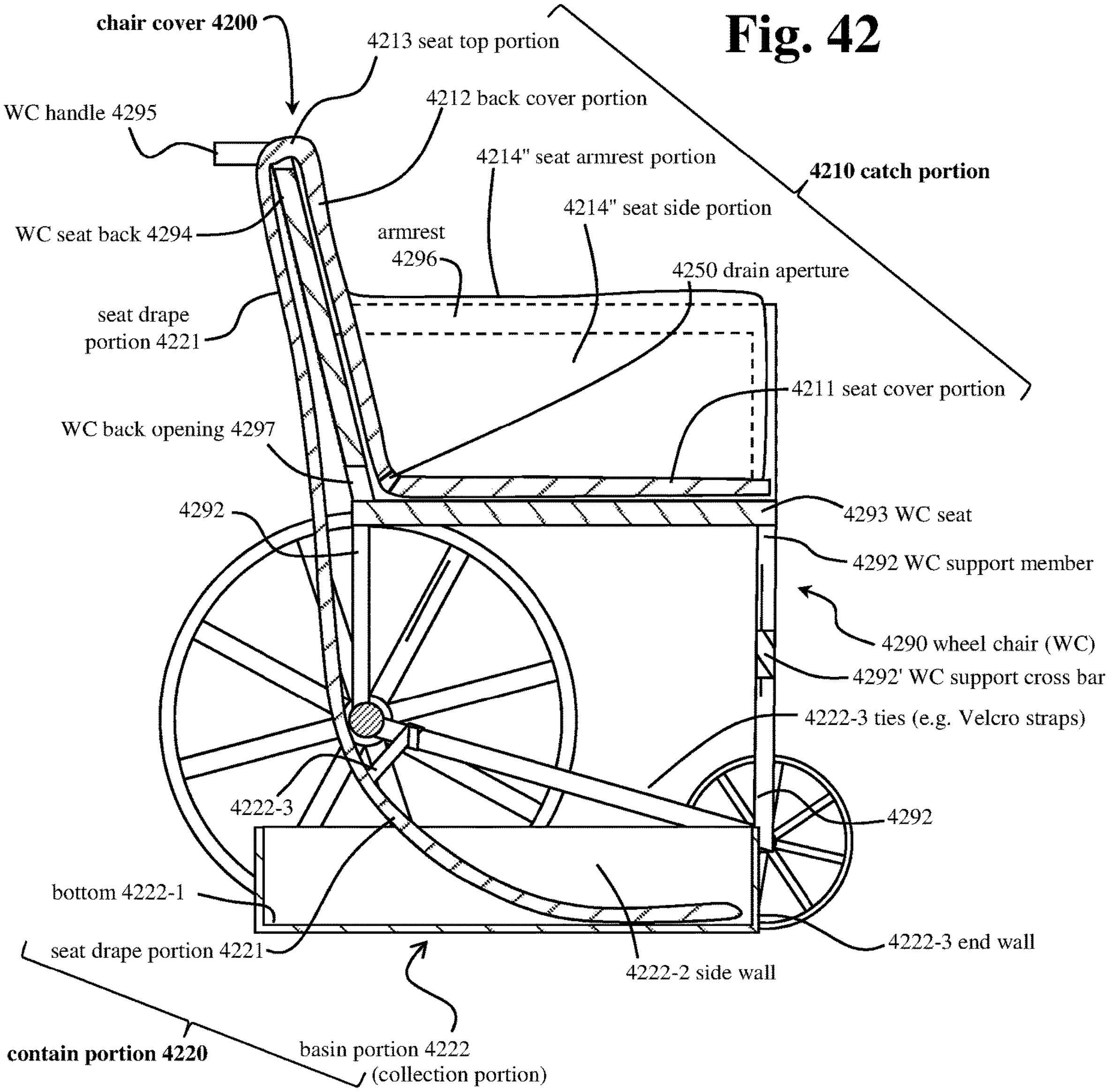
FIG. 42 is a further side cross-sectional view of a chair cover with wheelchair, in accordance with one embodiment of the invention.

FIG. 42 is a further side cross-sectional view of a chair cover 4200 with wheelchair (WC) 4290, in accordance with one embodiment of the invention. In the side cross-sectional view, various wheelchair structural components are shown. Specifically, the wheelchair structure components include a wheelchair seat 4293, a wheelchair seat back 4294, a wheelchair handle 495, and a wheelchair arm rest 4296. As shown, the structure of the wheelchair is further provided with a wheelchair back opening 4297. As shown, the wheelchair 4290 further includes wheels as shown, and various structural support members including a plurality of wheelchair support members 4292, including wheelchair support crossbar 4292'.

In a similar manner to embodiments described above, the chair cover 4200 includes a catch portion 4210 and a contain portion 4220. The catch portion 4210 includes a seat cover portion 4211 and a back cover portion 4212. A drain aperture 4250 is disposed proximate the junction of the seat cover portion 4211 and the back cover portion 4212. Positioned at the top of the back cover portion 4212 is a seat top portion 4213. The seat top portion 4213 lays over the top edge of the wheelchair seat back 4294 and connects to a top edge of a seat drape portion 4221. Accordingly, the back cover portion 4212, the seat top portion 4213, and the seat drape portion 4221 provide cover and protection to the seat back 4291 of the wheelchair. The seat cover portion 4211 provides protection to the wheelchair seat 4293 and other lower components of the wheelchair, in particular. Also, the catch portion 4210 includes a seat side portion 4214 and a seat armrest portion 4215. Such portions 4214 and 4215 protect the armrest 4296 of the wheelchair, as well as the seat 4293 of the wheelchair, in particular.

The contain portion 4220 (of the chair cover 4200) includes the seat drape portion 4221 and a basin portion 4222. Accordingly, in this embodiment of the invention, the basin portion 4222 constitutes a "collection portion" as described in the embodiments above.

In utilization of the chair cover 4200 to bath a person, a person is seated in the wheelchair, upon the seat cover portion 4211. As the person is bathed using water (or a water and soap combination, or other fluid or composition as desired), the water is caught by the catch portion 4210 and routed to the drain aperture 4250. Upon passing through and exiting the drain aperture 4250, the water passes through the wheelchair back opening 4297. In this embodiment, the wheelchair is provided structurally with an opening so as to allow water to pass through. Thereafter, the water passes onto the seat drape portion 4221. The water then runs down the seat drape portion 4221—on the right surface of the portion 4221, as shown in FIG. 42. The water then passes into the basin portion 4222.

As shown, the basin portion 4222, i.e. the collection portion, is in the shape of a bin. However, in contrast to the embodiment of FIG. 41, the basin portion 4222 is not integrally connected at an end of the seat drape portion 4221. In the embodiment of FIG. 42, water running off the seat drape portion 4221 is collected in and retained by the basin portion 4222. The basin portion 4222 may include a bottom 4222-1, opposing sidewalls 4222-2, and opposing end walls 4222-3. As shown, the seat drape portion 4221 is positioned so as to be disposed within the basin portion 4222.

The catch portion 4210 and the contain portion 4220 may be supported and maintained in position using ties 4222-3 or some other mechanical support, such as Velcro straps.

Figure 43:
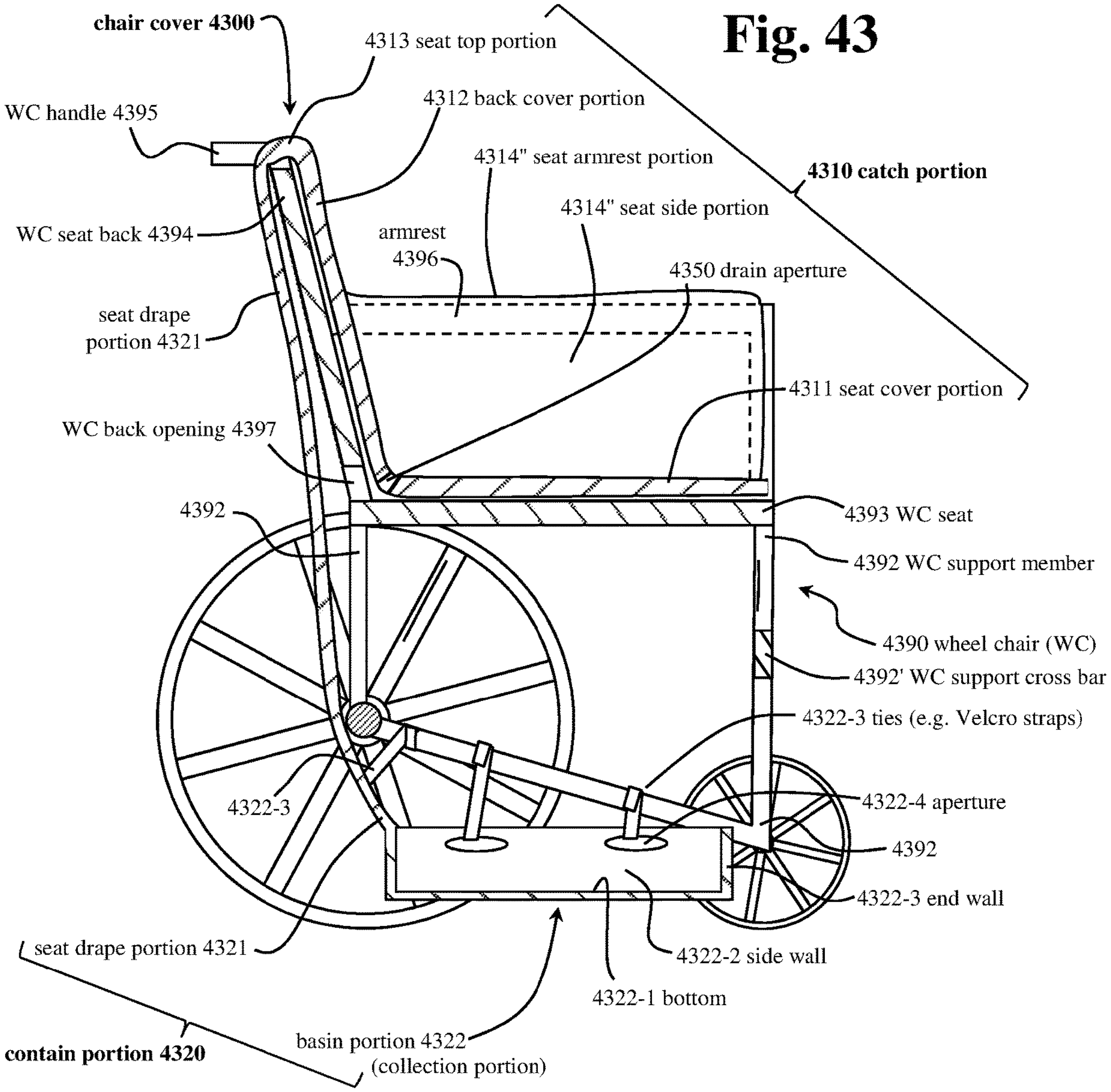
FIG. 43 is a further side cross-sectional view of a chair cover with wheelchair, in accordance with one embodiment of the invention.

FIG. 43 is a further side cross-sectional view of a chair cover 4300 with wheelchair (WC) 4390, in accordance with one embodiment of the invention. In the side cross-sectional view, various wheelchair structural components are shown. Specifically, the wheelchair structure components include a wheelchair seat 4393, a wheelchair seat back 4394, a wheelchair handle 495, and a wheelchair arm rest 4396. As shown, the structure of the wheelchair is further provided with a wheelchair back opening 4397. As shown, the wheelchair 4390 further includes wheels as shown, and various structural support members including a plurality of wheelchair support members 4392, including wheelchair support crossbar 4392'.

In a similar manner to embodiments described above, the chair cover 4300 includes a catch portion 4310 and a contain portion 4320. The catch portion 4310 includes a seat cover portion 4311 and a back cover portion 4312. A drain aperture 4350 is disposed proximate the junction of the seat cover portion 4311 and the back cover portion 4312. Positioned at the top of the back cover portion 4312 is a seat top portion 4313. The seat top portion 4313 lays over the top edge of the wheelchair seat back 4394 and connects to a top edge of a seat drape portion 4321. Accordingly, the back cover portion 4312, the seat top portion 4313, and the seat drape portion 4321 provide cover and protection to the seat back 4391 of the wheelchair. The seat cover portion 4311 provides protection to the wheelchair seat 4393 and other lower components of the wheelchair, in particular. Also, the catch portion 4310 includes a seat side portion 4314 and a seat armrest portion 4315. Such portions 4314 and 4315 protect the armrest 4396 of the wheelchair, as well as the seat 4393 of the wheelchair, in particular.

The contain portion 4320 (of the chair cover 4300) includes the seat drape portion 4321 and a basin portion 4322. Accordingly, in this embodiment of the invention, the basin portion 4322 constitutes a "collection portion" as described in the embodiments above.

In utilization of the chair cover 4300 to bath a person, a person is seated in the wheelchair, upon the seat cover portion 4311. As the person is bathed using water (or a water and soap combination), the water is caught by the catch portion 4310 and routed to the drain aperture 4350. Upon passing through and exiting the drain aperture 4350, the water passes through the wheelchair back opening 4397. In this embodiment, the wheelchair is provided structurally with an opening so as to allow water to pass through. Thereafter, the water passes onto the seat drape portion 4321. The water then runs down the seat drape portion 4321—on the right surface of the portion 4321, as shown in FIG. 43. The water then passes into the basin portion 4322.

As shown, the basin portion 4322, i.e. the collection portion, is in the shape of a bin that is integrally connected at an end of the seat drape portion 4321, as shown (such connection being similar in structure to the arrangement of FIG. 41). Accordingly, in the embodiment of FIG. 43, water running off the seat drape portion 4321 is collected in and retained by the basin portion 4322. The basin portion 4322 may include a bottom 4322-1, opposing sidewalls 4322-2, and opposing end walls 4322-3. As shown, the end wall 4322-3 disposed on the left (as shown in FIG. 43) is integrally connected to a distal end of the seat drape portion 4321. Such construction might be achieved by a suitable molding process in which the seat drape portion 4321 and the basin portion 4322 are molded together. Alternatively, the basin portion 4322 may be disconnectable from the seat drape portion 4321 utilizing suitable mechanical arrangement, for example, in similar manner to that described above with reference to FIG. 41.

The catch portion 4310 and the contain portion 4320 may be supported and maintained in position using ties 4322-3 or some other mechanical support, such as Velcro straps. To assist in such securement, the basin portion 4322 may be provided with one or more apertures 4322-4. Such apertures may be helpful in order to connect straps to the sidewalls 4322-2.

It is appreciated that the arrangement of FIG. 43, and chair cover structure 4300, is similar to the arrangement shown in FIG. 41. However, in contrast, in the arrangement of FIG. 41, the basin portion 4322 is maintained in a suspended position by suitable ties 4322-3. Such arrangement may be desired for a variety of reasons including that the wheelchair 4390 with chair cover 4300 needs to be routinely mobilized, i.e. rolled about to go from room to room, for example—or that it is desired to keep the basin portion 4322 up and away from a supporting floor surface.

Figure 44:
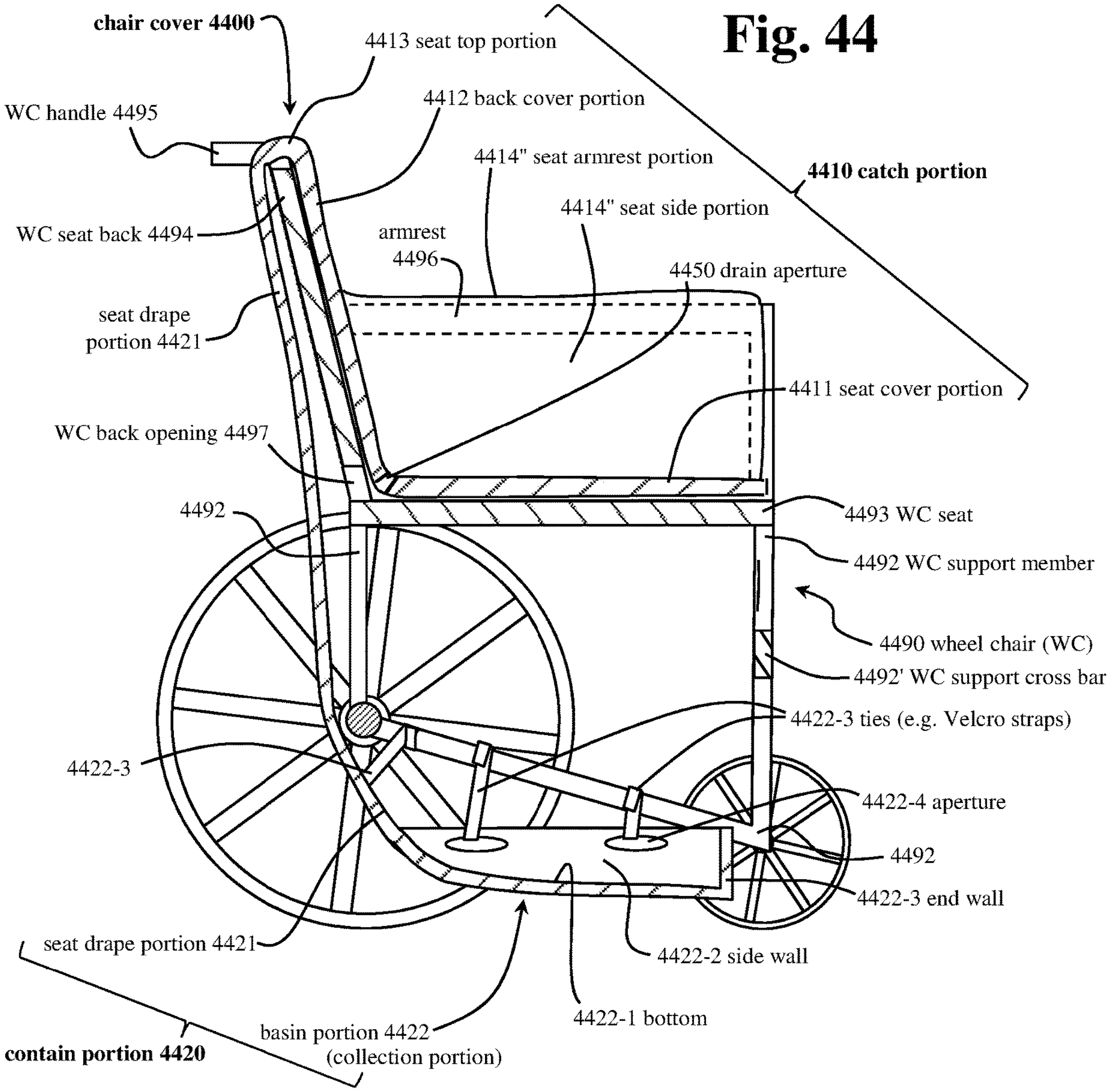
FIG. 44 is a further side cross-sectional view of a chair cover with wheelchair, in accordance with one embodiment of the invention.

FIG. 44 is a further side cross-sectional view of a chair cover 4400 with wheelchair (WC) 4490, in accordance with one embodiment of the invention. In the side cross-sectional view, various wheelchair structural components are shown. Specifically, the wheelchair structure components include a wheelchair seat 4493, a wheelchair seat back 4494, a wheelchair handle 495, and a wheelchair arm rest 4496. As shown, the structure of the wheelchair is further provided with a wheelchair back opening 4497. As shown, the wheelchair 4490 further includes wheels as shown, and various structural support members including a plurality of wheelchair support members 4492, including wheelchair support crossbar 4492'.

In a similar manner to embodiments described above, the chair cover 4400 includes a catch portion 4410 and a contain portion 4420. The catch portion 4410 includes a seat cover portion 4411 and a back cover portion 4412. A drain aperture 4450 is disposed proximate the junction of the seat cover portion 4411 and the back cover portion 4412. Positioned at the top of the back cover portion 4412 is a seat top portion 4413. The seat top portion 4413 lays over the top edge of the wheelchair seat back 4494 and connects to a top edge of a seat drape portion 4421. Accordingly, the back cover portion 4412, the seat top portion 4413, and the seat drape portion 4421 provide cover and protection to the seat back 4491 of the wheelchair. The seat cover portion 4411 provides protection to the wheelchair seat 4493 and other lower components of the wheelchair, in particular. Also, the catch portion 4410 includes a seat side portion 4414 and a seat armrest portion 4415. Such portions 4414 and 4415 protect the armrest 4496 of the wheelchair, as well as the seat 4493 of the wheelchair, in particular.

The contain portion 4420 (of the chair cover 4400) includes the seat drape portion 4421 and a basin portion 4422. Accordingly, in this embodiment of the invention, the basin portion 4422 constitutes a "collection portion" as described in the embodiments above.

In utilization of the chair cover 4400 to bath a person, a person is seated in the wheelchair, upon the seat cover portion 4411. As the person is bathed using water (or a water and soap combination), the water is caught by the catch portion 4410 and routed to the drain aperture 4450. Upon passing through and exiting the drain aperture 4450, the water passes through the wheelchair back opening 4497. In this embodiment, the wheelchair is provided structurally with an opening so as to allow water to pass through. Thereafter, the water passes onto the seat drape portion 4421. The water then runs down the seat drape portion 4421—on the right surface of the portion 4421, as shown in FIG. 44. The water then passes into the basin portion 4422.

As shown, the basin portion 4422, i.e. the collection portion, is in the shape of a bin that is integrally connected at an end of the seat drape portion 4421, as shown (such connection being similar in structure to the arrangement of FIG. 41). Accordingly, in the embodiment of FIG. 44, water running off the seat drape portion 4421 is collected in and retained by the basin portion 4422. The basin portion 4422 may include a bottom 4422-1, opposing sidewalls 4422-2, and an end wall 4422-3. As shown, the bottom 4422-1, on the left (as shown in FIG. 44) is integrally connected to a distal end of the seat drape portion 4421. Such construction might be achieved by a suitable molding process in which the seat drape portion 4421 and the basin portion 4422 are molded together. Alternatively, the basin portion 4422 may be disconnectable from the seat drape portion 4421 utilizing suitable mechanical arrangement, for example, in similar manner to that described above with reference to FIG. 41.

The catch portion 4410 and the contain portion 4420 may be supported and maintained in position using ties 4422-3 or some other mechanical support, such as Velcro straps. To assist in such securement, the basin portion 4422 may be provided with one or more apertures 4422-4. Such apertures may be helpful in order to connect straps to the sidewalls 4422-2.

It is appreciated that the arrangement of FIG. 44, and chair cover structure 4400, is similar to the arrangement shown in FIG. 41. However, in contrast, in the arrangement of FIG. 44, the basin portion 4422 is maintained in a suspended position by suitable ties 4422-3 and the seat drape portion 4421 forms a continuous surface with the bottom 4422-1 of the basin portion. Such arrangement may be desired for a variety of reasons including that the wheelchair 4490 with chair cover 4400 needs to be routinely mobilized and to reduce splashing of water—as water passes from the seat drape portion 4421 to the basin portion 4422.

Various further embodiments are described above with reference to FIG. 40-FIG. 44. It is appreciated that various variations of such embodiments are envisioned. For example, the basin portion of FIGS. 41-44 may be provided with a suitable drain hole with plug. Such drain hole may well be helpful in releasing water from the basin portion at a desired time.

Figure 45A:
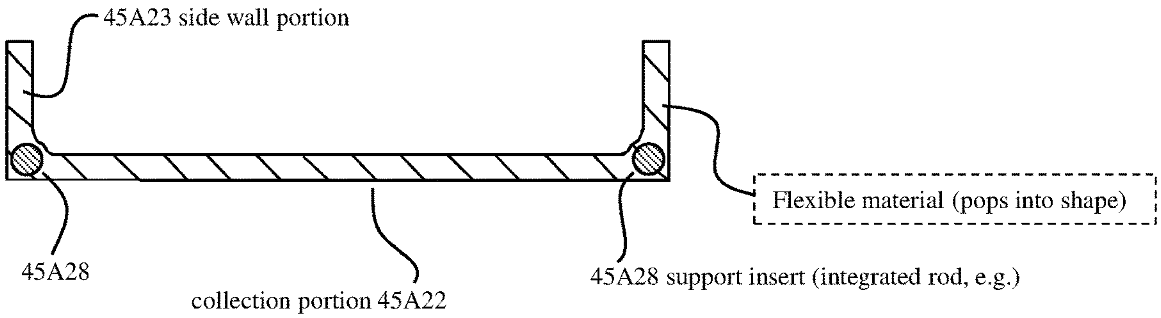
FIG. 45A is a cross-sectional diagram of a collection portion, in accordance with one embodiment of the invention.

In the various embodiments described above, various arrangements are provided for the described collection portion. For example, in FIGS. 40-44, in which a collection portion is constituted by the described basin portion, various arrangements, shapes, and manners of attachment are described. It is appreciated that the various collection portions, described herein, may be reinforced and/or maintained in a desired shape with suitable materials as desired. With regard to such reinforcement, FIG. 45A is a cross-sectional diagram of a collection portion 4522. For purposes of reference, the collection portion 45A22 might, for example, be a front cross-sectional view of the basin portion 4122 of FIG. 41. As shown in FIG. 45A, the collection portion 45A22 may be provided with side wall portions 45A23. The structure may include reinforcing, integrated rods 45A28 running along a lower edge of such sidewall portions, for example. Such structure may be provided, for example, so as to provide structural rigidity, but yet allow folding of the collection portion 45A22, as may be desired.

Figure 45B:
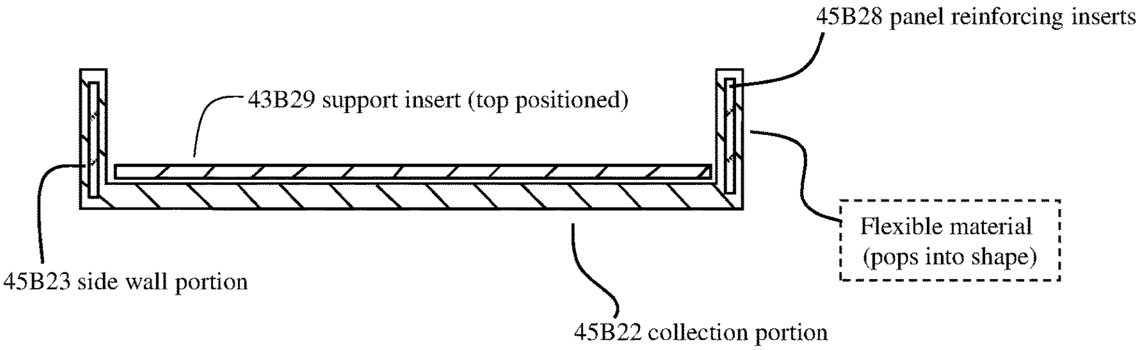
FIG. 45B shows a further collection portion, in accordance with one embodiment of the invention.

Relatedly, FIG. 45B shows a further collection portion 45B22. The collection portion 45B22 includes opposing sidewall portions 45B23. As shown, each sidewall portion 45B23 may be provided with panel reinforcing inserts 45B28. Such inserts might be in the form of thin panels that are inserted, such as in a molding process, into the sidewall portion 45B23. Alternatively, the panel reinforcing inserts might be of some other shape, such as a series of smaller panels and/or a sequence of rods, for example. The particular shape and size of the insert(s), as well as the spatial orientation and/or arrangement of the insert, may be varied as desired. Also, reinforcement is not limited to the sidewalls. That is, for example, end walls and/or a bottom of a collection portion and/or other structural components may be reinforced as desired.

Accordingly, FIGS. 45A and 45B describe features of reinforcement which may be utilized in any of the collection portions, or other structural components, described herein.

Figure 46:
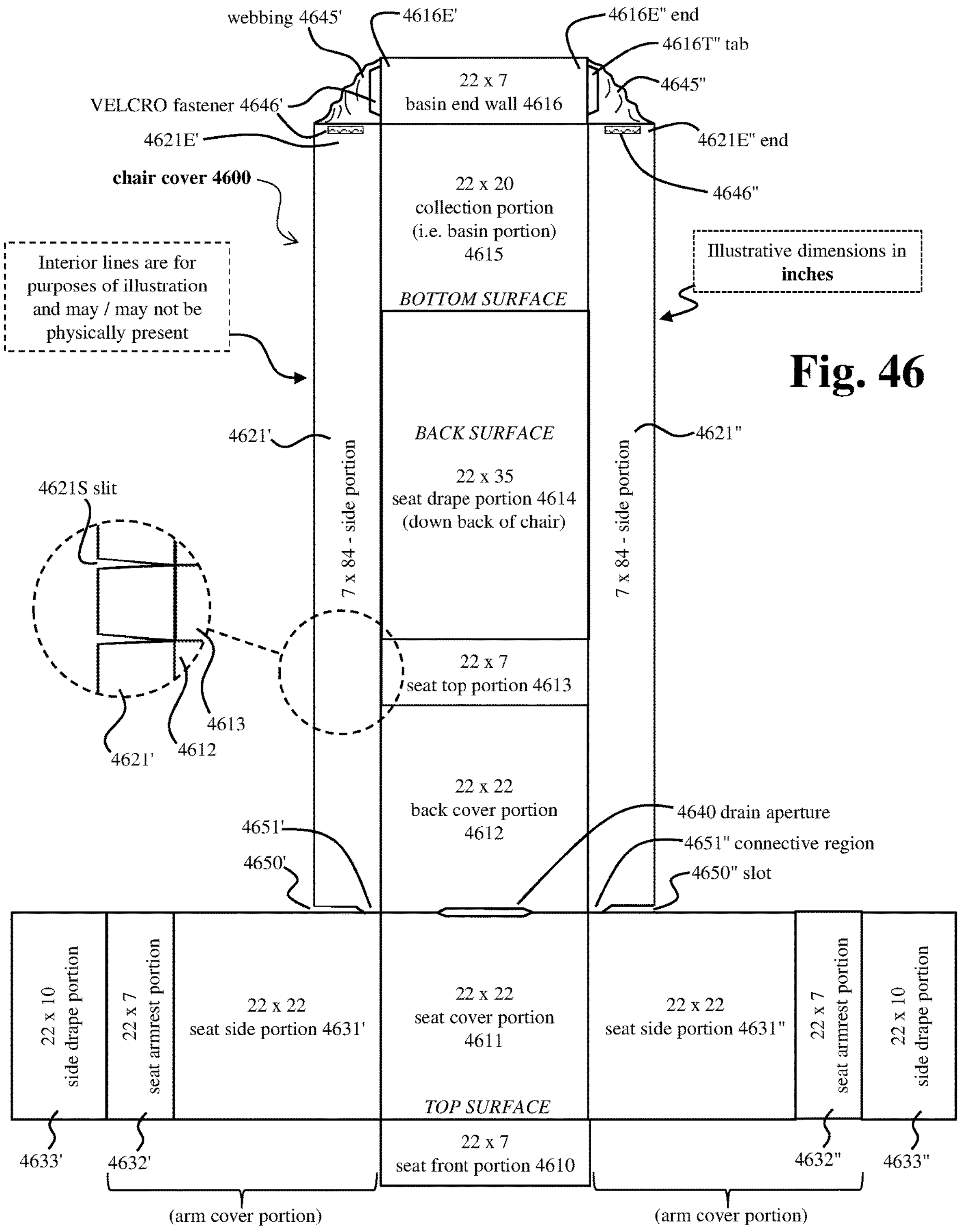
FIG. 46 is a diagram showing details of a chair cover structure, in accordance with one embodiment of the invention.

FIG. 46 is a diagram showing details of a chair cover structure, in accordance with one embodiment of the invention. Various embodiments of chair covers of the invention are described above with reference to FIGS. 34-45, for example. FIG. 46 is provided to show illustrative dimensions (in inches) of the various portions of an illustrative chair cover 4600, in accordance with one embodiment of the invention. As shown, the chair cover 4600 includes a seat cover portion 4611 that covers a seat of the chair, such as a wheelchair. As shown in FIG. 46, what would be a top surface of the seat cover portion 4611 is shown. Connected to the portion 4611 is a seat front portion 4610. The seat front portion 4610 is provided to drape down in front of the seat of the chair (upon which the cover 4600 would be positioned), so as to further protect the chair from the particular cleaning fluid being used, such as water.

A back cover portion 4612 is connected to the portion 4611 on the side that opposes the connection of the seat front portion 4610. As shown, drain aperture 4640 is disposed proximate both a rear edge of the seat cover portion 4611 and what would be (in use) a lower portion of the back cover portion 4612. A seat top portion 4613 is attached to an upper edge of the back cover portion 4612. The seat top portion 4613 is provided to lay over and span the top of the chair (upon which the cover 4600 is positioned).

In turn, connected to the seat top portion 4613 is the seat drape portion 4614. The seat drape portion 4614 is provided to drape down the back of the chair being protected. In manner as described above, it is the seat drape portion 4614 that redirects water flowing from the drain aperture 4640—and directs that water to a collection portion. Accordingly, as shown, a collection portion 4615 is in turn connected to the portion 4614. Since the chair cover 4600 is provided to effectively wrap around a chair, it is the "bottom surface" of collection portion 4615 that is shown in FIG. 46, i.e. the surface that would be downward, so as to face a supporting floor surface.

In the manner described above, the collection portion 4615 (i.e. "basin portion" as characterized above) may simply allow water to flow off such collection portion onto a drained surface, for example. Alternatively, the collection portion 4615 may indeed collect and retain water. To such end—of collecting and retaining water—a basin end wall 4616 is attached to a far end of the collection portion 4615.

As shown in FIG. 46, opposing side portions 4621 (4621', 4621") run along the edge of the portions 4612, 4613, 4614, and 4615. Such side portions 4621 may also be connected, as shown, to opposing seat side portions 4631 (4631', 4631").

That is, connected to opposing sides of the seat cover portion 4611 are respective seat side portions 4631. In turn, connected to an outer edge of each portion 4631 are seat armrest portions 4632 (4632', 4632"). In turn, connected to an outer edge of each portion 4632, are side drape portions 4633 (4633', 4633"). The seat side portions 4631 serve to collect and/or route water (toward the drain aperture 4640) and to protect the side of the particular chair. The seat armrest portion 4632 serves to collect water and protect the top of an armrest of the chair. The side drape portion 4633 is provided to drape down from the armrest of the chair on the particular side. Accordingly, the side drape portion 4633 serves to protect the side of the particular chair as well as any other components of the chair disposed on the side. Such components might include, for example, a wheel of the wheelchair on each side. Hence the side drape portion might also be characterized as a wheel cover portion.

In accordance with one characterization of the invention, the seat armrest portion 4632 and the seat side portion 4631 (on each side) may be understood to constitute an arm cover portion, as reflected in FIG. 46.

As shown, the chair cover 4600 includes slots 4650 (4650', 4650") disposed adjacent to a connective region 4651 (4651', 4651") that serve to connect the side portion 4621 to the seat side portion 4631, on each side. When the chair cover 4600 is disposed on a supporting chair, the connective region 4651 extends up the lower back corner of the chair, on each side. Such arrangement precludes water from running out such lower outer corners of the chair, i.e. and routes the water to the drain aperture 4640. The particular length of the connective region 4651 is a choice of design. For example, a length of 1 inch might be utilized so as to effectively prevent water from running out the corners of the chair, as well as to allot for some degree of wrinkling and misplacement of the chair cover 4600 upon the supporting chair.

As noted above, the collection portion 4615 may provide a runoff surface (by which water is routed to run off onto a desired surface) or alternatively, may provide a basin that collects and retains water in such basin. To that end, an end 4621E (4621E', 4621E") of each side portion 4621, adjacent to the basin end wall 4616, may be provided with an attachment mechanism to attach to the basin end wall 4616. Illustratively, as shown in FIG. 46, a hook and loop (for example Velcro) fastener 4646 (4646', 4646") mechanical fastener might be utilized. For example, an adhesive segment of "hooks" might be disposed on the end 4621E of each side portion 4621 and an adhesive segment of "loops" might be disposed on tabs 4616T disposed on each opposing end (4616E) of the basin end wall 4616. Relatedly, plastic, foldable webbing 4645 (4645', 4645") may be attached as shown in FIG. 46 so as to span between the side portion end 4621E and end 4616E of the basin end wall 4616. Such webbing 4645 is flexible so as to expand and stretch out in the case of the collection portion being used merely to control runoff. Alternatively, the webbing is flexible so as to "fold up" into a corner so formed when fasteners 4646 are utilized to join the end 4621E of the side portion 4621 to an end 4616E of the basin end wall 4616 (on both sides). When folded up into such formed corner, the webbing 4645 provides a water tight arrangement (i.e. such water tight arrangement may well not be provided by merely the fasteners 4646 or other mechanical arrangement). Accordingly, the arrangement shown in FIG. 46 may provide the option for the corners (at end 4616E and end 4621E) to be attached (so as to collect water in the collection portion) or not attached (so as to allow water to drain onto a drain floor), for example.

As noted above, various dimensions are illustratively shown in FIG. 46. It is of course appreciated that such dimensions may well be varied in manufacturing based on a variety of parameters. In particular, the particular dimensions used in manufacturing of the chair cover 4600 may be varied in light of the dimensions of the particular wheelchair or other chair upon which the cover 4600 is intended to be used.

Figure 47:
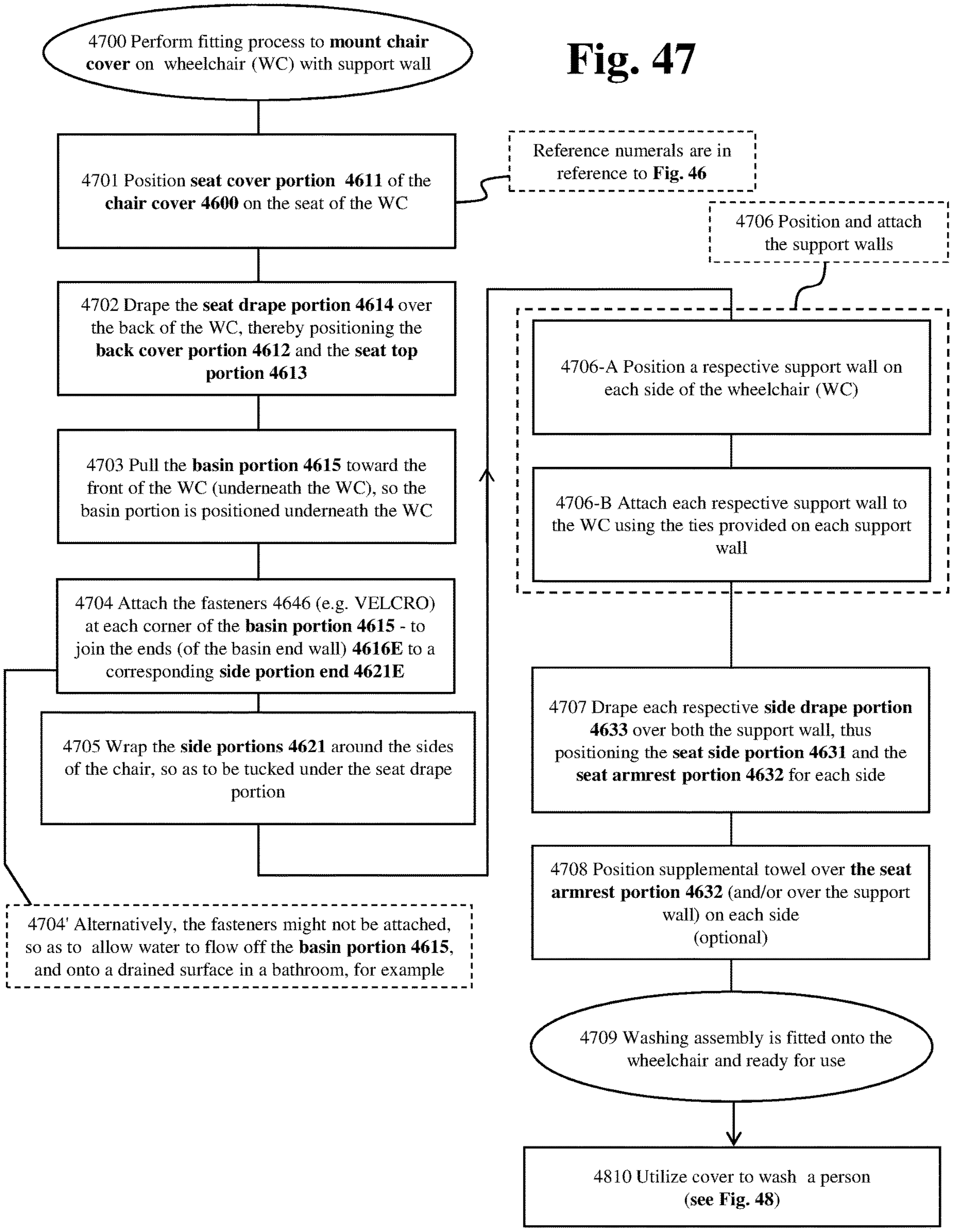
FIG. 47 is a flowchart showing details to perform a fitting process to mount a chair cover upon a wheelchair, in conjunction with utilization of support walls, in accordance with one embodiment of the invention.
Figure 48:
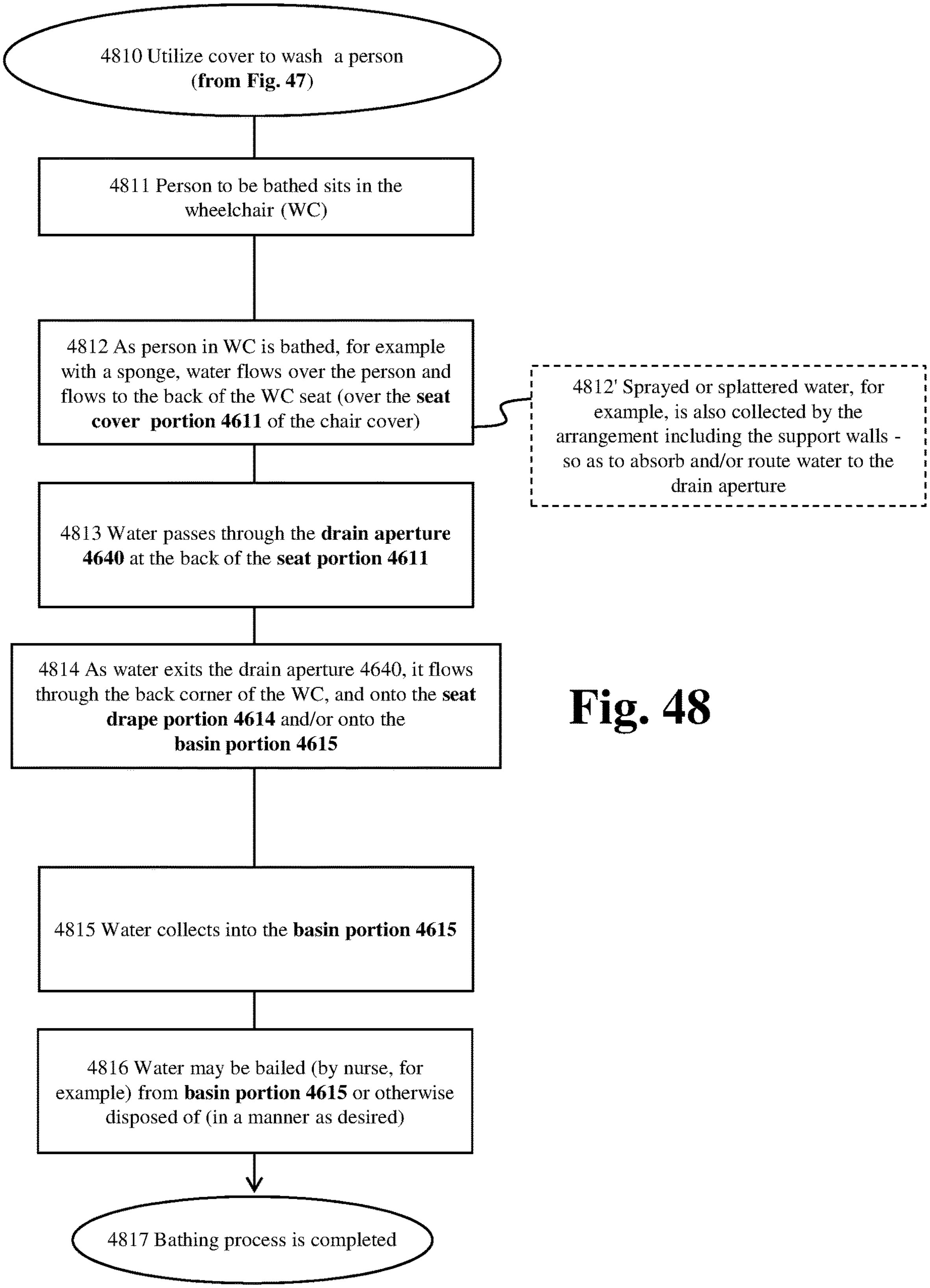
FIG. 48 is a flowchart showing in further detail the “utilize cover to wash a person” step of FIG. 47, in accordance with one embodiment of the invention.
Figure 49:
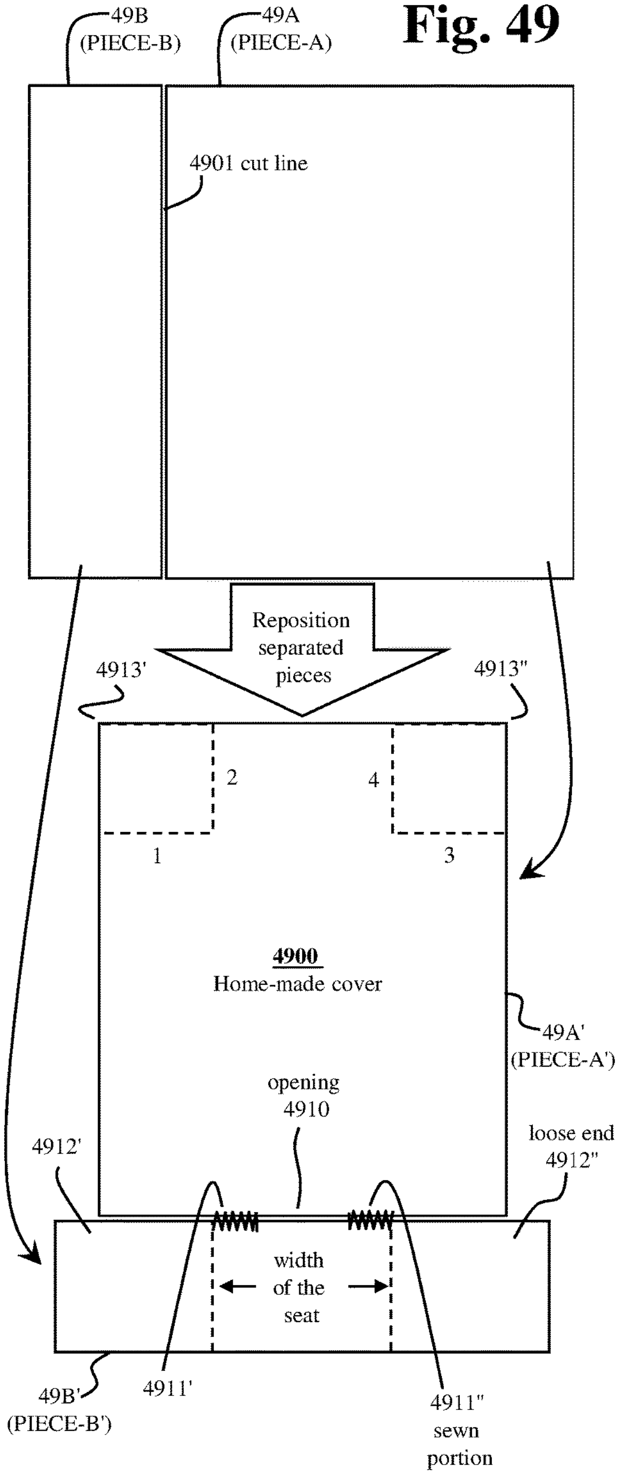
FIG. 49 is a diagram showing conversion of a known shower curtain into the novel chair cover, in accordance with one embodiment of the invention.
Figure 50:
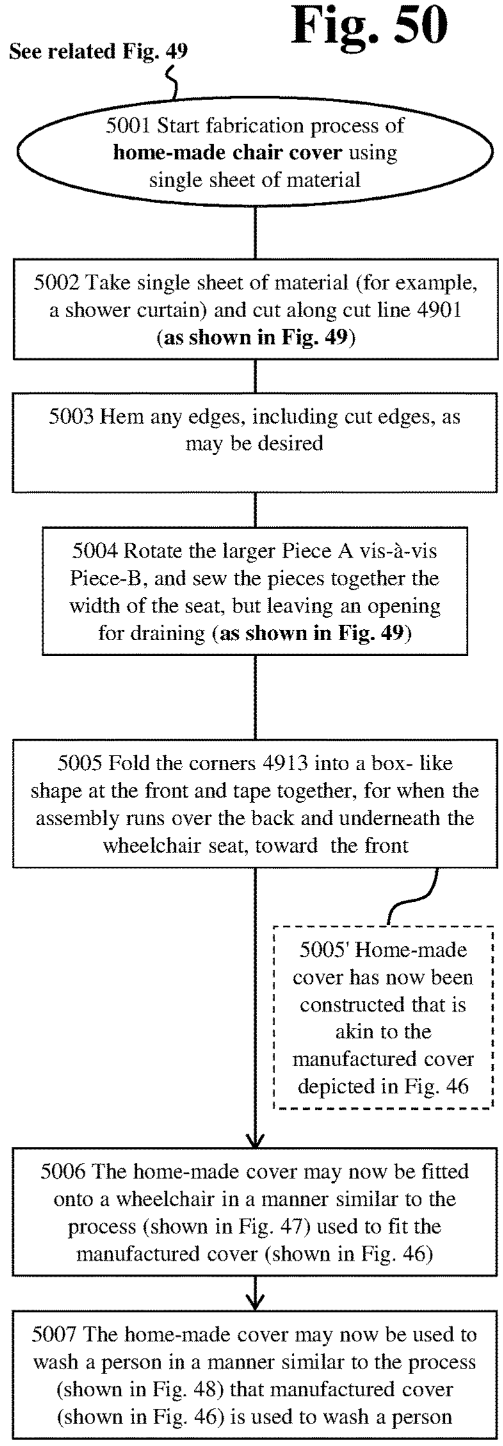
FIG. 50 is a flowchart showing details of a fabrication process of a homemade chair cover, in accordance with an embodiment.

FIG. 47, FIG. 48 and FIG. 50 are flowcharts showing various steps associated with utilization of a chair cover in accordance with embodiments of the invention. Such illustrated steps further include the utilization of a support wall. The features and embodiments of such support wall are described below. Thereafter, the details of FIG. 47, FIG. 48 and FIG. 50 are described, as well as the details of FIG. 49.

Figure 51:
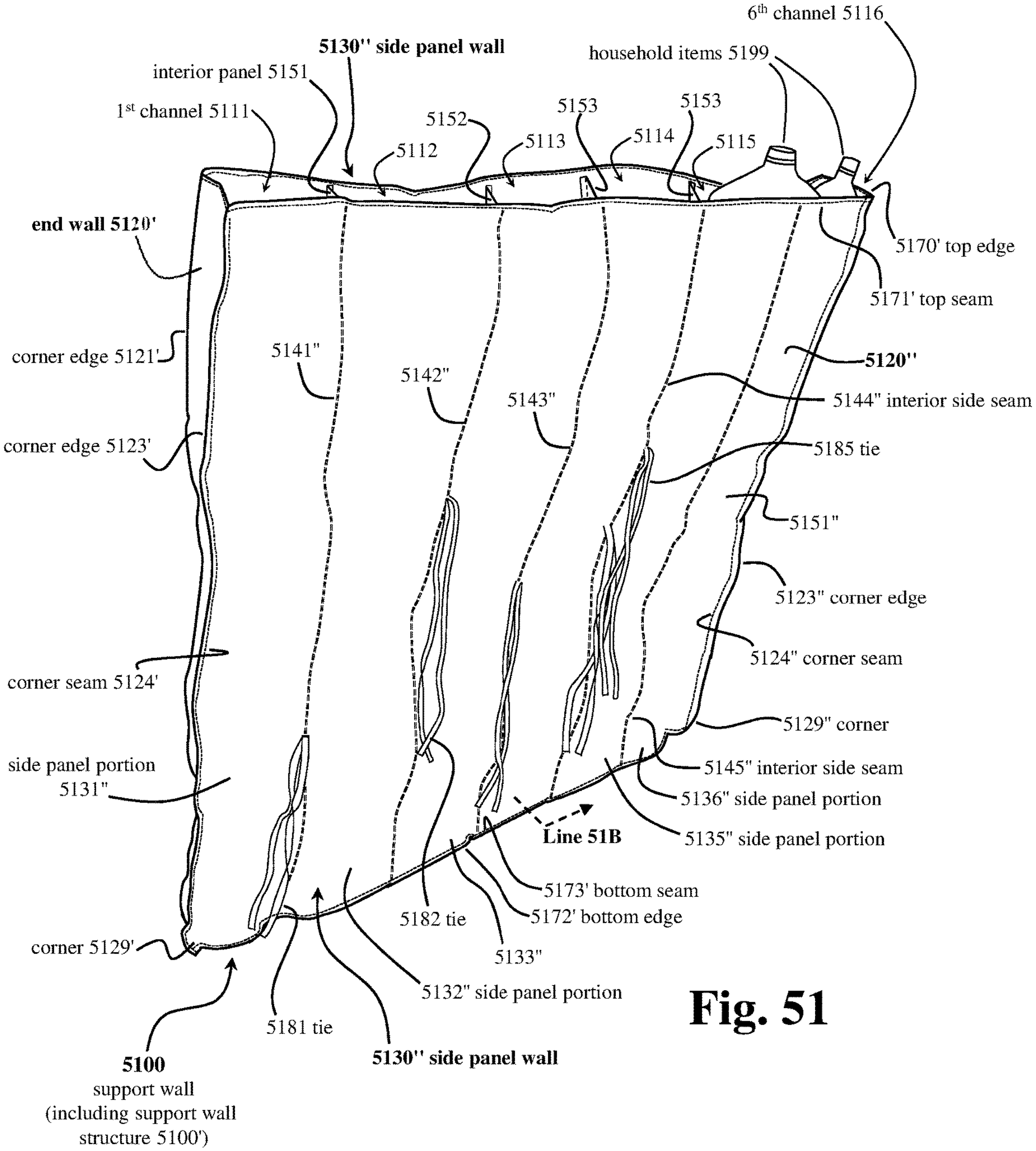
FIG. 51 is a perspective view of a support wall, in accordance with one embodiment of the invention.

FIG. 51 is a perspective view of a support wall 5100 in accordance with one embodiment of the invention. The support wall includes a highly practical, economical structure that (in accord with one utilization) is usable in conjunction with commonly available household items 5199. In summary, the support wall 5100 includes a plurality of vertical channels disposed along the length of the support wall, as shown. The channels are designed to accept and hold such household items 5199. Accordingly, the support wall structure provides what might be characterized as an organizational shell. The household items are disposed in such "shell" so as to provide structural substance, strength and shape. Accordingly, the "support wall" 5100 may be characterized as constituted by a "support wall structure"

5100' and "household items" 5199 that are disposed in the support wall structure. The support wall may be constructed of translucent fabric, woven polyester voile, curtain material, and/or cotton lace, for example, as well as other materials as may be desired.

As shown, the structure includes two opposing side panel walls 5130. Joining the ends of such side panel walls 5130 (on the left hand side as shown in FIG. 51) is end wall 5120', connected at corner edge 5121' and corner edge 5123'. Such end wall 5120' may be connected to the side panel walls 5130 in any suitable manner, such as by being "stitched" together as reflected by corner seam 5124' at which the two pieces of fabric, for example, are sewn together. As used herein, "stitched" and "sewn" are used interchangeably to mean connected with string, thread, or cable, for example. Joining the ends of such side panel walls 5130 (on the right hand side as shown in FIG. 51) is end wall 5120", connected at corner edge 5123" (and terminating at lower corner 5129") and a back corner edge (not shown in FIG. 51). Such end wall 5120" may also be connected to the side panel walls 5130 in any suitable manner, such as by being "stitched" together as reflected by corner seam 5124". In general, it is appreciated that any edge of the support wall structure and/or any seam between two panels of the support wall structure may be attached via suitable sewing or stitching (or other mechanical attachment arrangement mechanism), such as at top seam 5171' adjacent to a top edge 5170' of the support wall. Relatedly, is appreciated that the various components of the support wall 5100 that are sewed or stitched together, for example, may indeed be constructed instead of one integral piece of material. Further, various components of the support wall 5100 that are shown constructed of one integral piece of material may instead be constructed of multiple pieces of material that are sewn or stitched together, for example.

Figure 51B:
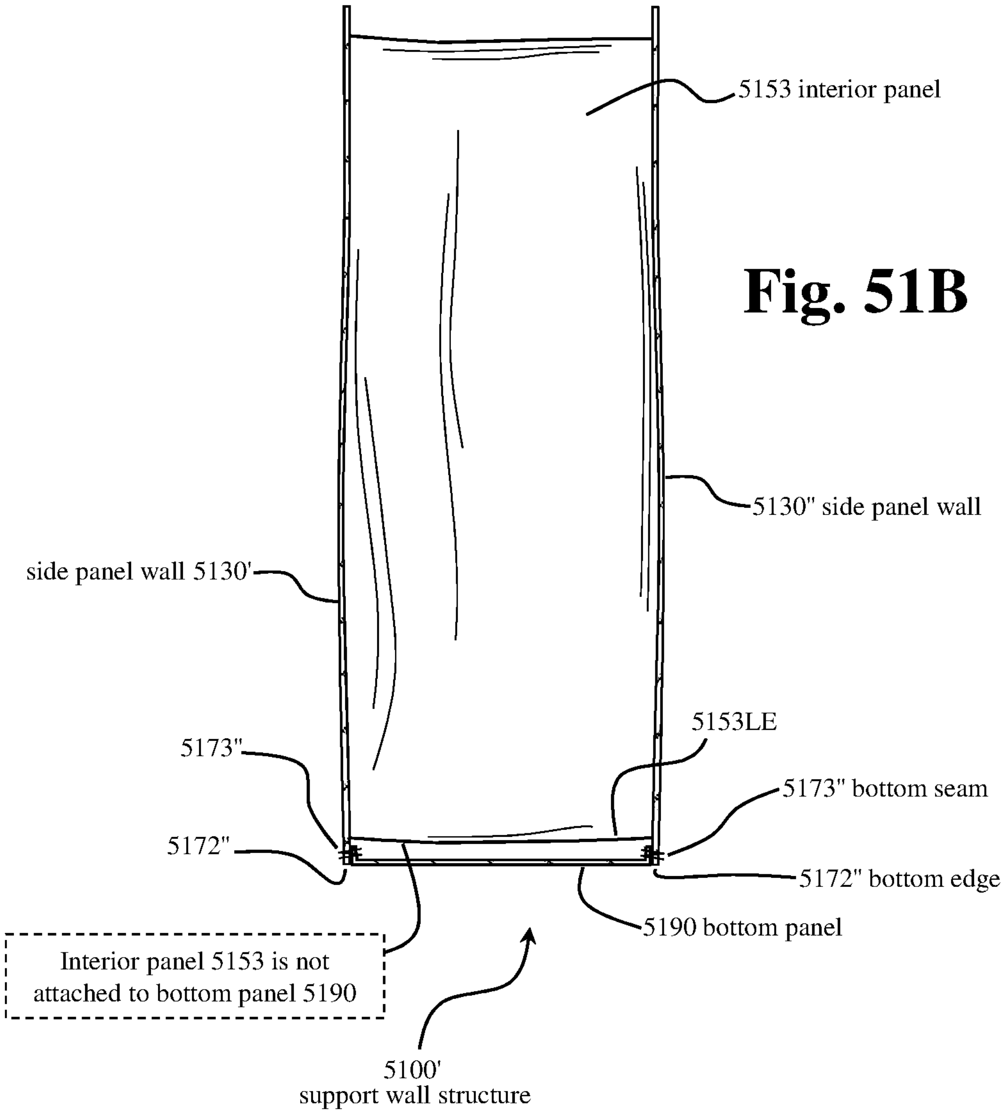
FIG. 51B is a cross sectional view along line 51B of FIG. 51 (showing further details of a support wall structure), in accordance with one embodiment of the invention.

In the embodiment of FIG. 51, a rectangular bottom panel (5190—shown in FIG. 51B, but not shown in FIG. 51) is disposed at the bottom of the support wall 5100—with respective edges attached respectively to the side panel wall 5130", the side panel wall 5130', the end wall 5120' and the end wall 5120". Further details are shown in FIG. 51B. Accordingly, such structure collectively forms an interior space. As shown in FIG. 51, this interior space is separated into a plurality of channels. More specifically, a plurality of interior panels (for example 5151, 5152, 5153) separates the interior space into a plurality of channels (5111, 5112, 5113, 5114, 5115, 5116). The plurality of interior panels may be connected to the bottom panel 5190 (such as by utilizing a stitched attachment) or may not be attached to the bottom panel. Each of the interior panels may be connected to the opposing side panel walls 5130 utilizing a suitable mechanical attachment mechanism, such as by sewing or stitching. As shown in FIG. 51, the interior panels may be attached to the side panel wall 5130", for example, respectively along interior side seams 5141", 5142", 5143", 5144", 5145, such as by stitching or sewing.

It is of course appreciated that the various dimensions of the support wall 5100 may be varied as desired. In particular, the overall dimensions of the support wall may be varied, as well as the dimensions of the plurality of vertical channels. Relatedly, the number of channels may be varied as desired. The particular dimensions chosen in manufacture of the support wall structure 5100' may be based on a variety of factors, such as the dimensions of the particular chair with which the structure 5100' will be used, the intended manner of use, the intended items to be placed in the structure 5100' (such as plastic bags, milk jugs, soda bottles, etc.) and other factors.

As described in further detail below, the support wall 5100 may be variously utilized in conjunction with the chair covers and/or the chairs described herein.

In order to attach the support wall 5100 to a structure, such as a wheelchair, the support wall 5100 includes a plurality of ties, such as ties 5181, 5182, and 5185. It is appreciated that attributes of such ties attached to the side panel wall 5130" may be varied as desired, such as varying whether the ties are high or low on the support wall structure, the horizontal placement of the ties along the length of the support wall structure, the number of ties, the length of the ties, the strength of the ties, the construction of the ties, as well as other attributes. So as to provide sufficient structural strength, it may be preferred to attach the ties at an interior side seam (5141", 5142", 5143", 5144", 5145" for example) since such attachment placement would better utilize the structural strength of a corresponding interior panel (e.g. 5152), in addition to utilizing the strength of the particular side panel wall 5130. Relatedly, it is appreciated that the ties may well be attached on an end wall of the support wall structure and/or on both of the side panel walls 5130, i.e. in addition to the attachment on the one side panel wall shown in FIG. 51. Further, it is of course appreciated that the invention is not limited to specifically "ties" to connect the support wall structure 5100 to a structure, such as a wheelchair. Rather other mechanical devices might be utilized, such as straps with one or more buckles, strips of plastic with pads of hook/loop fasteners (Velcro), or some other arrangement. Indeed, simply tape, such as medical tape, might be utilized.

FIG. 51B is a cross sectional view along line 51B of FIG. 51 (showing further details of the support wall structure 5100'), in accordance with one embodiment of the invention. In particular, FIG. 51B is provided to show features of the bottom panel 5190.

FIG. 51B shows support wall structure 5100' including side panel wall 5130' and side panel wall 5130". FIG. 51B, as well as FIG. 51, shows an interior panel 5153 spanning between such side panel wall 5130' and side panel wall 5130". In particular, FIG. 51B also shows a bottom panel 5190. The bottom panel 5190 spans between the bottom edge 5172" (of the panel 5130") and the bottom edge 5172' (of the panel 5130')—and thus provides a bottom to the support wall structure 5100'. As shown, the bottom panel 5190 may be attached to such bottom edges (5172', 5172") by a mechanical attachment arrangement, such as stitching, as reflected by bottom seams 5173' and 5173". In the embodiment of FIG. 51B, a lower edge 5153LE of the interior panel 5153 is not attached to the bottom panel 5190, but rather slightly spaced above the bottom panel. Such dis-connected arrangement may be helpful in folding the support wall structure 5100' before or after use, or may be helpful for other reasons, such as to allow a greater variety of household items 5199 to be inserted into the channels of the support wall. However, in other embodiments the panel 5153 may be attached to the bottom panel 5190, such as by stitching or some other mechanical arrangement, i.e. so as to provide enhanced structural integrity, for example.

Figure 52:
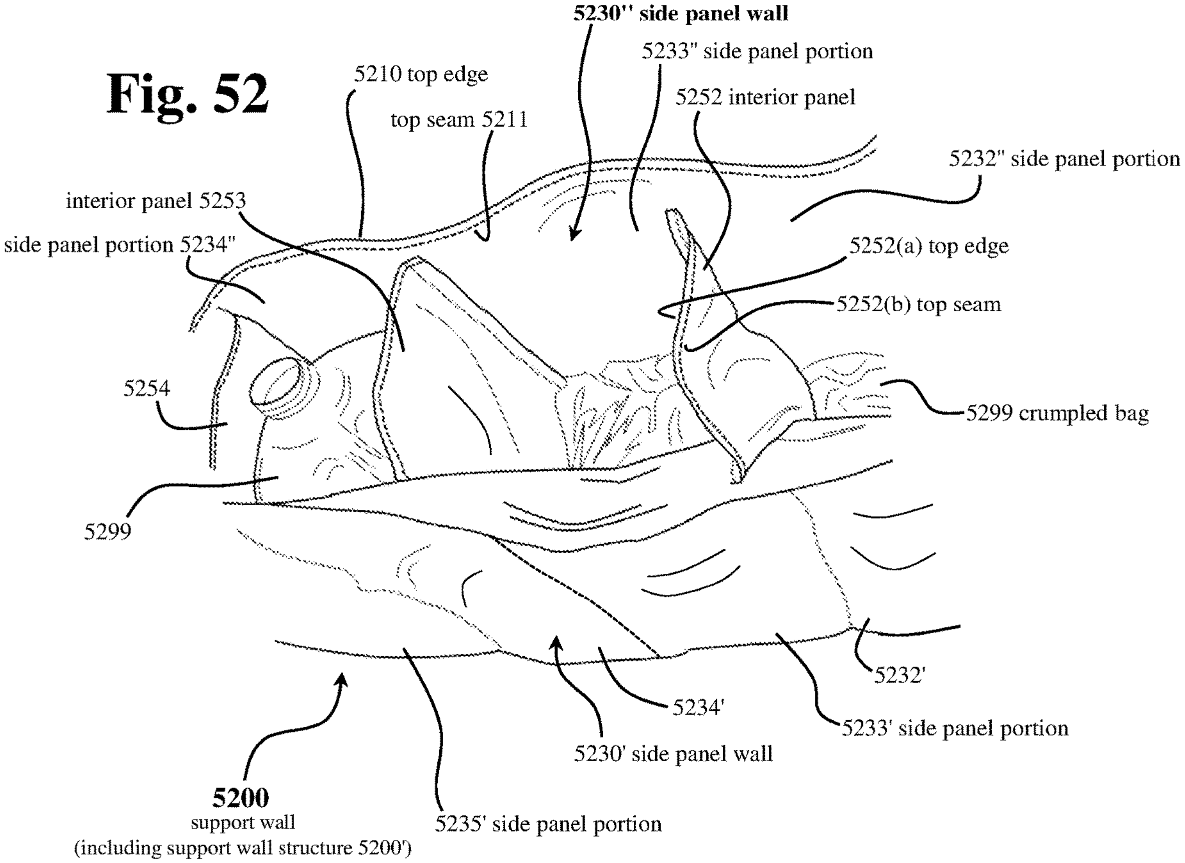
FIG. 52 is a top perspective view showing a support wall of structure similar to the support wall of FIG. 51, in accordance with one embodiment of the invention.

FIG. 52 is a top perspective view showing a support wall 5200 of structure similar to the support wall of FIG. 51, in accordance with one embodiment of the invention. The support wall includes support wall structure 5200' and household items 5299. In the manner described above with reference to FIG. 51, the support wall structure 5200' includes channels that accept any of the a variety of household items 5299. With such arrangement, the support wall structure 5200', in combination with the household items 5299 inserted into the channels, provides a highly useful support wall 5200 that may be utilized with any of a wide variety of chair covers and/or chairs as otherwise described herein.

The support wall structure 5200' includes a side panel wall 5230' and a side panel wall 5230". The side panel walls 5230 are connected together via a plurality of interior panels 5252, 5253, 5254. As defined by the placement of the plurality of interior panels, a plurality of channels are defined into which are received household items 5299. More specifically, each channel is defined by a pair of interior panels in conjunction with a pair of side panel portions, i.e., the side panel portions collectively constituting a side panel wall. This is the case excepting on each end, wherein a channel at the end is formed in part by an "end wall" (as shown in FIG. 51). Accordingly, as shown in FIG. 52, one channel is defined by interior panel 5252, side panel portion 5233', interior panel 5253 and side panel portion 5233". The support wall structure 5200' may include a bottom, in the manner shown in FIG. 51B.

As noted above, the side panel portions collectively constitute a respective side panel wall. Thus, side panel portion 5232", side panel portion 5233", side panel portion 5234" and side panel portion 5235" collectively constitute the side panel wall 5230". Side panel portion 5232', side panel portion 5233', side panel portion 5234', and side panel portion 5235' collectively constitute the side panel wall 5230'.

As shown in FIG. 52, a mechanical arrangement, such as stitching, may be utilized to connect together the various components of the support wall structure 5200' and/or reinforce the various components. For example, a top edge 5210 may be reinforced using stitching as shown at a top seam 5211. Alternatively, one or more components may be integrally formed, such as via a suitable molding process—i.e. instead of being separate pieces connected together.

Figure 53:
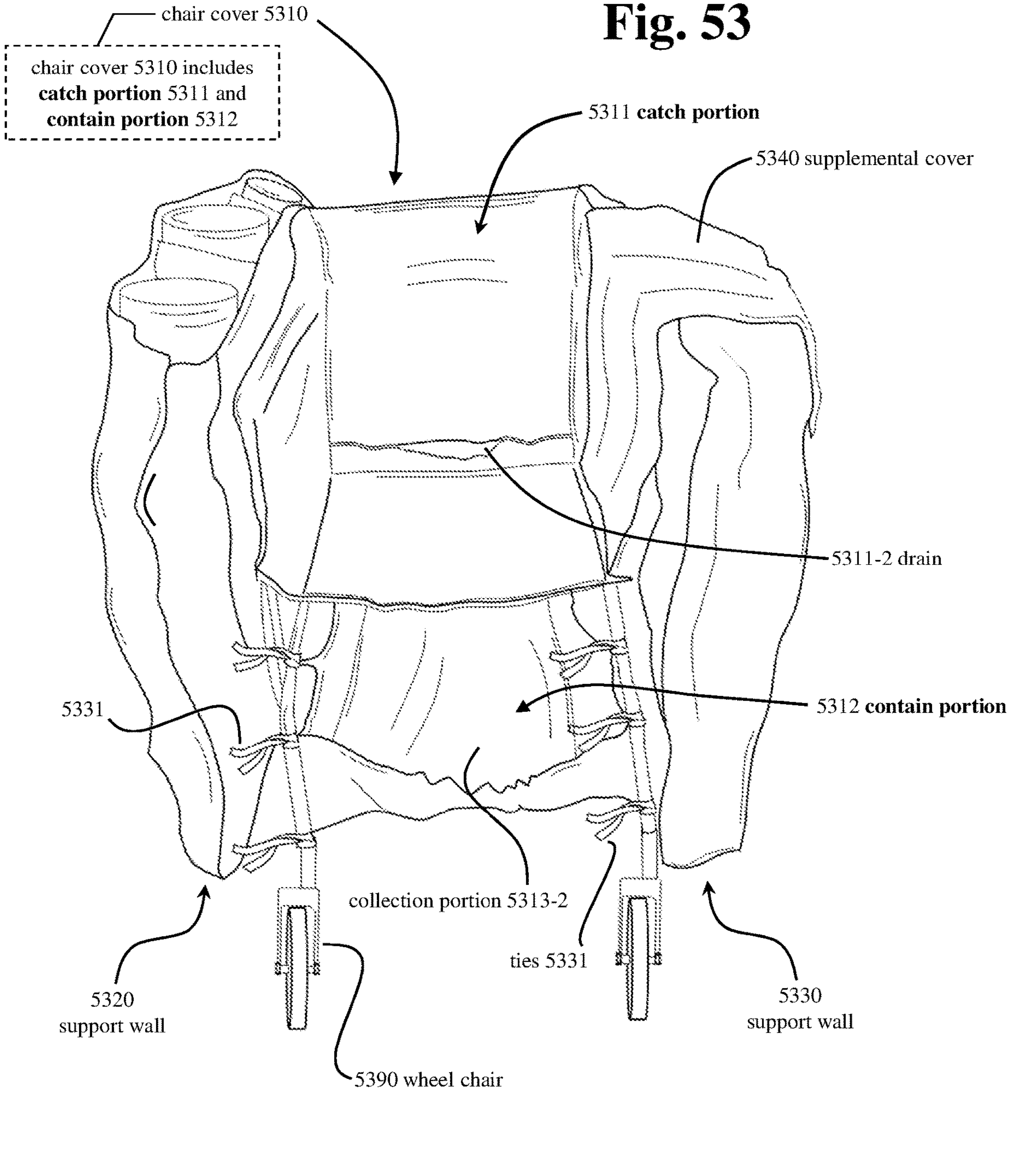
FIG. 53 is a diagram showing a chair cover in combination with multiple support walls and wheelchair, in accordance with one embodiment of the invention.

FIG. 53 is a diagram showing a chair cover in combination with multiple support walls and wheelchair, in accordance with one embodiment of the invention. The illustrated chair cover 5310 may be similar in construction to, and illustrates possible application of, any of the chair covers described above and shown in FIGS. 34-44, for example. The illustrated support walls may be similar in construction to, and illustrate possible application of, any of the support walls described above and shown in FIGS. 51-52, for example.

As is shown in FIG. 53, the chair cover 5310 includes a catch portion 5311 and a contain portion 5312 in manner as described above. In particular, the catch portion 5311 includes a drain, i.e. drain aperture, 5311-2. The combination of FIG. 53 further includes a support wall 5320 and a support wall 5330. Each of the support walls are disposed on opposing sides of a wheel chair 5390. Each of the support walls 5320, 5330 contain household items such as plastic bottles, milk jugs, and plastic bags, for example. In the manner as described above, support walls 5330 and 5320 may be provided with suitable ties so as to attach each support wall to the wheelchair 5390.

As described above, each support wall may be constructed of lightweight material, yet have a structural substance due to the household items "stuffed" into the various channels of each support wall. The arrangement of FIG. 53 provides an effective arrangement by which water used in bathing a person (who is sitting in the wheelchair, for example) may be effectively contained, drained off, and/or absorbed by the various structures. The arrangement of FIG. 53 may further include a supplemental cover 5340. The supplemental cover 5340 may simply be a towel disposed over the arm of the wheelchair (such arm being covered by the chair cover 5310) as well disposed over the support wall 5330. In particular, water sprayed or splattered from the bathing process may be absorbed by either the support walls and/or the supplemental cover 5340. Depending, of course, on the method of bathing, the majority of water may simply run off the patient and into the drain 5311-2. Thereafter, such water flows into the collection portion 5313-2, in the manner as described above. The collection portion 5313-2 may include a variety of ties 5331 to secure the collection portion 5313-2 to the wheelchair 5390, as desired.

Figure 54:
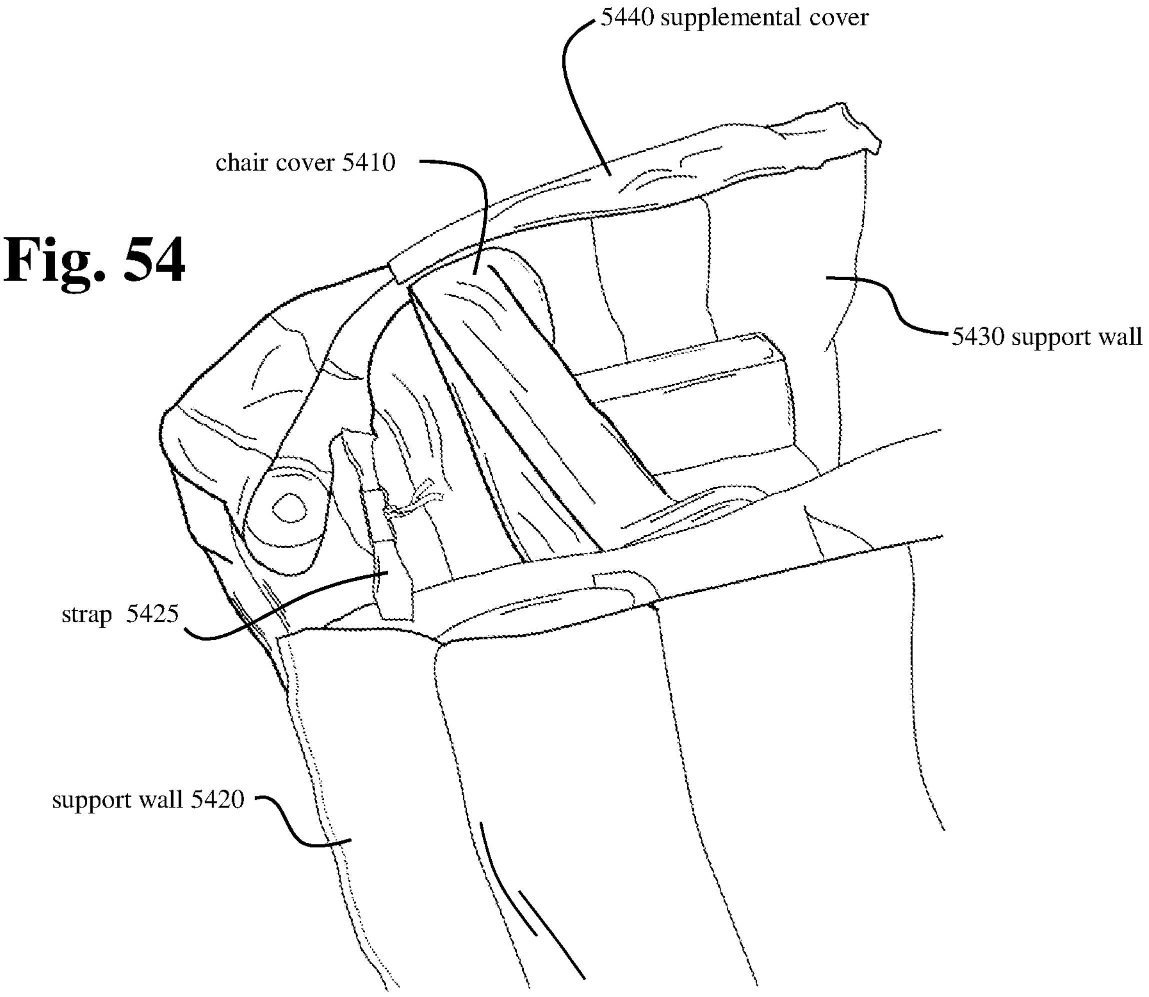
FIG. 54 is a perspective view showing a further chair cover in combination with multiple support walls and wheelchair, in accordance with one embodiment of the invention.

FIG. 54 is a further perspective view showing a chair cover in combination with multiple support walls and wheelchair, in accordance with one embodiment of the invention. The illustrated chair cover 5410 may be similar in construction to, and illustrates possible application of, any of the chair covers described above and shown in FIGS. 34-44, for example. The illustrated support walls may be similar in construction to, and illustrate possible application of, any of the support walls described above and shown in FIGS. 51-52, for example.

The combination of FIG. 54 includes the chair cover 5410, the support wall 5420, the support wall 5430, and a supplemental cover 5440. It is appreciated that the support walls may be positioned about the chair cover 5410 (that is disposed atop a wheelchair) in any of a wide variety of manners. In the example shown in FIG. 54, the support walls are disposed to extend alongside the chair and beyond the back of the chair cover 5410. The top portion, such as the top half of each of the support walls 5420, 5430 are bent inward, at the back, so as to effectively "close in" the back of the chair cover 5410. The support walls may be maintained in this position utilizing a strap 5425 (as shown) or some other mechanical device, such as a tie. Such mechanical device may utilize a buckle or Velcro, for example. Accordingly, the arrangement of FIG. 54 may be beneficial in, for example, containing water that is applied in washing a patient's head, for example. The supplemental cover 5440 may be simply in the form of a towel draped over the support wall 5440 and/or the support wall 5420, or disposed in some other manner, such as spanning across the support walls 5420, 5430 in back of the chair cover 5410. It should be appreciated, the use of such supplemental covers may be beneficial in providing further absorption capability.

Figure 55:
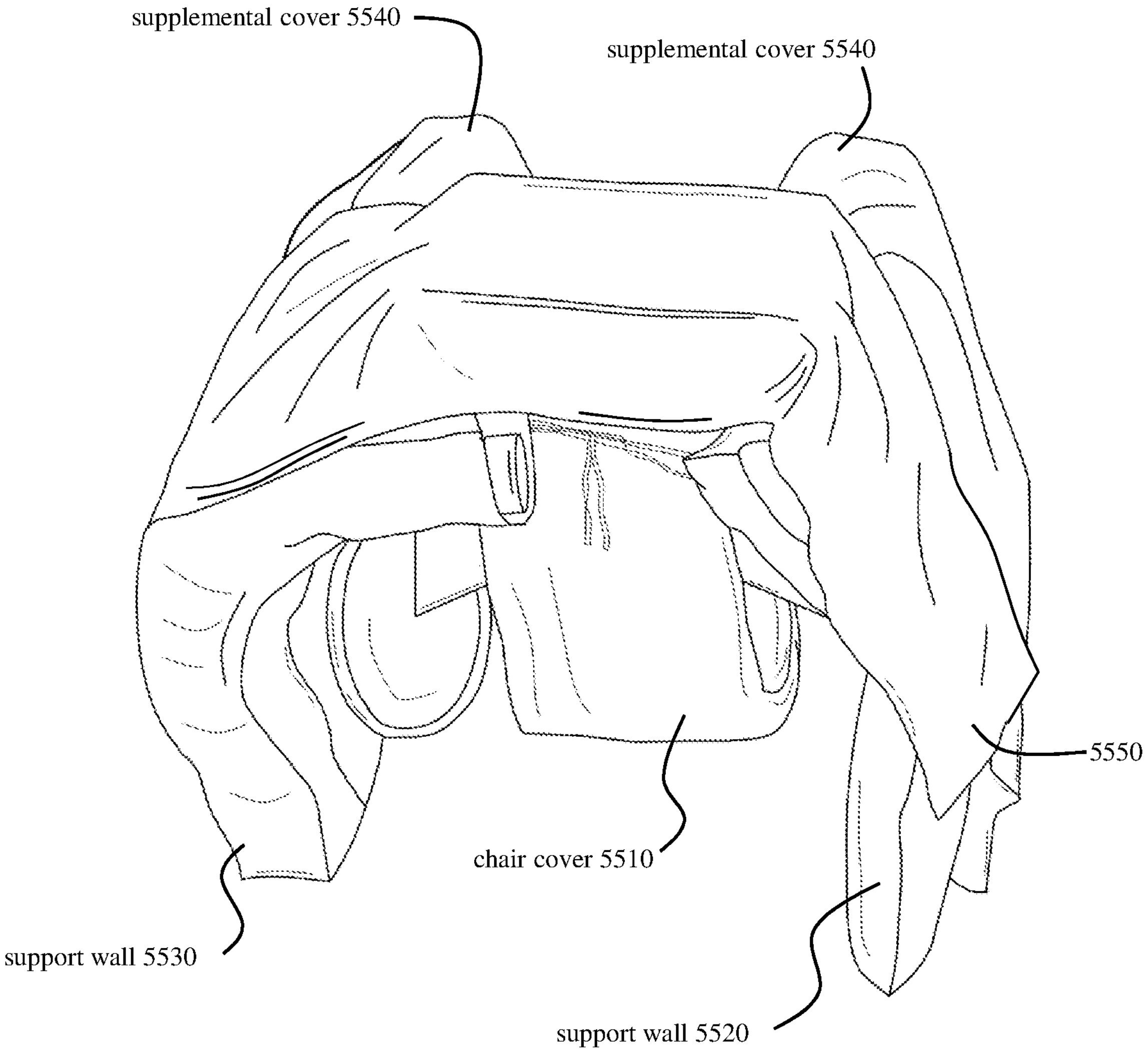
FIG. 55 is a rear perspective view showing a chair cover in combination with multiple support walls and wheelchair, in accordance with one embodiment of the invention.

Relatedly, FIG. 55 shows a supplemental cover 5550 spanning across support walls 5520 and 5530. That is, FIG. 55 is a rear perspective view showing a chair cover in combination with multiple support walls and wheelchair, in accordance with one embodiment of the invention. The illustrated chair cover 5510 may be similar in construction to, and illustrates possible application of, any of the chair covers described above and shown in FIGS. 34-44, for example. The illustrated support walls 5520, 5530 may be similar in construction to, and illustrate possible application of, any of the support walls described above and shown in FIGS. 51-52, for example.

Additionally, FIG. 55 shows a further supplemental cover 5540 that is draped across a left arm of the chair, as well as a supplemental cover 5560 draped across the right arm of the chair.

As noted above, FIG. 47, FIG. 48 and FIG. 50 are flowcharts showing various steps associated with utilization of a chair cover and support wall in accordance with embodiments of the invention.

The processing steps of FIG. 47 are set forth in reference to the chair cover 4600 of FIG. 46. More specifically, FIG. 47 is a flowchart showing details to perform a fitting process to mount the chair cover 4600 (of FIG. 46) upon a wheelchair, in conjunction with utilization of support walls. The process starts in step 4700 passes to step 4701. In step 4701, a person, such as a nurse, positions seat cover portion 4611 of the chair cover 4600 (of FIG. 46) on a seat of a wheelchair, for example. Then, in step 4702, the nurse drapes the seat drape portion 4614 over the back of the wheelchair, thereby positioning the back cover portion 4612 against the back of the wheelchair—as well as positioning the seat top portion 4613 across the top edge of the wheelchair seat. After step 4702, the process passes to step 4703.

In step 4703, the nurse pulls the basin portion 4615, i.e. the collection portion, toward the front of the wheelchair and underneath the wheelchair. For example, once the seat drape portion 4614 is disposed down the back of the wheelchair, the nurse may reach under the wheelchair from the front—so as to grab ahold of the basin portion 4615. The nurse would then pull the basin portion 4615 forward, so as to be disposed in the desired position. As a result, the basin portion is positioned underneath the wheelchair.

Then, in step 4704, the nurse attaches the fasteners 4646 as shown in FIG. 46. That is, the nurse decides that he or she indeed wants the basin portion 4615 to collect and retain water—as opposed to letting water run off (from the basin portion 4615) onto a drained surface, for example (as reflected by box 4704' of FIG. 47). Accordingly, the fasteners 4646 are attached at each corner of the basin portion 4615 so as to join the ends (of the basin end wall) 4616E to a corresponding side portion end 4621E.

In step 4705 of FIG. 47, the nurse, in this embodiment, wraps the side portions 4621 around the sides of the chair, so as to be tucked under the seat drape portion 4614. In accordance with one utilization of the invention, an elastic strap (such as strap 3880 shown in FIG. 38) might be wrapped around the back of the chair so as to engage the back cover portion 4612 and the seat drape portion 4614, which would be disposed on opposing sides of the wheelchair back. Such elastic strap or other mechanism might be useful to retain the various components in a desired position. Alternatively, the segments of the side portions 4621 (adjacent the back cover portion 4612 and an upper portion of the seat drape portion 4614) may simply be left to loosely extend outwardly. Relatedly, the positioning of such segments of the side portions 4621 may indeed depend on whether the basin portion 4615 is utilized as merely a runoff, or alternatively, utilized to collect and contain water. In other words, it is appreciated that the orientation of a side portion 4621 (at end 4621E) may indeed dictate, to some extent, orientation at the opposing end. In particular, if the side portion 4621 is reinforced with one or more inserts, than the "bendability" of the side portion 4621 may be limited. Relatedly, it is appreciated that each of the side portions 4621 might be notched or slit along the length thereof, so as to better provide for desired bendability. Such alternative structure is shown by slits 46215 in the expanded alternative view of FIG. 46.

With further reference to FIGS. 46 and 47, after the side portions 4621 are positioned about the sides of the back (of the wheelchair) in a desired manner, the processing then passes to step 4706 of FIG. 47. In step 4706, the support walls are positioned and attached. Specifically, in step 4706-A, the nurse positions a support wall on each side of the wheelchair. Then, in step 4706-B, the nurse attaches each support wall to the wheelchair using the ties provided on each support wall. The support walls, such as shown in FIG. 51 may be positioned in any manner desired. Further, any number of support walls may be utilized. For example, the positioning and number of support walls utilized may well depend on the anticipated bathing procedure. For example, such number and positioning may depend on whether or not the patient's head is intended to be washed.

Then, the process of FIG. 47 passes to step 4704. In step 4704, the nurse drapes each respective side drape portion 4633 (with further reference to FIG. 46) over the corresponding support wall. Hand in hand, step 4704 also positions the seat side portion 4631 and the seat armrest portion 4632 for each side. As otherwise noted herein, it is appreciated that the particular size of the portions of the chair cover 4600 may be varied, in manufacturing, as desired. For example, the side drape portion 4633 might be made larger, for intended use with larger support walls or so as to better cover the wheels of a wheelchair, for example. Then, the process passes to step 4708.

In step 4708, the nurse positions a supplemental towel over the seat armrest portion and/or the support walls on each side. It is appreciated that such step is optional—and in general that the steps of FIG. 47 are illustrative and may well be modified and/or adjusted as desired.

Accordingly, step 4709 of FIG. 47 reflects that the particular chair cover is fitted onto the wheelchair and ready for use. The processing than passes to step 4810 in which the cover is utilized to wash a person. Further details of step 4810 are shown in FIG. 48.

FIG. 48 is a flowchart showing in further detail the "utilize cover to wash a person" step of FIG. 47, in accordance with one embodiment of the invention. As shown, the process starts in step 4810, and passes to step 4811. In step 4811, a person to be bathed sits in a wheelchair upon which cover 4600 is disposed, i.e. the sits upon cover 4600 in the wheelchair. Then, in step 4812, as the person in the wheelchair is bathed—for example with a sponge—water (or a water-soap combination, for example) flows over the person and flows to the back of the wheelchair seat—flowing over the seat cover portion 4611. As shown in box 4812' of FIG. 48, sprayed or splattered water, for example, is also collected by the arrangement including the support walls—by absorbing water and/or routing water to the drain aperture Then, in step 4813, water passes through the drain aperture 4640 at the back of the seat cover portion 4611. As reflected by step 4814, as water exits the drain aperture 4640, it then flows through a back opening of the wheelchair (assuming the wheelchair is indeed of a construction to include such opening), and onto the seat drape portion 4614. The water then subsequently flows onto and into the basin portion 4615. Relatedly, it is appreciated that many wheelchairs are foldable (or otherwise provided with structure) so as to allow water to pass through the back of the wheelchair seat.

In the illustrative flowchart of FIG. 48, after step 4814, the processing passes to step 4815. In step 4815, water collects into the basin portion 4615. Alternatively, the basin end wall 4616, as shown in FIG. 46, may be opened so as to allow water to drain out, and onto a surface, for subsequent draining. Then, in step 4816, (assuming water has been collected) the water may be bailed, by a nurse for example, from the basin portion 4615 or otherwise disposed of in a manner as desired. Then, in step 4817, the bathing process is completed.

FIG. 46 shows a chair cover 4600 as might be prepared in a mass production manufacturing process. In contrast, a novel chair cover of the invention may indeed be constructed of a readily available shower curtain. Accordingly, in one innovative aspect of the invention, a "kit" may be provided that includes components to transform a known shower curtain into the innovative chair cover of the invention. FIG. 49 is a diagram showing conversion of a known shower curtain into the novel chair cover in accordance with one embodiment of the invention. More specifically, FIG. 49 shows a Piece-A 49A and a Piece-B 49B. Such two pieces collectively constituted a known shower curtain—being cut along cut line 4901. The cut pieces are then repositioned and manipulated as reflected by the same assembled pieces Piece-A' 49A' and Piece-B' 49B'. The flowchart of FIG. 50 is provided to illustrate such transformation.

As shown, FIG. 50 is a flowchart showing details of a fabrication process of a homemade chair cover, in accordance with an embodiment. The process starts in step 5001 with a single sheet of material, selected as desired. The material might be a shower curtain or plastic material, for example. Then, in step 5002, the "maker" (a human) takes the sheet of material and cuts along line 4901 as shown in FIG. 49. Then, in step 5003, the maker hems any edges, including cut edges, as may be desired. Then, in step 5004, the maker rotates the larger Piece-A relative to Piece-B. The maker then sews the pieces together along seams 4911', 4911" about the width of the intended seat wheelchair seat, for example, but leaving an opening 4910 for draining, as shown in FIG. 49. Loose ends 4912', 4912" (of Piece-B') are disposed outboard of the sewn portions 4911.

Then, in step 5005, the maker folds the corners 4913 (i.e. 4913', 4913") to join line 1 to line 2, as well as to join line 3 to line 4. The corners 4913 are folded into a boxlike shape—at what will be the lower front of the assembly. The maker then tapes the corners 4913 (i.e. 4913', 4913") to secure line 1 to line 2, as well as to secure line 3 to line 4. A box like arrangement is then formed by the taped-up corners 4913 (which is akin to the corners with webbing 4645 of FIG. 46). As shown on step 5005', a home-made cover has now been constructed that is akin to the manufactured cover depicted in FIG. 46.

As shown in step 5006, the home-made cover may now be fitted onto a wheelchair in a manner similar to the process (shown in FIG. 47) used to fit the manufactured cover (shown in FIG. 46). As shown in step 5007, the home-made cover may then be used to wash a person in a manner similar to the process (shown in FIG. 48) that manufactured cover (shown in FIG. 46) is used to wash a person.

In particular, for example, the kit might include instructions to make the chair cover, a template showing how to cut the shower curtain (or other selected material), needle and cord suitable for the sewn portion (as shown at 4911',4911" in FIG. 49), and suitable tape—to tape corners 4913', 4913" as shown in FIG. 49 (and/or adhesive strips of hook and/or loop fasteners to secure the corners), for example. It is of course appreciated that the particular contents of such kit may vary, as desired.

Figure 56:
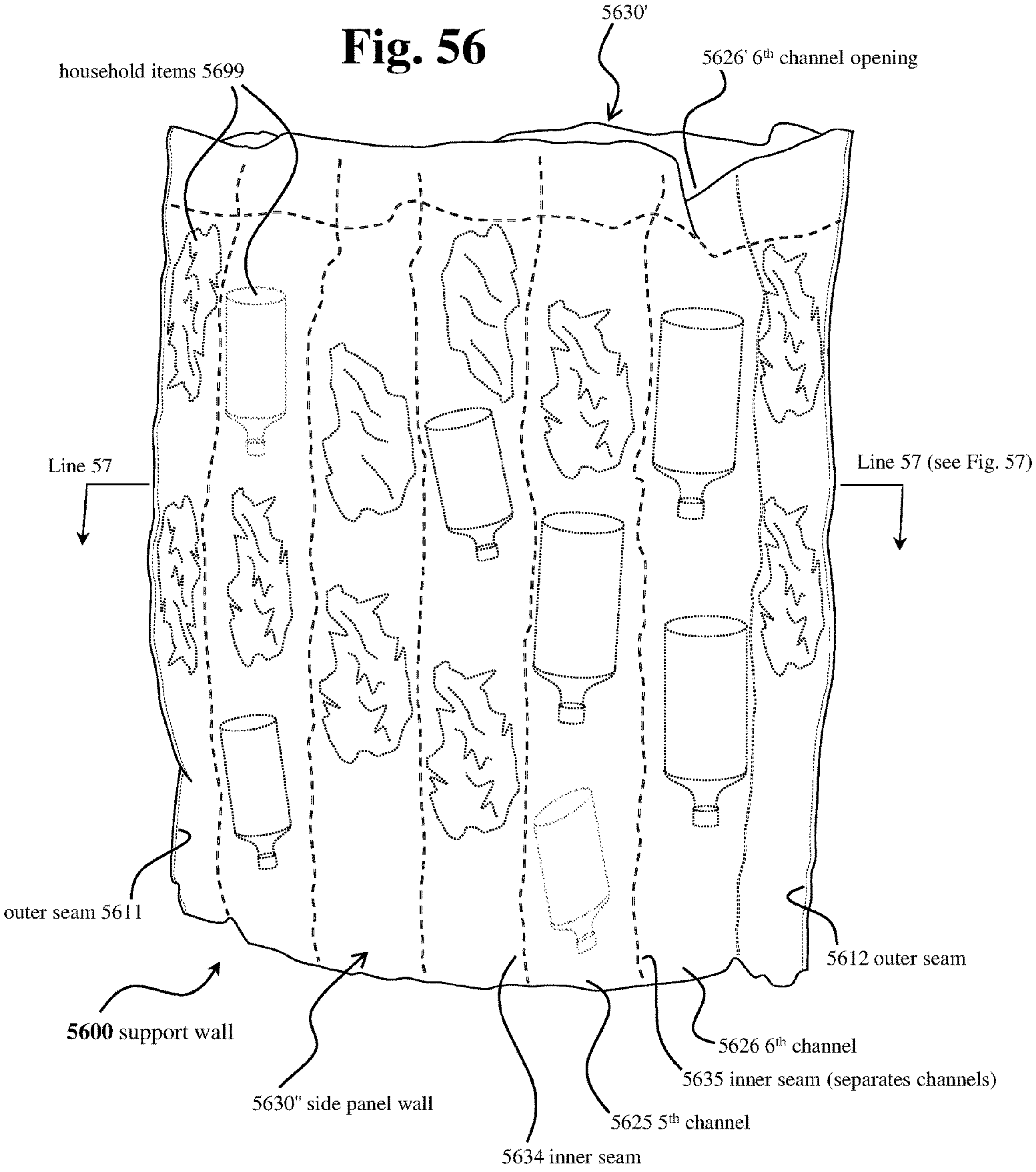
FIG. 56 shows a support wall in accordance with a further embodiment.

FIG. 56 shows a support wall 5600 in accordance with a further embodiment. In general, the support wall 5600 is similar in overall utility to the support wall 5100 shown in FIG. 51. However, support wall 5600 varies from support wall 5100 in construction. To explain, the support wall 5600 includes a first side panel wall 5630" and a second side panel wall 5630'. However, in contrast to the construction shown in FIG. 51, the support wall 5600 does not include any interior panels that span between the side panel walls 5630. Relatedly and to further illustrate, FIG. 57 is a top cross-sectional view along line 57 of FIG. 56, showing further details of the support wall 5600.

Figure 57:
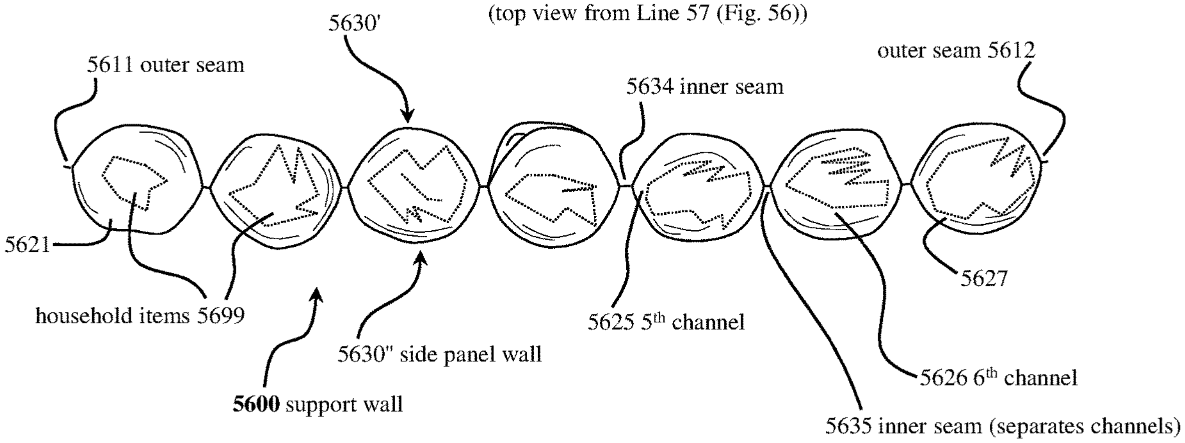
FIG. 57 is a top cross-sectional view along line 57 of FIG. 56, showing further details of a support wall.

In lieu of the interior panels of FIG. 51, in the arrangement of FIG. 56 and FIG. 57, the side panel walls 5630 are directly attached together at spaced intervals along the length of the support wall 5600—so as to define a plurality of channels (into which various household items 5699 may be inserted). This direct attachment (of the side panel walls 5630) is shown, for example, by inner seam 5634 and inner seam 5635. Such direct attachment may be provided through stitching, or in some other manner. Accordingly, the inner seam 5634 and inner seam 5635 define one of the channels in the support wall 5600, i.e. specifically the fifth channel 5625. Accordingly, the inner seam 5635, illustratively, separates such fifth channel 5625 from the sixth channel 5626. As shown, such inner seams provide the channels, as well as a channel opening into which the household items 5699 may be inserted. Such a channel opening is shown by the sixth channel opening 5626'.

Accordingly, the inner seams (5634, 5635 for example) define the various channels in the interior of the support wall 5600. As shown in both FIG. 56 and FIG. 57, at the ends of the support wall 5600, the side panel walls 5630 are also stitched or otherwise attached together at outer seam 5611 and outer seam 5612. Accordingly, with reference to FIGS. 56 and 57, the outer seam 5611 defines a left extent of the channel 5621. The outer seam 5612 defines a right extent of the channel 5627. The side panel walls 5630, in the embodiment of FIGS. 56 and 56, are also directly joined together (such as by stitching) at the bottom edges thereof.

As otherwise described herein, it is appreciated that a support wall of the invention may indeed include features of both the support wall of FIG. 51 and the support wall of FIG. 56, for example. For example instead of end wall 5120', as shown in FIG. 51, such end wall 5120' might be omitted—and the side panel walls 5130 simply joined together as shown in FIG. 56.

Figure 58:
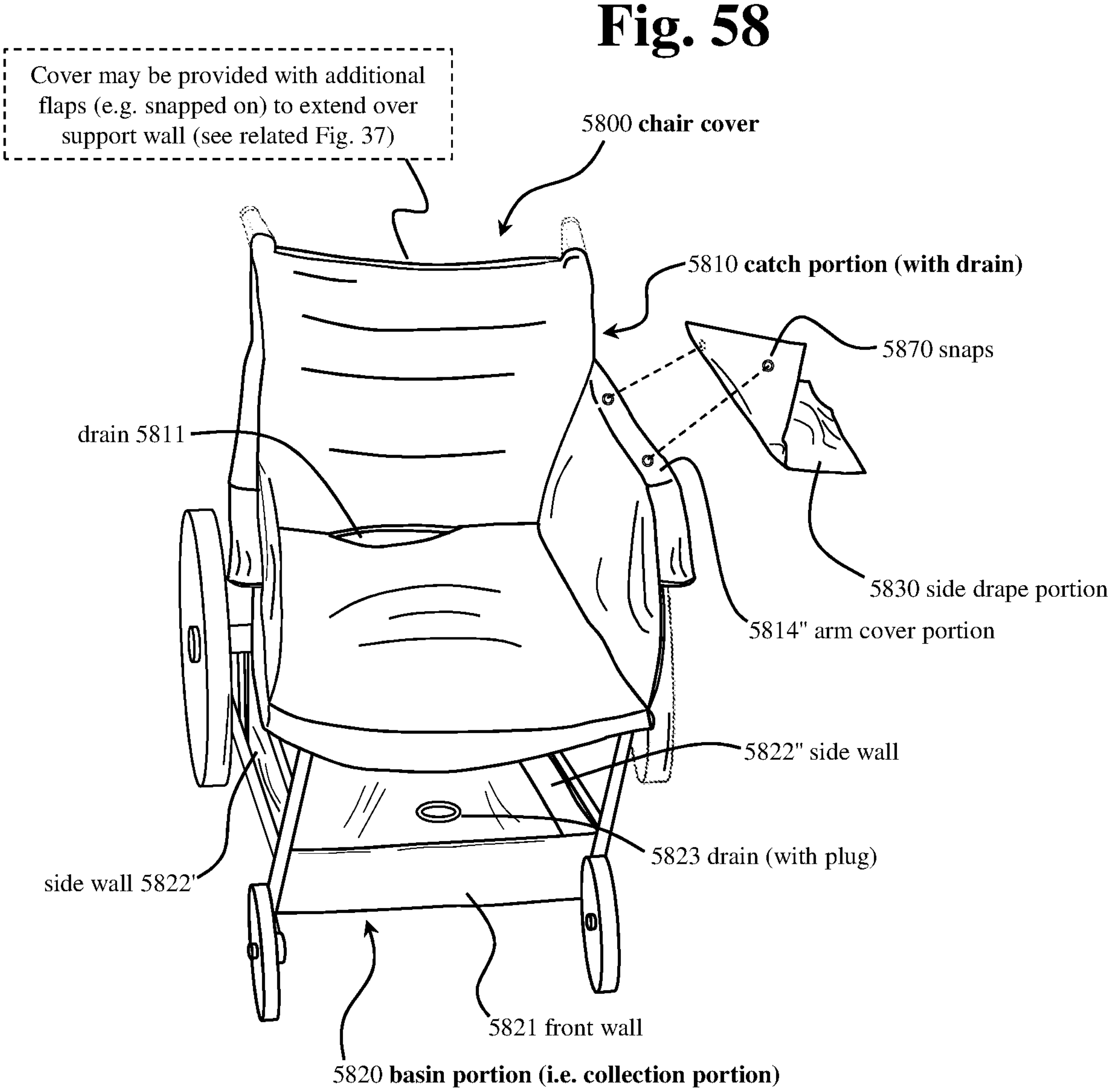
FIG. 58 is a perspective view showing a further chair cover, in accordance with one embodiment of the invention.

FIG. 58 is a perspective view showing a chair cover 5800 in accord with another embodiment of the invention. Chair cover 5800 includes a catch portion 5810 and basin portion 5820. In particular, chair cover 5800 is provided to show that portions of a chair cover might be separate pieces, versus the integral construction as shown in for example FIG. 37. For example, FIG. 37 shows a right side drape portion 3715". Such side drape portion 3715" is integrally attached to the other portions of the cover, including arm cover portion 3714". In contrast, as shown in FIG. 58, the chair cover 5800 includes a side drape portion 5830 that is disconnectable (i.e. able to be disconnected) from the arm cover portion 5814", as shown. For example, the side drape portion 5830 (also referred to as a "wheel cover portion" in other embodiments) may be attached to the arm cover portion 3714" utilizing snaps 5870 (as shown) or buttons, for example. As a result, the side drape portion 5830" may be disconnected from the arm cover portion 3714". It is appreciated that any of a wide variety of other mechanical fasteners might be utilized, such as Velcro, a zipper arrangement, and/or ties, for example.

As shown, the catch portion 5810 (of the chair cover 5800) includes a drain 5811 in manner as described above, such as in the embodiment of FIG. 37. The chair cover 5800 further includes a basin portion 5820, or as otherwise referred to herein as a "collection portion". Basin portion 5820 includes a front wall 5821, a side wall 5822' on the left side, and a sidewall 5822" on the right side. The basin portion 5820 also includes a drain 5823. It is appreciated that any of the basin portions, i.e. the collection portions, described herein may similarly include one or more drains as may be desired. Such a drain may of course be provided with a suitable plug that may be inserted into an aperture to retain water and removed so as to drain water. Additionally, it is appreciated that any of the basin portions described herein may further be provided with a drain pipe or conduit, such as connected on the underside of the basin portion. Such drain pipe or conduit may be desired to route water or other fluid to a desired destination, such as adjacent to a floor drain.

It is appreciated that the apparatuses and methods of the invention are not limited to merely the side drape portion 5830 being disconnectable from other portions of a chair cover. Rather, other portions of the chair cover may also be disconnectable from each other (instead of being integrally formed) as may be desired.

Figure 59:
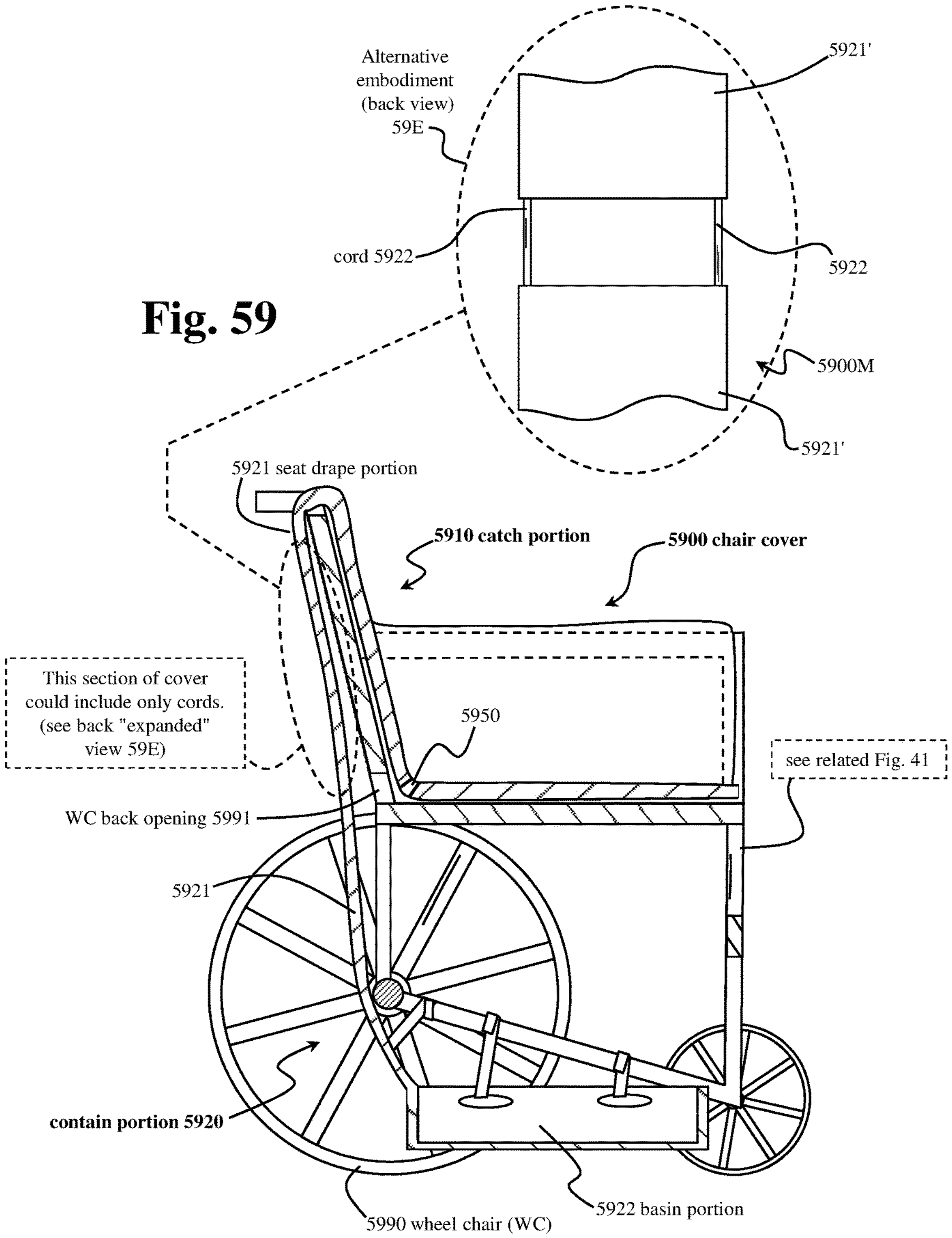
FIG. 59 is a further side cross-sectional view of a chair cover with wheelchair, in accordance with one embodiment of the invention.

Lastly, FIG. 59 is a further side cross-sectional view of a chair cover 5900 with wheelchair 5990 in accordance with an embodiment. In similar manner to related FIG. 41, the chair cover 5900 is provided to be fitted over the wheelchair 5990—so as to protect the wheelchair hand-in-hand with providing effective catching and containing of water, or other fluid. In manner as described above, the chair cover 5900 includes a catch portion 5910 and a contain portion 5920. The contain portion 5920 includes a basin portion 5922. In particular, the catch portion 5910 includes a seat drape portion 5921 and a drain opening 5950. During a bathing process, for a person sitting in the wheelchair, water is captured and flows through the drain opening 5950 and subsequently flows through a back opening of the wheelchair 5991. The water then impacts the seat drape portion 5921, which routes the water down to a basin portion 5922.

In particular, FIG. 59 illustrates that components of a particular chair cover 5900 may be modified, in accord with the invention, based on the intended use, the particular structure of the chair/wheelchair upon which the cover is to be utilized, the particular fluid used for a beating process, and/or other parameters. Accordingly, for example, it is appreciated that an upper portion of the seat drape portion 5920, as shown in FIG. 59, may well not typically come into contact with water during the bathing process. Accordingly, it is appreciated that such segment of the seat drape portion 5921, shown in dashed circle, may be of modified construction. Accordingly, FIG. 59 shows an alternative embodiment "back view" of a modified chair cover 5900. As shown in the back view, the modified cover 5900M includes an upper seat drape portion 5921' and a lower seat drape portion 5921". These two seat drape portions are connected together utilizing a pair of cords or rope 5922. Accordingly, the alternative embodiment of cover 5900M shows that one or more components or portions of the chair cover may be modified as desired. In the modified arrangement of FIG. 59, such arrangement might be beneficial in that less material is required for the seat drape portion 5921, while still effectively maintaining utility.

In accordance with the various embodiments of the invention, apparatuses have been described herein as used in a particular context such as with a patient or other particular person. However, it is appreciated that the apparatuses of the invention may be used in any of a wide variety of contexts, environments, and/or scenarios and to hold a wide variety of items (including persons) as desired.

As used herein, the language "in one embodiment", "in an embodiment" and similar language is not limiting and may be understood to not exclude more than one embodiment.

The various components of embodiments of the invention may be made from any of a variety of materials—such as plastic, metal, nylon, microfiber, shower curtain material, wood, composite, translucent fabric, woven polyester voile and cotton lace, cotton, leather, foam and/or rubber, for example, or any other material. Further, a variety of production techniques may be used to make the apparatuses as described herein. For example, suitable molding techniques and other manufacturing techniques might be utilized. Also, the various components of the apparatuses may be integrally formed, as may be desired, in particular when using molding construction techniques. Also, the various components of the apparatuses may be formed in pieces and connected together in some manner with suitable mechanical fasteners.

Mechanical fasteners used in the invention might include screws, bolts, nuts, lock nuts, friction nuts, washers, spacers, rivets, anchors, nails, clips, ties, strap, cord, thread, staple, hangers, hook and loop fasteners (VELCRO), wedges, pins, rings, studs, grommets, pegs, shims, threaded elements, rods, dowels, tape and adhesive, for example.

Further, the various apparatuses and components of the apparatuses may be provided in various sizes and/or dimensions, as desired.

Also, it is appreciated that the various features described herein (with reference to the various different embodiments) may be variously combined with each other so as to provide a desired apparatus. Various features of the invention may be combined as desired.

In accord with an Embodiment-A, the invention an apparatus to support an object while bathing the object with a fluid, the apparatus for use on a chair, the apparatus comprising: a catch portion and a contain portion, and (A) the catch portion including (a) a seat cover (SC) portion provided to cover a seat of the chair, the SC portion including a rear SC portion, a front SC portion; right SC portion, and a left SC portion; (b) a back cover (BC) portion provided to cover a back of the chair, the BC portion including a bottom BC portion and a top BC portion, and the bottom BC portion attached to the rear SC portion; (c) a drain aperture, the drain aperture disposed proximate both the rear SC portion and the bottom BC portion, and the drain aperture constituted by an opening extending through the catch portion; and (d) a seat top (ST) portion provided to span a top of the chair, the ST portion including a forward ST portion and a rearward ST portion, and the forward ST portion attached to the top BC portion; (B) the contain portion including: (a) a seat drape (SD) portion provided to drape down the back of the chair and route fluid exiting from the drain aperture, the SD portion including a top SD portion and a bottom SD portion, and the top SD portion attached to the rearward ST portion; (b) a collection portion provided to further route fluid exiting from the SD portion, the collection portion including a rearward collection portion and a forward collection portion, and the rearward collection portion attached to the bottom SD portion; and the collection portion including respective side structures on opposing sides of the collection portion, the side structures adapted to control flow of the fluid. In the Embodiment-A, the SC portion constructed of a dimension to support a human. In the Embodiment-A, the SC portion constructed of water resistant material. In the Embodiment-A, the SC portion constructed of plastic. In the Embodiment-A, the catch portion further including a right side portion and a left side portion, and the right side portion attached to the right SC portion and provided to cover at least a right arm of the chair; and the left side portion attached to the left SC portion and provided to cover at least a left arm of the chair, and furthermore: the chair is constituted by a wheelchair, and the right side portion constituted by a seat side portion that extends to a seat armrest portion, that extends to a side drape portion, and such side portion being dimensioned so as to (a) shield a right armrest of the chair from fluid, and (b) shield a right wheel of the chair from fluid; and the left side portion constituted by a seat side portion that extends to a seat armrest portion, that extends to a side drape portion, and such side portion being dimensioned so as to (a) shield a left armrest of the chair from fluid, and (b) shield a left wheel of the chair from fluid. In the Embodiment-A, the collection portion including the respective side structures on opposing sides of the collection portion, the side structures adapted to control flow of the fluid in such manner that fluid is retained in the collection portion, and furthermore: the respective side structures including ties that are adapted for connection to a supporting chair structure, and furthermore: the collection portion including an end wall connected to, and spanning between, the respective side structures, and the end wall, in conjunction with the side structures, adapted to contain the fluid, the collection portion constituting a collection portion, and furthermore: the end wall, at opposing ends thereof, being attached to each of the side structures by a removable attachment arrangement; and such removable attachment arrangement adapted to allow attachment and removal during routine use, and furthermore: the removable attachment arrangement is a hook and loop fastener arrangement. In the Embodiment-A, the catch portion and a contain portion integrally formed of a single piece of material. In the Embodiment-A, the ST portion is integrally formed with the BC portion, and furthermore: the ST portion is integrally formed with the SD portion. In the Embodiment-A, the collection portion including a drain aperture with removable plug, the drain aperture adapted to allow draining of a fluid from the collection portion. In the Embodiment-A, the apparatus in combination with the chair, and the chair is a wheel chair. In the Embodiment-A, the apparatus constructed of a single shower curtain. In the Embodiment-A, the apparatus in combination with a support wall of the invention, such as the support wall of FIG. 51 or FIG. 56. In the Embodiment-A, the apparatus in combination with a method of fitting such apparatus upon a chair; and the method of fitting including: (a) placing the SC portion upon a seat of a chair; (b) draping the SD portion down a chair back of the chair, whereby the BC portion and the ST portion are disposed proximate and about the chair back; (c) pulling the collection portion forwardly and underneath the chair, such that the collection portion is disposed underneath the chair, and such that the SD portion routes fluid exiting from the drain aperture to the collection portion.

In accord with an Embodiment-B, a support wall structure for containing plurality of items and for supporting a protective cover, the support wall structure comprising: (A) a first side wall (FSW) panel including a FSW top edge, FSW bottom edge, FSW first side edge and FSW second side edge opposed to the FSW first side edge; (B) a second side wall (SSW) panel including a SSW top edge, SSW bottom edge, SSW first side edge and SSW second side edge opposed to the SSW first side edge; (C) a first end wall connecting the FSW first side edge to the SSW first side edge; (D) a second end wall connecting the FSW second side edge to the SSW second side edge, (E) a bottom panel connecting the FSW bottom edge to the SSW bottom edge; the FSW panel, the SSW panel, the first end wall, the second end wall, and the bottom panel collectively forming an interior space; (F) a plurality of interior panels disposed in the interior space, each of the interior panels including a first side edge and a second side edge opposing the first side edge, and with each interior panel: (a) the first side edge is connected along a first connection extent thereof to the FSW panel, and the second side edge is connected along a second connection extent thereof to the SSW panel; and (b) the interior panel disposed so as to form a wall of a channel in the interior space, such that each interior panel serves to define in part a channel; and wherein at least one of said interior panels forms a channel along with each of (a) the FSW panel, (b) the SSW panel, and (c) either another interior panel, first end wall, or second end wall, and wherein a plurality of channels are formed by said plurality of interior panels. In the Embodiment-B, the FSW panel, SSW panel, the first end wall, the second end wall, the bottom panel, and each of the plurality of interior panels each constitute a component of the support structure, and all the components of the support structure are constructed of same material, and furthermore the same material constituted by at least one selected from the group consisting of translucent fabric, woven polyester voile and cotton lace. In the Embodiment-B, each interior panel is connected to both the FSW panel and the SSW panel, at the first connection extent and the second connection extent respectively, through a mechanical attachment arrangement, and furthermore: the mechanical attachment arrangement is sewed thread. In the Embodiment-B, further including: a first tie attached to the first connection extent so as to be supported by the FSW panel in conjunction with an interior panel, and the first tie including a first strip of material and a second strip of material adapted to be tied about an attachment structure; and furthermore both the first strip of material and the second strip of material made of cloth; and furthermore: a second tie attached to a second first connection extent so as to be supported by the FSW panel in conjunction with a second interior panel, and the second tie including a first strip of material and a second strip of material adapted to be tied about the attachment structure. In the Embodiment-B, each of the interior panels disposed in substantially parallel relationship with each other. In the Embodiment-B, the support wall structure in combination with said plurality of items, wherein the items are variously contained in said channels; and furthermore: the plurality of items include household items, said household items including at least one selected from the group consisting of bottles, jugs, plastic bags, and paper bags. In the Embodiment-B each of the plurality of interior panels being in a dis-connected disposition vis-à-vis the bottom panel. In the Embodiment-B, each of the plurality of interior panels being connected to the bottom panel. In the Embodiment-B, further including an attachment mechanism attached to a top portion of the FSW, the attachment mechanism provided to attach to a second support wall structure, the second support wall structure being similarly constructed as said support wall structure. In the Embodiment-B, the bottom panel being sewn to each of the FSW panel and the SSW panel. In the Embodiment-B, the support wall structure in combination with a chair of the invention. In the Embodiment-B, the support wall structure in combination with a chair cover of the invention. In the Embodiment-B, the support wall structure in combination with a method of using such support wall structure with household items and in conjunction with a chair and chair cover; and the method of using including: (a) inserting a plurality of items into each of the channels, the plurality of items including at least one selected from the group consisting of plastic bags, plastic bottles, and plastic jugs; (b) disposing the support wall structure, with the plurality of items inserted therein, adjacent to the chair; and (c) positioning the chair cover, such as the chair cover of FIG. 34 or FIG. 46 for example, over both the chair and the support wall structure.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed is:

1. A bathing apparatus to support an object while bathing the object with a fluid and the object being a human, the bathing apparatus comprising:

a support structure;

a support surface to support the human, the support surface supported by the support structure, and the support surface including a left side and a right side that oppose each other;

a back portion disposed adjacent a back edge of the support surface, the back portion extending vertically upward from adjacent the support surface, the back portion including a vertically disposed surface constructed to receive leaning weight of the human;

a left side portion and a right side portion attached respectively to the left side and the right side of the support surface; and the support structure adjustably attached to both the left side portion and the right side portion so as to (a) support the support surface and (b) to allow adjustment of the support surface forward and backward.

2. The bathing apparatus of claim 1, the support structure including:

a left support portion adjustably attached to the left side portion; and a right support portion adjustably attached to the right side portion.

3. The bathing apparatus of claim 2, wherein:

the left support portion adjustably attached, by a left attachment mechanism, to the left side portion such that the left side portion is slidable upon the left support portion, and so as to provide the adjustment of the support surface forward and backward, and the right support portion adjustably attached, by a right attachment mechanism, to the right side portion such that the right side portion is slidable upon the right support portion, and so as to provide the adjustment of the support surface forward and backward.

4. The bathing apparatus of claim 3, the left attachment mechanism and the right attachment mechanism both including: a slot and a support rod, and the support rod being slidably received into the slot.

5. The bathing apparatus of claim 4, the left attachment mechanism and the right attachment mechanism both including: a rod collar that serves to secure the support rod into the slot.

6. The bathing apparatus of claim 3, the left attachment mechanism and the right attachment mechanism both including: a securement anchor and a retaining channel, and the securement anchor being slidably positioned in the retaining channel.

7. The bathing apparatus of claim 3, further including an extension portion that extends from an outer surface of at least one of the left and right side portions.

8. The bathing apparatus of claim 7, the extension portion constituted by a collection gutter.

9. The bathing apparatus of claim 3, the support surface including a plurality of apertures to provide for the fluid to drain.

10. The bathing apparatus of claim 9, each of the left side portion and the right side portion including at least one aperture to provide for the fluid to drain.

11. The bathing apparatus of claim 1, wherein each of the left side portion and the right side portion extend up from the support surface so as to provide a side to contain the human positioned upon the support surface.

12. The bathing apparatus of claim 2, wherein each of the left side portion and the right side portion extend down from the support surface so as to attach to a respective one of the left support portion and the right support portion.

13. A bathing apparatus to support an object while bathing the object with a fluid and the object being a human, the bathing apparatus comprising:

a support structure including a left support and a right support;

a seat base that includes a support surface to support the human, and the support surface including a left side and a right side that oppose each other, the seat base including a back edge;

a back portion disposed adjacent the back edge of the seat base, the back portion extending upward from adjacent the support surface, the back portion including a surface constructed to receive leaning weight of the human;

a left side portion and a right side portion attached respectively to the left side of the seat base and right side of the seat base; and the support structure adjustably attached to both the left side portion and the right side portion so as to (a) support the seat base and (b) to allow adjustment of the seat base relative to the support structure.

14. The bathing apparatus of claim 13, the left support adjustably attached, by a left attachment mechanism, to the left side portion such that the left side portion is adjustable relative to the left support, and so as to provide the adjustment of the seat base, and the right support adjustably attached, by a right attachment mechanism, to the right side portion such that the right side portion is adjustable relative to the right support, and so as to provide the adjustment of the seat base.

15. The bathing apparatus of claim 14, the adjustment of the seat base includes adjustment of the support surface forward and backward, so as to lean the human backward.

16. The bathing apparatus of claim 14, the left support, of the support structure, is positioned outboard from the left side portion, and the right support, of the support structure, is positioned outboard from the right side portion.

17. The bathing apparatus of claim 14, the left attachment mechanism including left slots and left support rods, and the left support rods being, respectively, slidably received into the left slots; and the right attachment mechanism including right slots and right support rods, and the right support rods being, respectively, slidably received into the right slots.

18. The bathing apparatus of claim 17, the left slots in the left support; and the right slots in the right support.

19. The bathing apparatus of claim 13, further including a back cross support, the back cross support including a first end connected to the left support, and the back cross support including a second end connected to the right support.

20. The bathing apparatus of claim 13, the left side portion including an upper side portion, which extends up from the seat base, and a lower side portion that extends down from the seat base;

the right side portion including an upper side portion, which extends up from the seat base, and a lower side portion that extends down from the seat base; and the back portion attached to the back edge of the seat base.

* * * * *